(12) United States Patent
Dundorf et al.

(10) Patent No.: US 10,969,521 B2
(45) Date of Patent: Apr. 6, 2021

(54) FLEXIBLE NETWORKED ARRAY FOR MEASURING SNOW WATER EQUIVALENT (SWE) AND SYSTEM NETWORK FOR PROVIDING ENVIRONMENTAL MONITORING SERVICES USING THE SAME

(71) Applicant: 2KR Systems, LLC, Barrington, NH (US)

(72) Inventors: Christopher C. Dundorf, Barrington, NH (US); Patrick Melvin, Lee, NH (US)

(73) Assignee: 2KR SYSTEMS, LLC, Barrington, NH (US)

( * ) Notice: Subject to any disclaimer, the term of this patent is extended or adjusted under 35 U.S.C. 154(b) by 468 days.

(21) Appl. No.: 15/794,283

(22) Filed: Oct. 26, 2017

(65) Prior Publication Data
US 2019/0129066 A1    May 2, 2019

(51) Int. Cl.
  *G01W 1/14*  (2006.01)
  *H04L 29/08*  (2006.01)
  *G01W 1/00*  (2006.01)

(52) U.S. Cl.
  CPC ............. *G01W 1/14* (2013.01); *H04L 67/12* (2013.01); *H04L 67/18* (2013.01); *G01W 2001/006* (2013.01)

(58) Field of Classification Search
  CPC ........... G01W 1/14; G01W 1/00; G01W 1/08; G01W 1/02; G01W 1/10; G01W 1/04;
  (Continued)

(56) References Cited

U.S. PATENT DOCUMENTS

| 2,267,257 A | 12/1941 | Ruzicka |
| 4,047,042 A | 9/1977 | Wada |

(Continued)

FOREIGN PATENT DOCUMENTS

| CA | 2573711 | 7/2008 |
| EP | 1806461 A1 | 7/2007 |

(Continued)

OTHER PUBLICATIONS

2KR Systems, "Snow Sentry Brochure", Jan. 2017, (pp. 1-9).
(Continued)

*Primary Examiner* — Andre J Allen
(74) *Attorney, Agent, or Firm* — Thomas J. Perkowski, Esq., PC

(57) ABSTRACT

A snow water equivalent (SWE) networked array for installation on ground surface of variable surface geometry, and configured for measuring snow water equivalent (SWE) in remote snow fall accumulations. The SWE-measuring networked array includes a plurality of snow data collection modules (SDCM) connected together over a specified region of space, and each SDCM measuring the weight and temperature of snow over its local weight surface, and generating electrical signals representative of the weight and temperature of the snow load on the weigh surface. One or more snow data collection module for measuring the snow load on a weighing surface, along with the temperature of said weighing surface, and generating composite electrical signals representative of the snow weight and temperature; a data multiplexing and power distribution module is used for receiving the composite signal; and a central data processing module is used to process the composite signals received from the data multiplexing and power distribution module and generating a SWE data value weighted according to a specific method.

15 Claims, 50 Drawing Sheets

(58) Field of Classification Search
CPC ........... G01W 1/06; G01W 1/12; G01W 1/16;
G01W 2001/003; G01W 2001/006;
G01W 2203/00; G01P 5/02; G01P 13/02;
G01P 13/045; G01P 5/26
USPC .......................................... 73/170.16–170.28
See application file for complete search history.

(56) References Cited

U.S. PATENT DOCUMENTS

| | | | |
|---|---|---|---|
| 4,843,372 | A | 6/1989 | Savino |
| 4,927,232 | A | 5/1990 | Griffiths |
| 4,936,060 | A | 6/1990 | Gelinas |
| 5,594,250 | A | 1/1997 | Condreva |
| 5,850,185 | A | 12/1998 | Canty |
| 6,727,841 | B1 | 4/2004 | Mitra |
| 6,832,522 | B2 | 12/2004 | Schaefer |
| 6,957,166 | B1 | 10/2005 | Howie |
| 6,988,661 | B2 | 1/2006 | Tsikos |
| 7,139,471 | B1 | 11/2006 | Durham |
| 7,516,094 | B2 | 4/2009 | Perkowski |
| 7,646,309 | B2 | 1/2010 | Visser |
| 8,040,273 | B2 | 10/2011 | Tomich |
| 8,552,396 | B2 | 10/2013 | Frolik |
| 8,594,936 | B1 * | 11/2013 | Koval ..................... G01W 1/14 702/3 |
| 8,982,207 | B2 | 3/2015 | Jang |
| 9,057,804 | B2 | 6/2015 | Christian |
| 9,082,015 | B2 | 7/2015 | Christopulos |
| 9,139,310 | B1 | 9/2015 | Wang |
| 9,262,788 | B1 | 2/2016 | Freeman |
| 9,262,789 | B1 | 2/2016 | Tofte |
| 9,292,630 | B1 | 3/2016 | Freeman |
| 9,346,560 | B2 | 5/2016 | Wang |
| 9,420,042 | B2 | 8/2016 | Raymond |
| 9,784,887 | B1 * | 10/2017 | Ulmer ..................... G01S 17/95 |
| 2002/0194922 | A1 | 12/2002 | Schaefer |
| 2006/0249622 | A1 | 11/2006 | Steele |
| 2007/0135989 | A1 | 6/2007 | Hengst |
| 2007/0164874 | A1 | 7/2007 | Visser |
| 2008/0087837 | A1 | 4/2008 | Desilets |
| 2009/0120179 | A1 | 5/2009 | Nylander |
| 2011/0073771 | A1 | 3/2011 | Frolik |
| 2013/0173062 | A1 | 7/2013 | Koenig-Richardson |
| 2014/0316614 | A1 | 10/2014 | Newman |
| 2014/0366648 | A1 * | 12/2014 | Christian ............... G01B 21/18 73/862.621 |
| 2014/0379179 | A1 | 12/2014 | Goossen |
| 2015/0120094 | A1 | 4/2015 | Kimchi |
| 2015/0236779 | A1 | 8/2015 | Jalali |
| 2015/0336667 | A1 | 11/2015 | Srivastava |
| 2016/0001878 | A1 | 1/2016 | Lee |
| 2016/0001884 | A1 | 1/2016 | Fleck |
| 2016/0004795 | A1 | 1/2016 | Novak |
| 2016/0033966 | A1 | 2/2016 | Farris |
| 2016/0105233 | A1 | 4/2016 | Jalali |
| 2016/0115323 | A1 | 4/2016 | Belcher |
| 2016/0144358 | A1 | 5/2016 | Patel |
| 2016/0144978 | A1 | 5/2016 | Cheron |
| 2016/0159496 | A1 | 6/2016 | O'Toole |
| 2016/0179096 | A1 | 6/2016 | Bradlow |
| 2019/0107646 | A1 * | 4/2019 | Trustman ................ G01D 21/02 |
| 2019/0383967 | A1 * | 12/2019 | Polebitski .......... G01G 23/3735 |

FOREIGN PATENT DOCUMENTS

| | | | |
|---|---|---|---|
| EP | 2813870 | A1 | 12/2014 |
| EP | 2818957 | A1 | 12/2014 |
| GB | 191420267 | A | 9/1915 |
| GB | 516444 | | 1/1940 |
| GB | 946087 | | 1/1964 |
| GB | 1112553 | A | 5/1968 |
| WO | 9933272 | | 7/1999 |
| WO | 0047966 | | 8/2000 |
| WO | 03068537 | | 8/2003 |
| WO | 2009129496 | | 10/2009 |
| WO | 2013186438 | A1 | 12/2013 |
| WO | 2015102706 | A2 | 7/2015 |
| WO | 2015123623 | A1 | 8/2015 |
| WO | 2016057098 | A2 | 4/2016 |
| WO | 2016083897 | A2 | 6/2016 |

OTHER PUBLICATIONS

Alpine Hydromet, "FSP: Fluidless Snow Pillow", Jan. 2017, (pp. 1-2).
Robotex Inc., "Avatar II Brochure", Jun. 2012, (pp. 1-7).
Promicron Inc., "Snow Load Sensor", Jul. 2014, (pp. 1-3).
Campbell Scientific, "CS725 Instruction Manual", Jan. 2012, (pp. 1-48).
Campbell Scientific, "CS725 Snow Water Equivalent Sensor", Jan. 2017, (pp. 1-2).
Sommer Messtechnik, "Snow Scale SSG", Dec. 2014, (pp. 1-4).
Sommer Messtechnik, "Snow Scales SSG", Aug. 2016, (pp. 1-2).
Sommer Messtechnik, "Snow Scale Screenshots", Jan. 2017, (pp. 1-15).
Bayern Innovativ, "Snow Patrol", Jan. 2017, (pp. 1-14).
Cna, "Risk Control Bulletin: Safe Work Practices on Snow Covered Roofs", Jan. 2010, (pp. 1-2).
Pro-Micron, "Snowcheck: Early Warning System for Excessive Roof Loads", Jan. 2015, (pp. 1-3).
Nh Business Review, "N.H. firm may have solution for roof snow loads", Mar. 2015, (pp. 1-7).
Pro-Micron, "SnowCheck: Snow Load Sensor", Sep. 2015, (pp. 1-4).
Cna, "Risk Control Bulletin: The Snow Loading and Roof Collapse Preparation Guide", Dec. 2015, (pp. 1-3).
Indiegogo, "Weather Flow: Smart Weather Stations", Dec. 2016, (pp. 1-31).
Lockton Inc., Lucas Pfannenstiel, "How Well Will Your Property Weather the Winter Weather?", Nov. 2017, (pp. 1-4).
Lockton Inc., Lucas Pfannenstiel, "Extending the Life of Your Company's Roof", Sep. 2018, (pp. 1-4).
Hydrological Systems, "Snow Load Roof Monitor", Nov. 2013, (pp. 1-2).
Intellicom Innovation, "NetBiter Case Study: Snow Load Scales", Jan. 2017, (pp. 1-2).
Roof Guards GMBH, "Roof Guards", Jan. 2013, (pp. 1-3).
Roof Guards GMBH, "Roof Guard and NetBiter", Nov. 2013, (pp. 1-3).
Safe Roof Systems Inc., "Roof Deflection Monitoring", Jan. 2017, (pp. 1-7).
Ruukki, "Ruukki's Load-Bearing Roof Solution", Jan. 2010, (pp. 1-11).
Ruukki, "Smart Roof Sensor", Nov. 2011, (pp. 1).
Ruuki, "Roof Snow Load System", Nov. 2013, (pp. 1).
Ruukki, "Ruukki's Design Toolbox", Jan. 2014, (pp. 1-4).
Ruukki, "Smart Roof", Jan. 2014, (pp. 1-3).
Ruukki, "Ruukki Smart Roof Now Ready", Jan. 2014, (pp. 1-3).

* cited by examiner

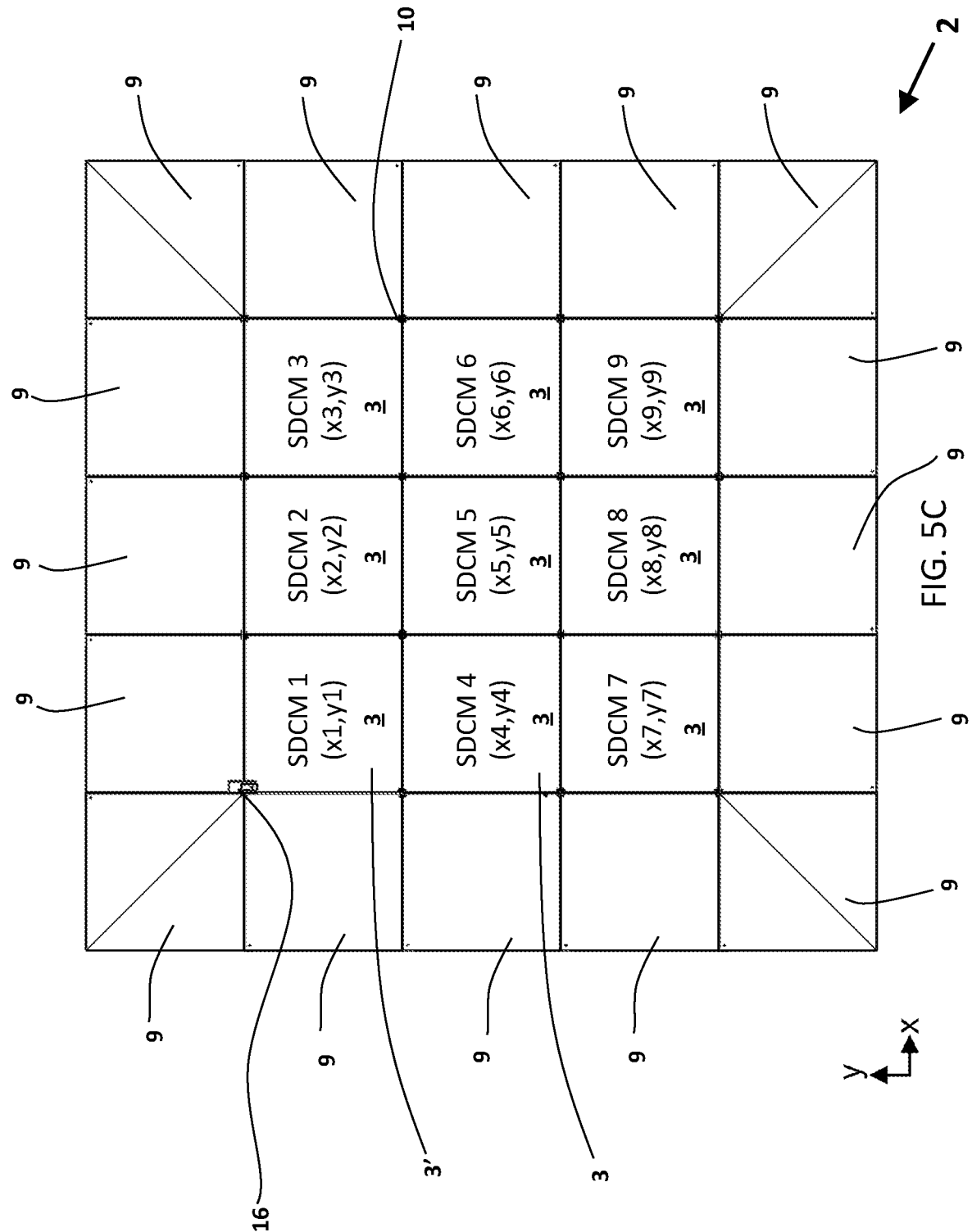

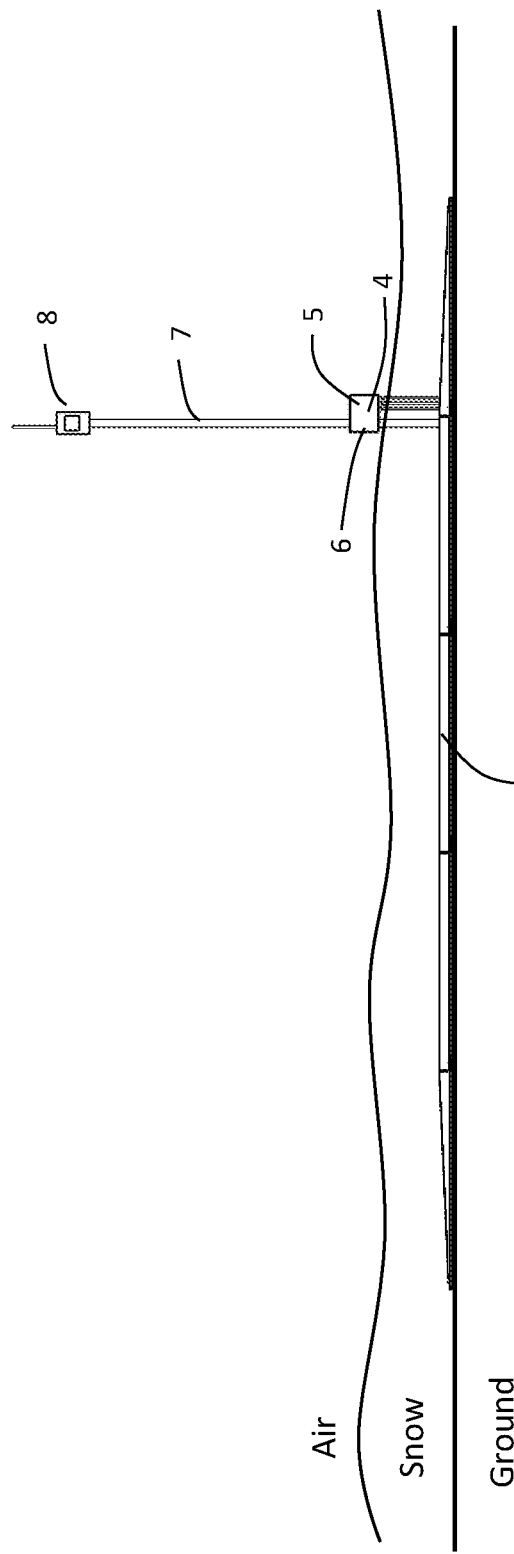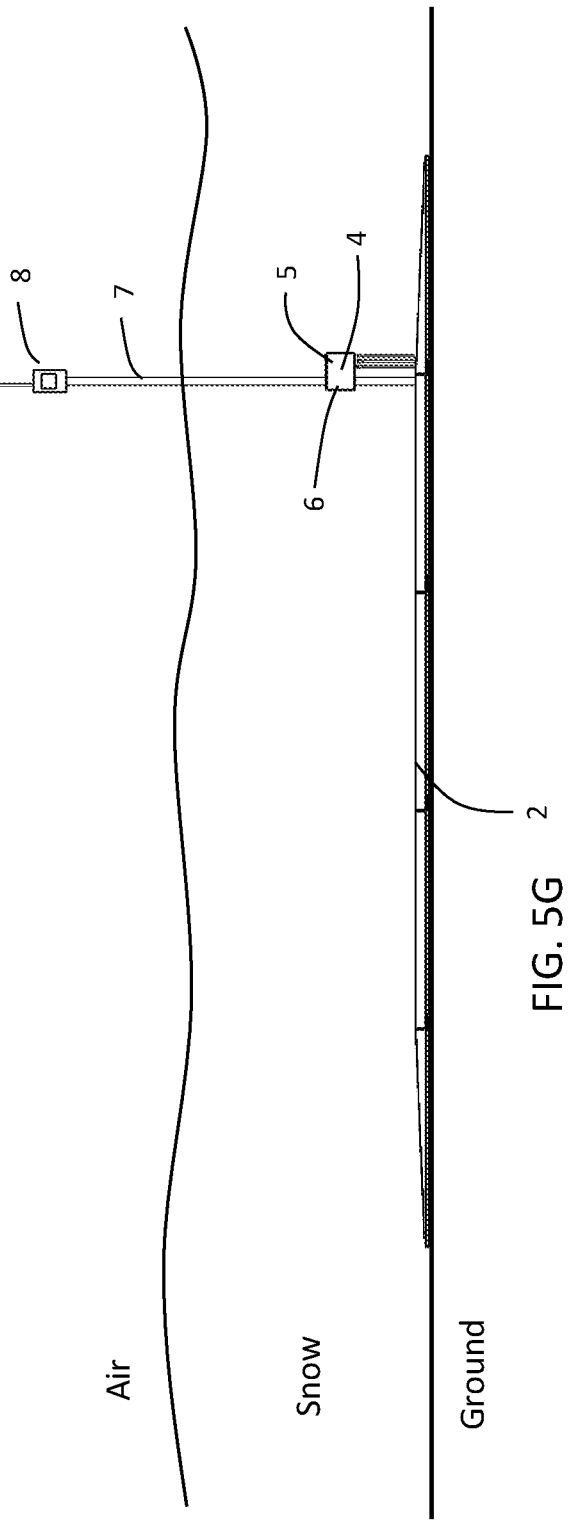

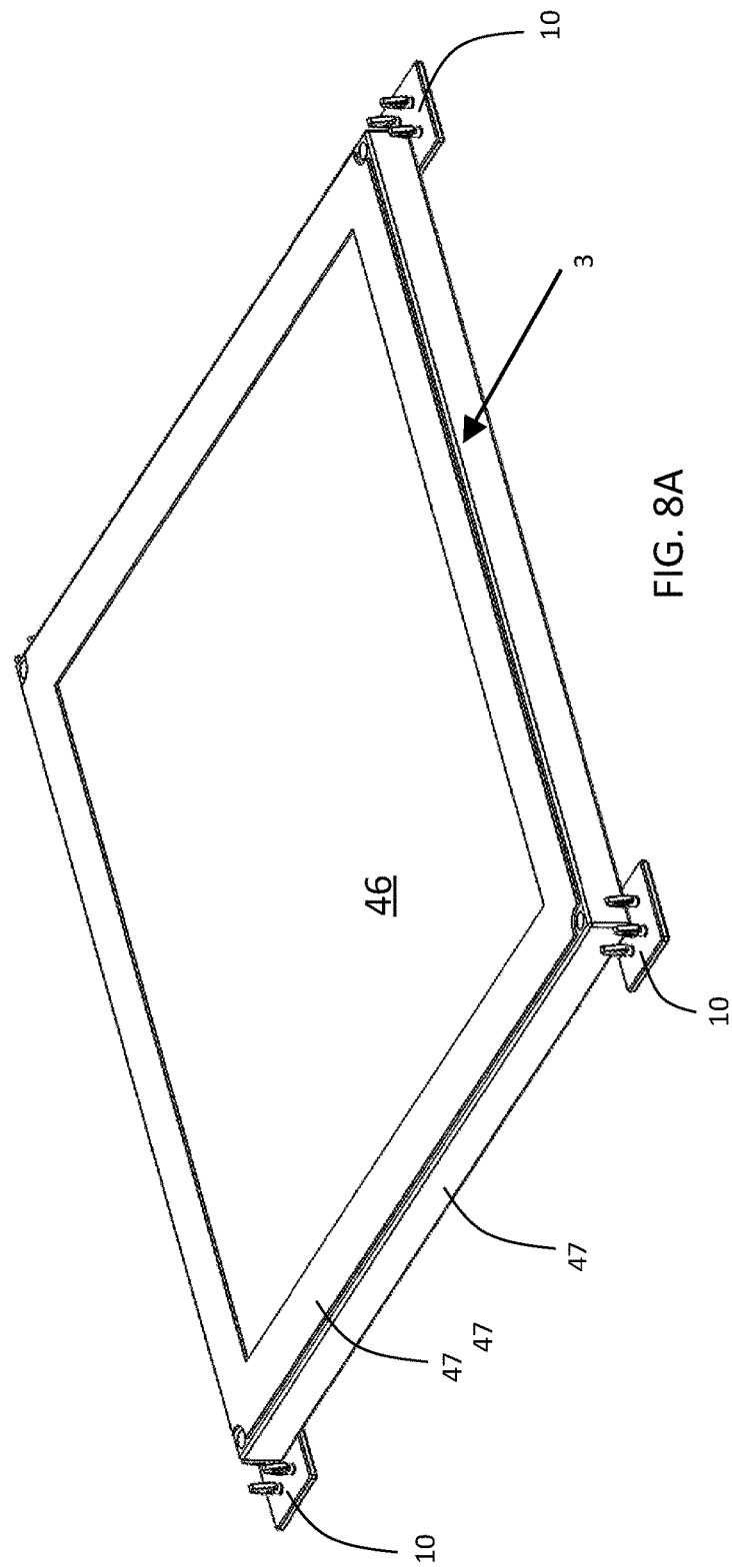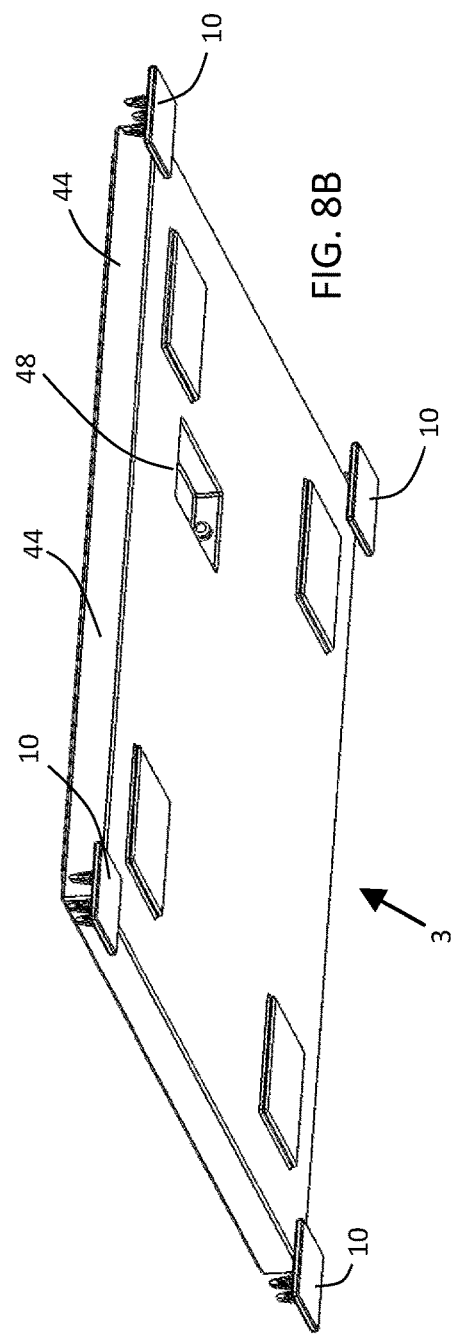

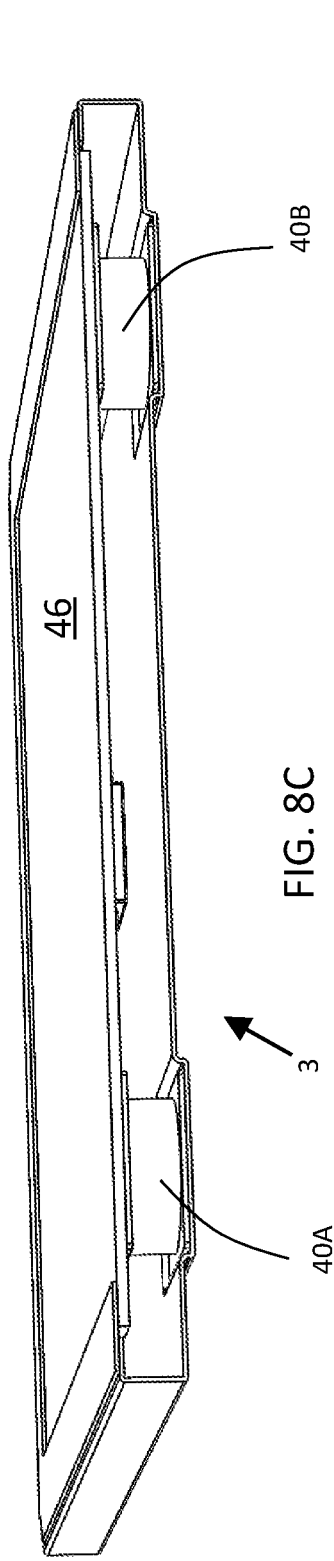
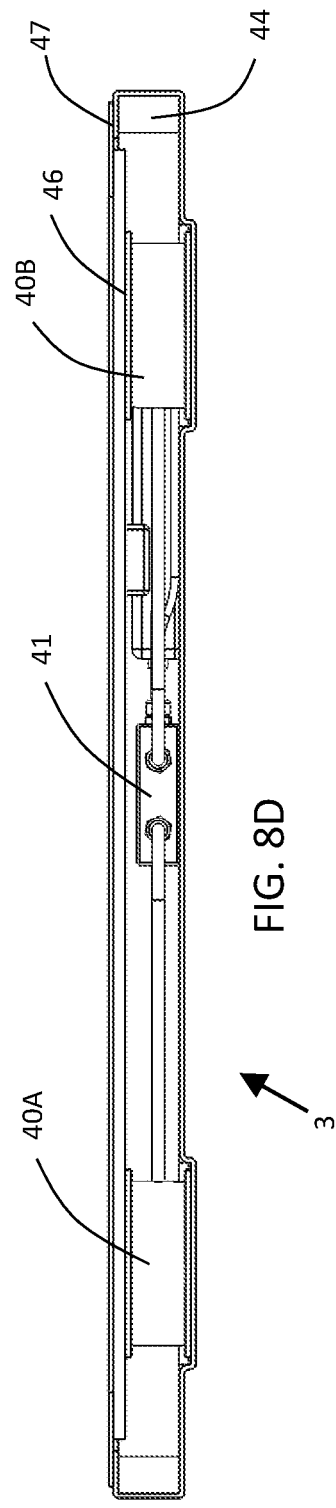

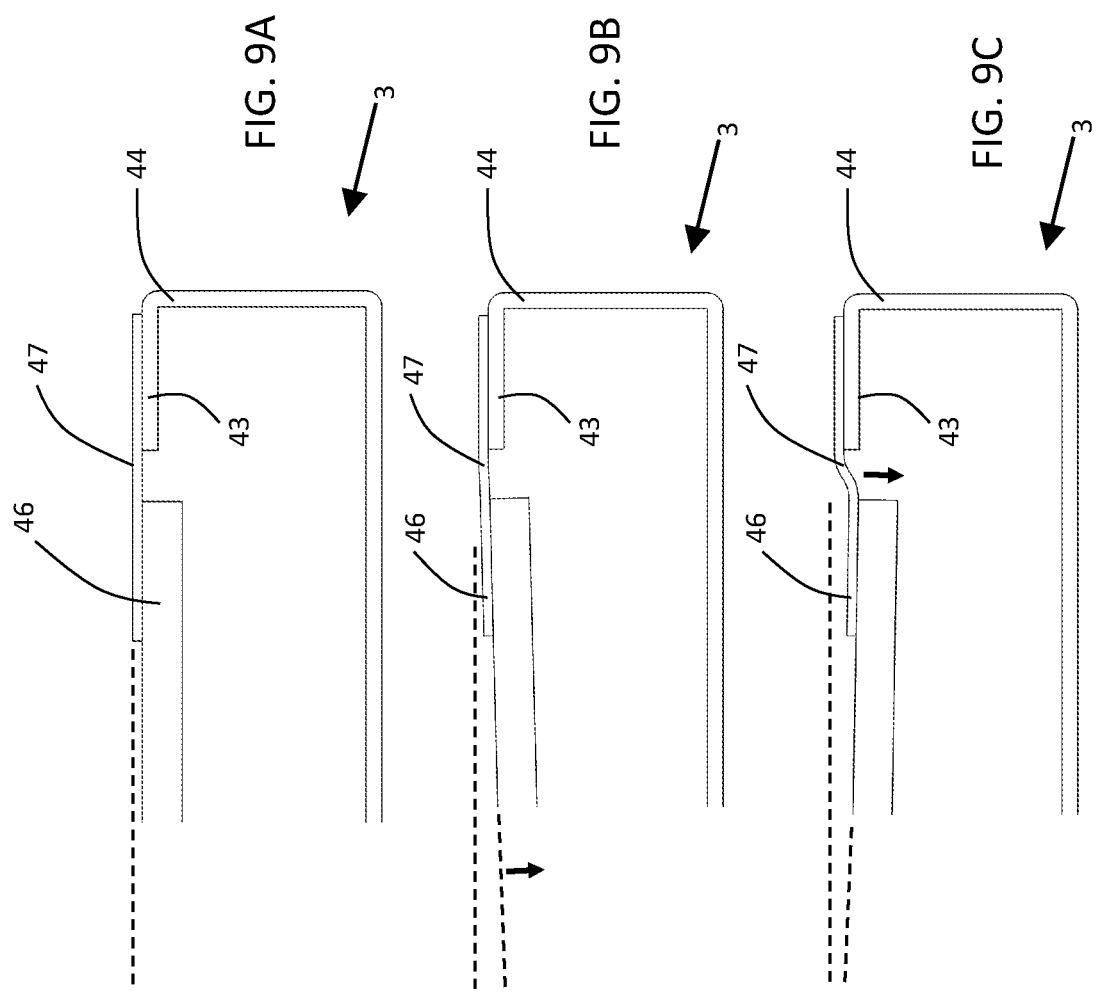

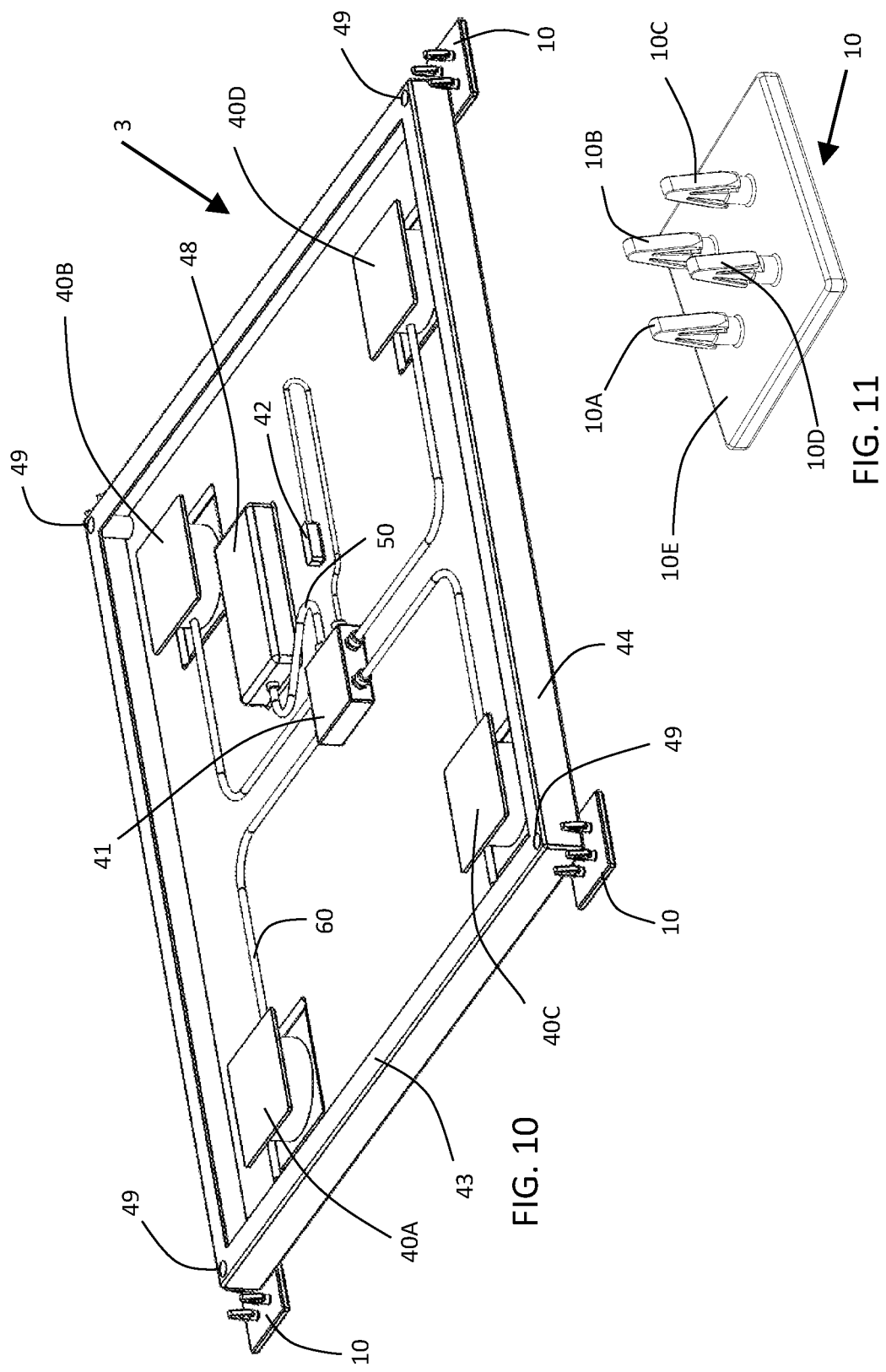

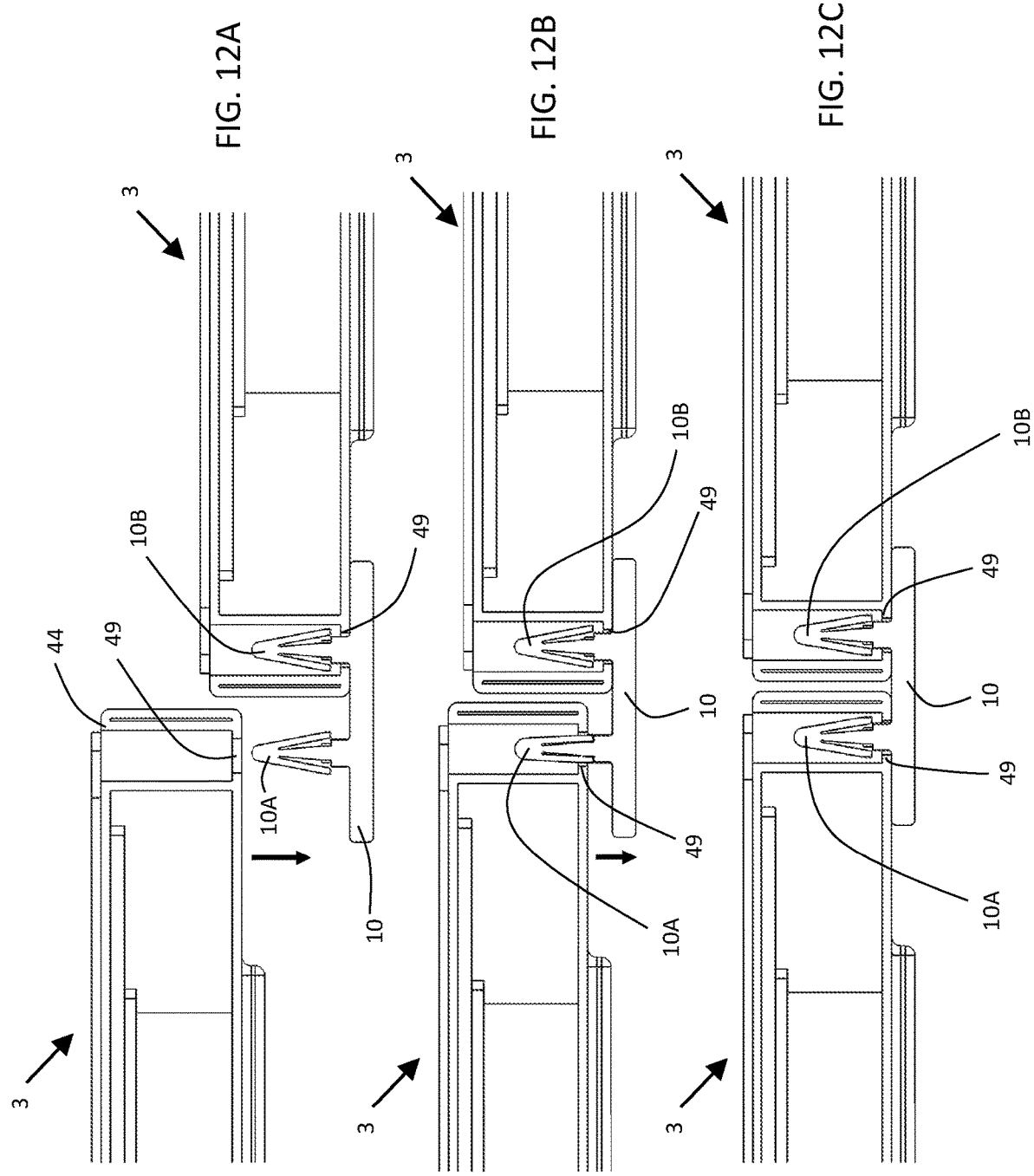

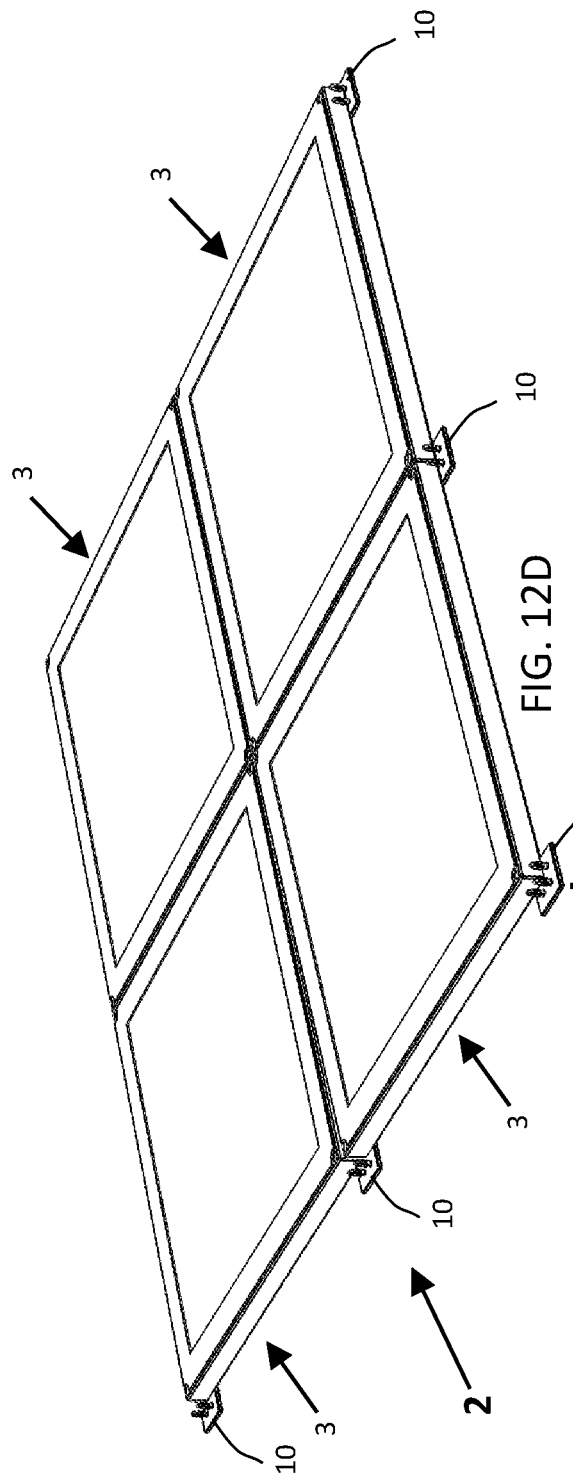
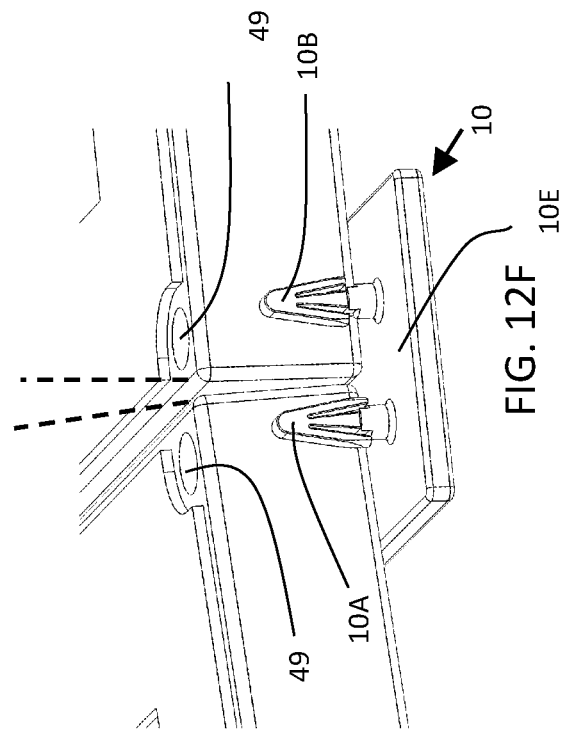
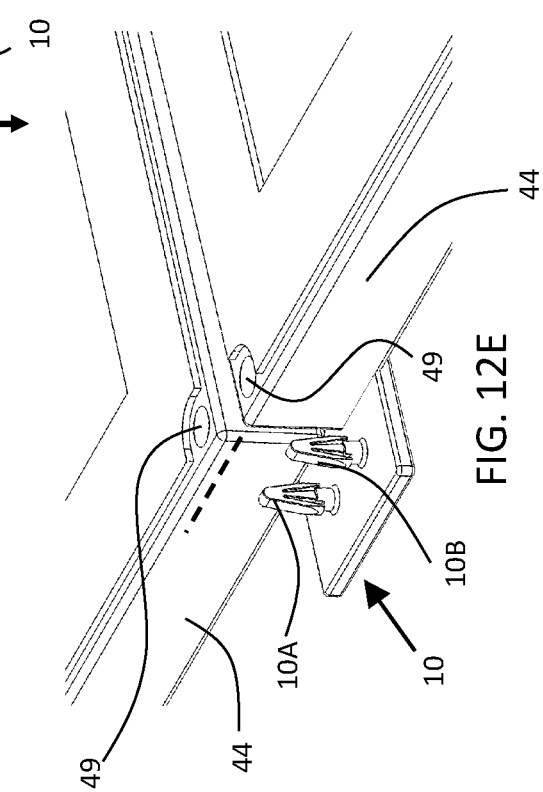
FIG. 12D
FIG. 12F
FIG. 12E

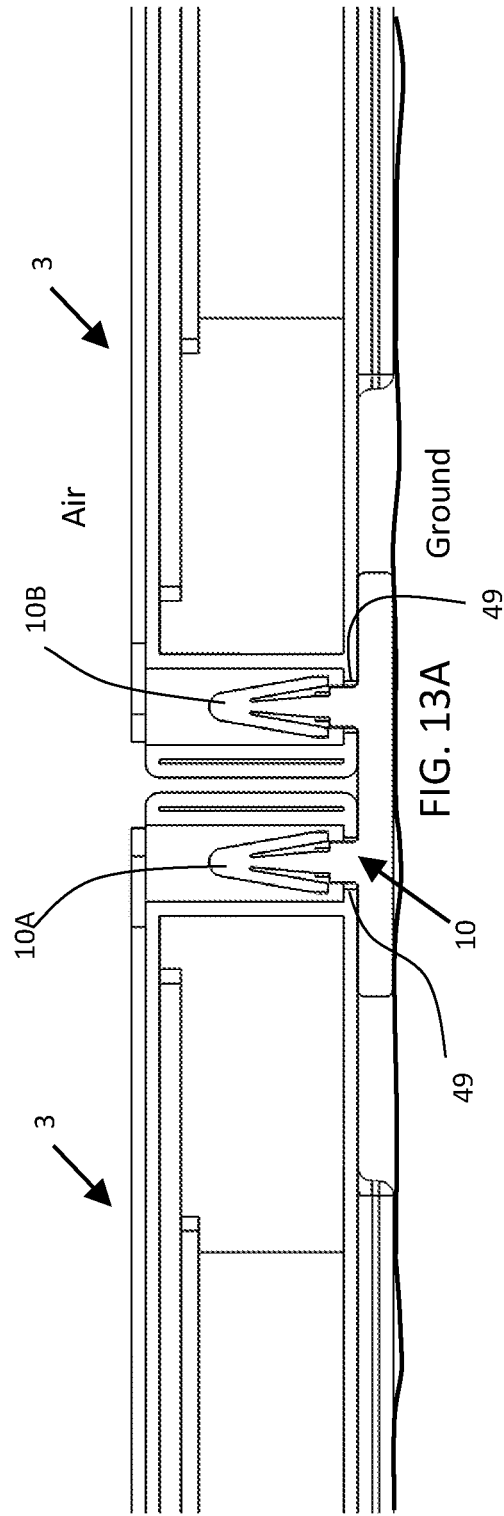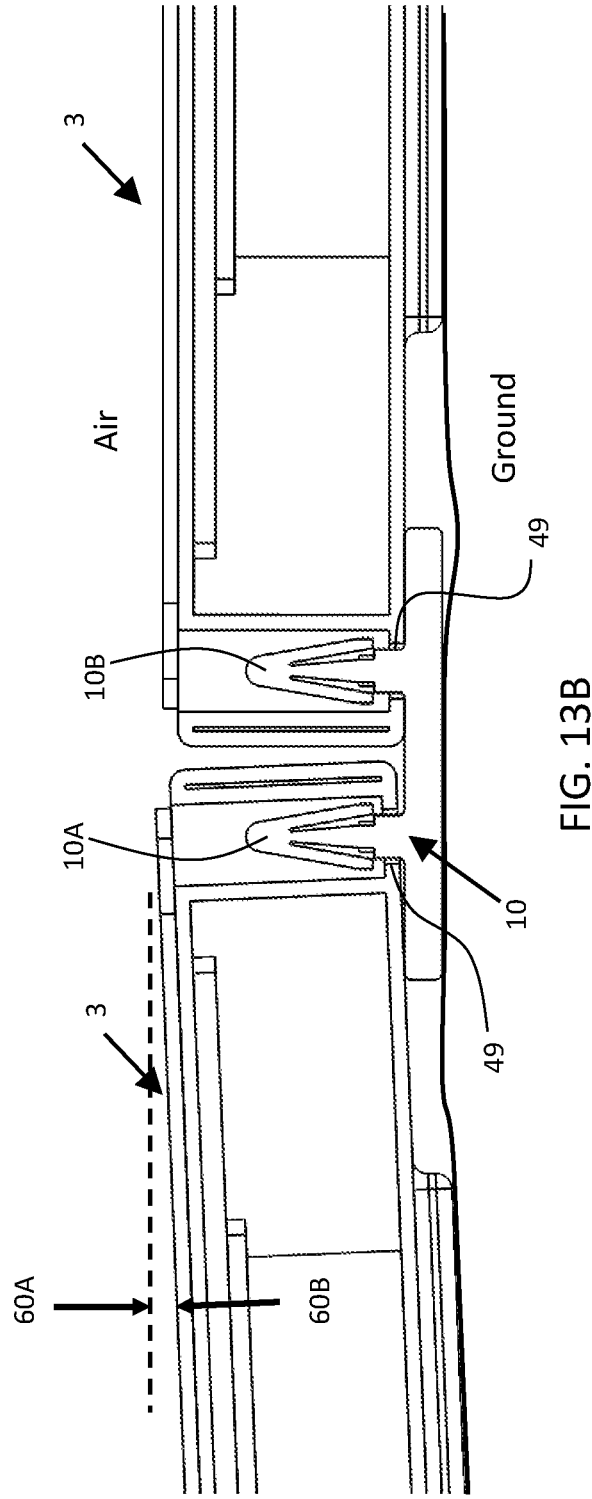

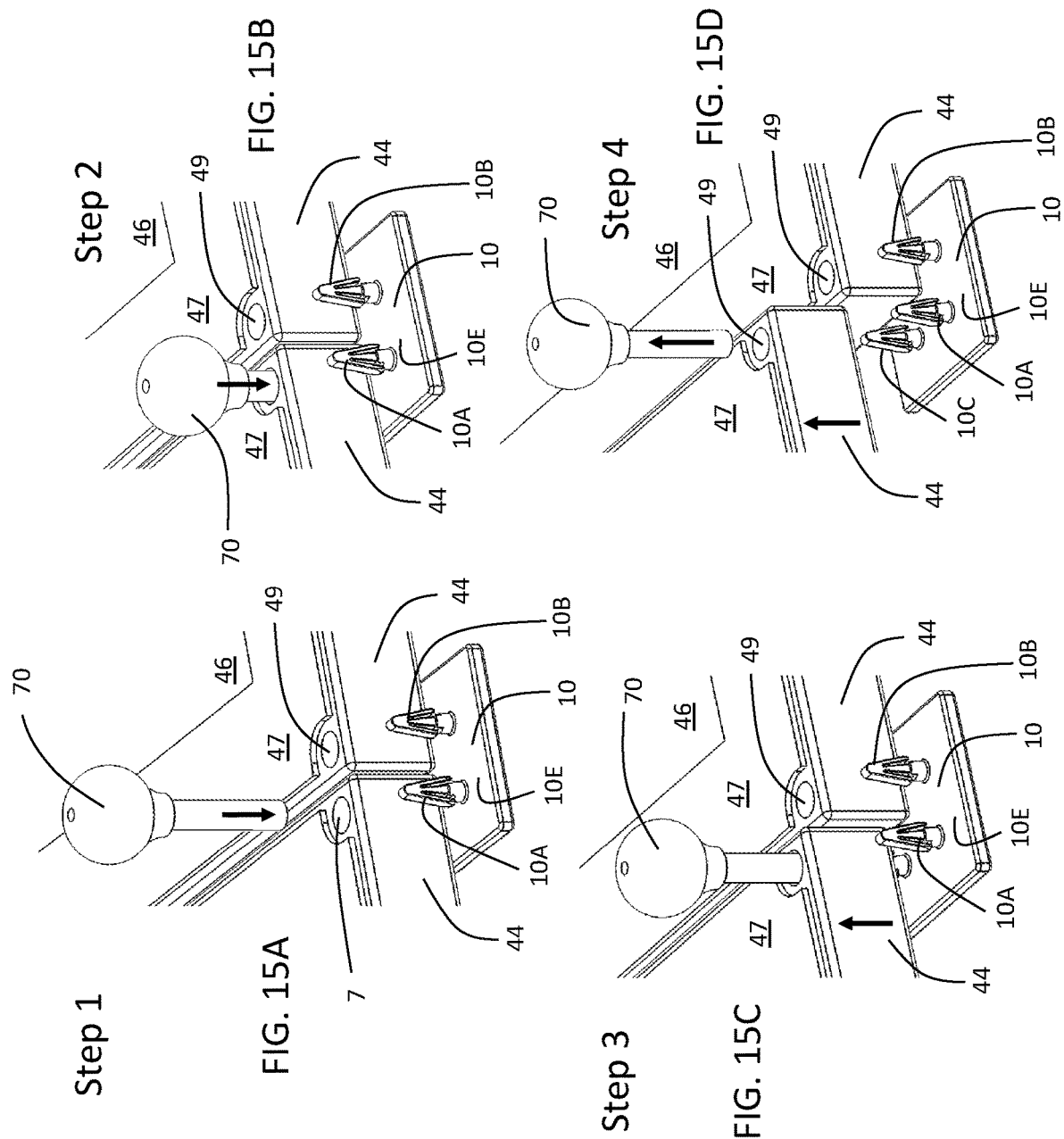

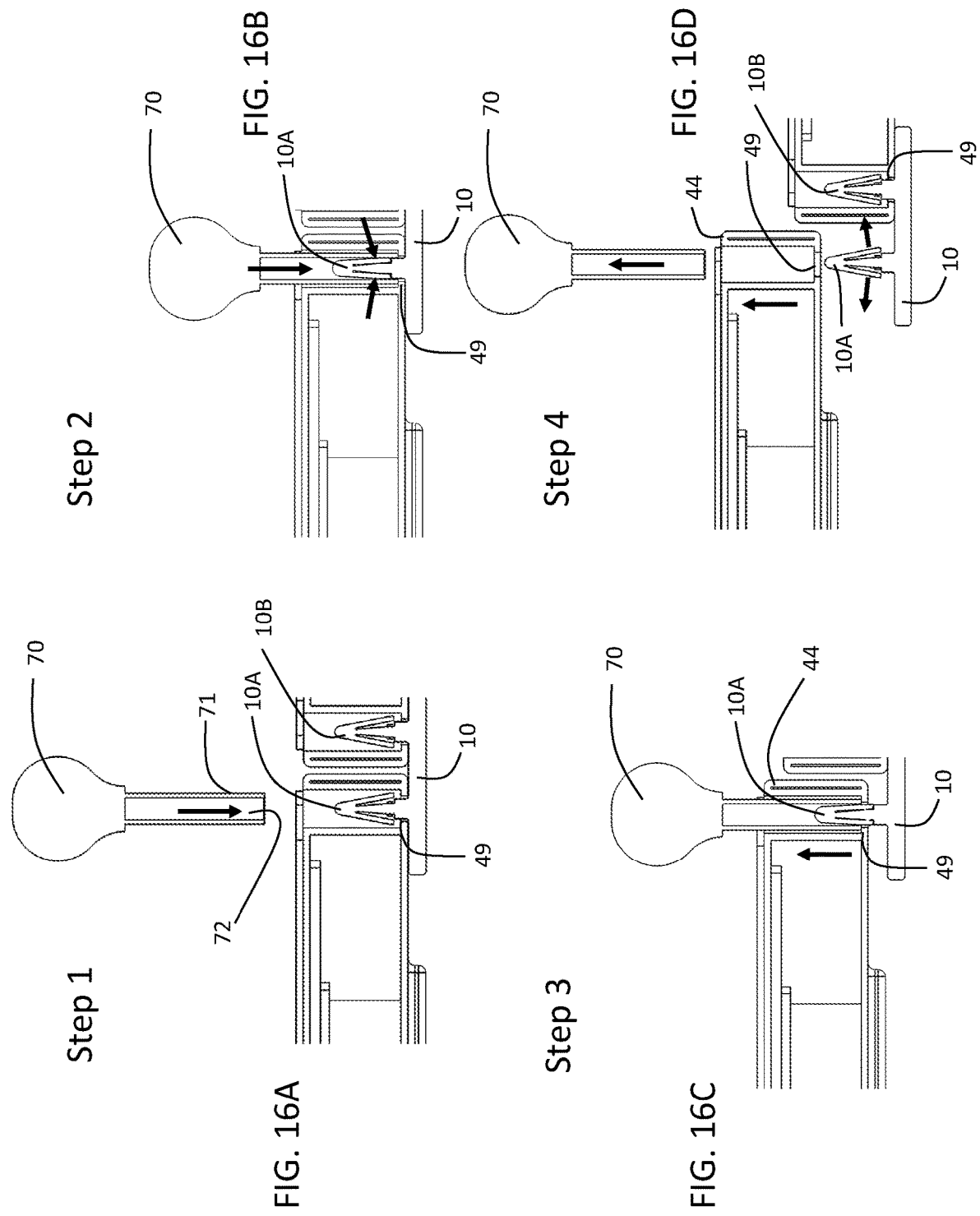

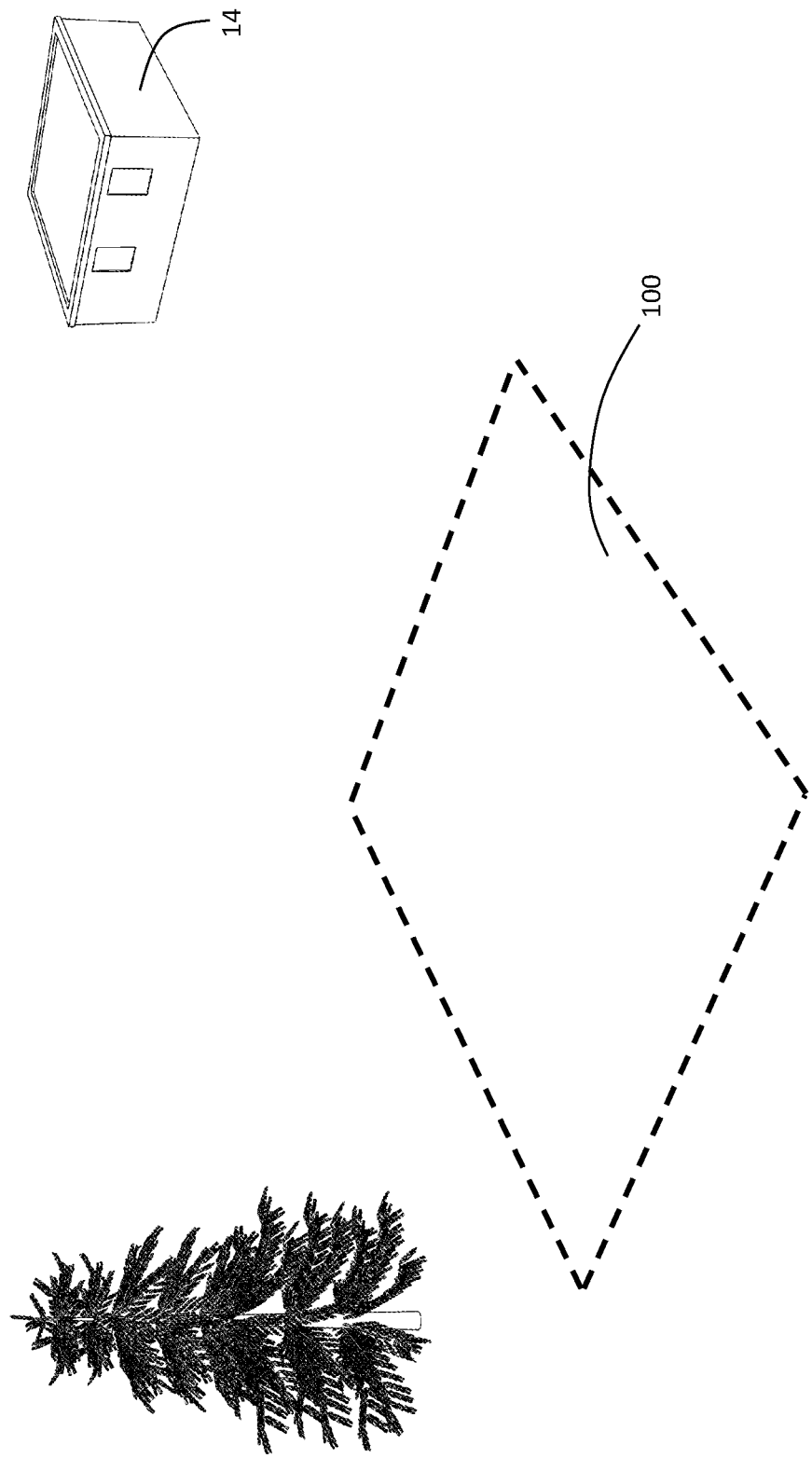

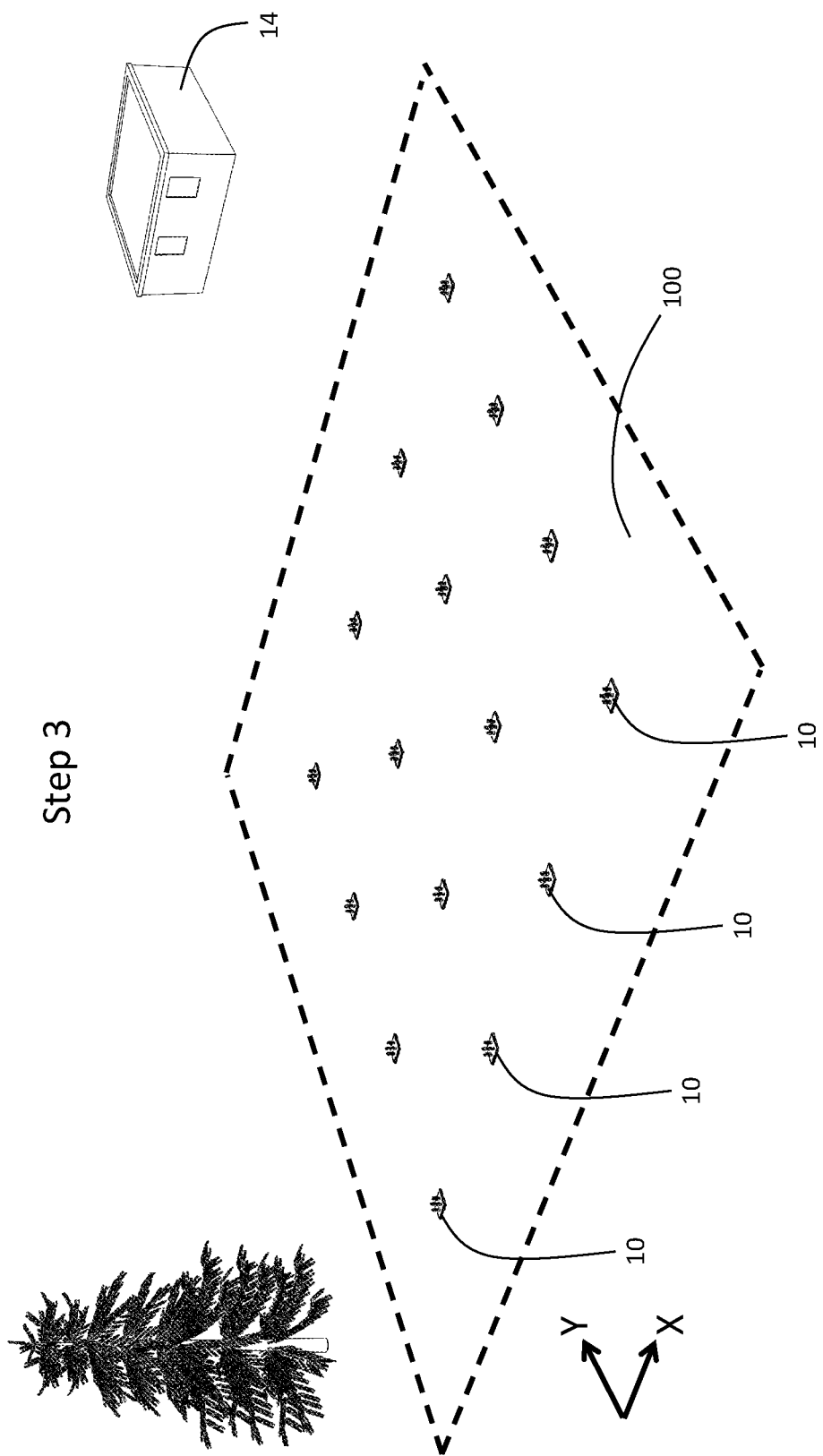

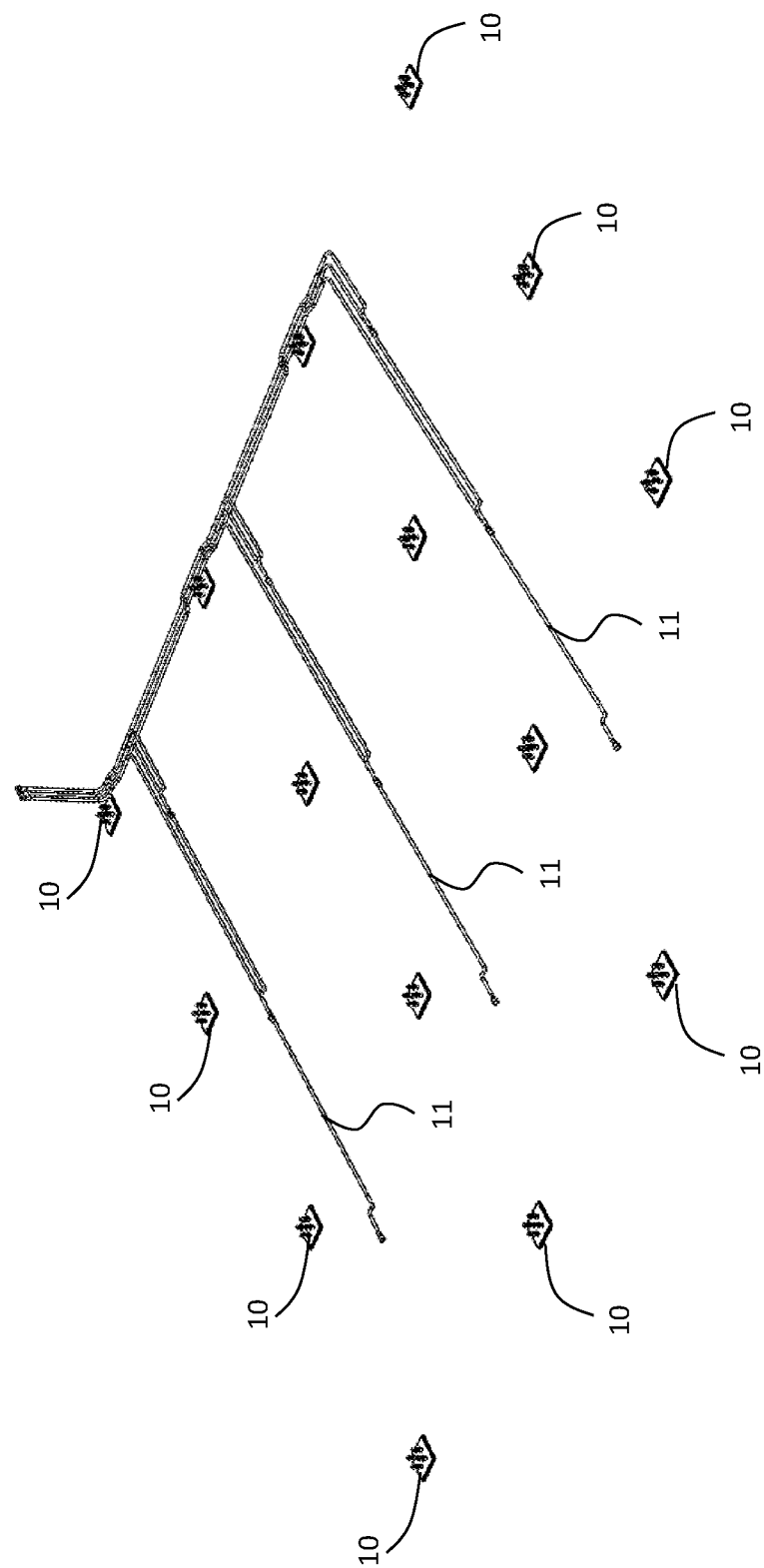

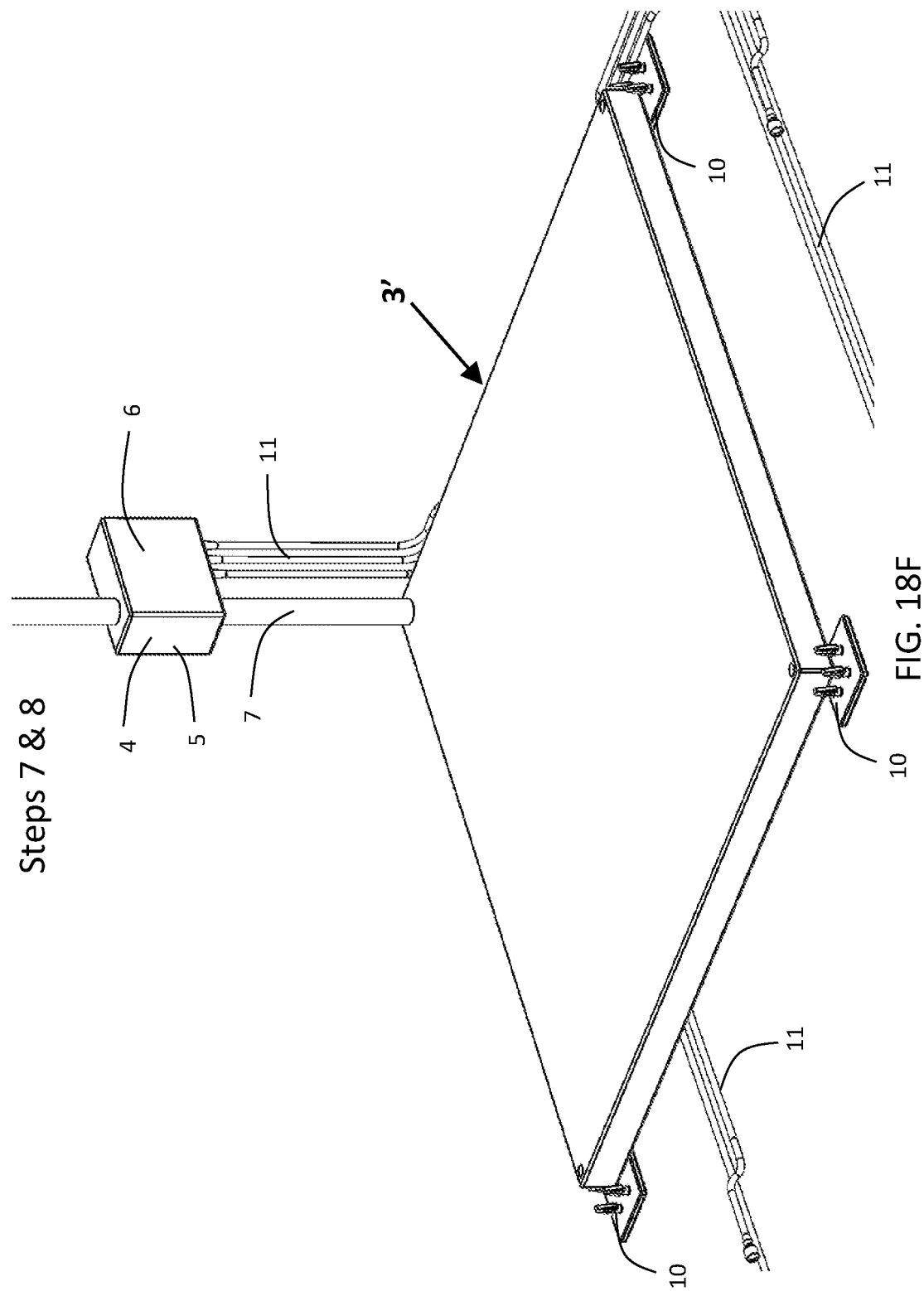

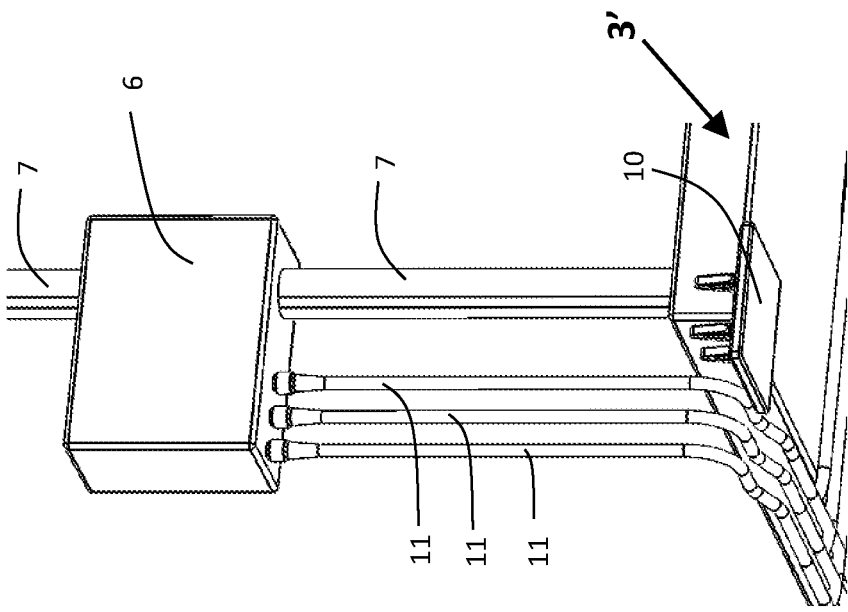
FIG. 18G1
FIG. 18G2

Steps 11 & 12
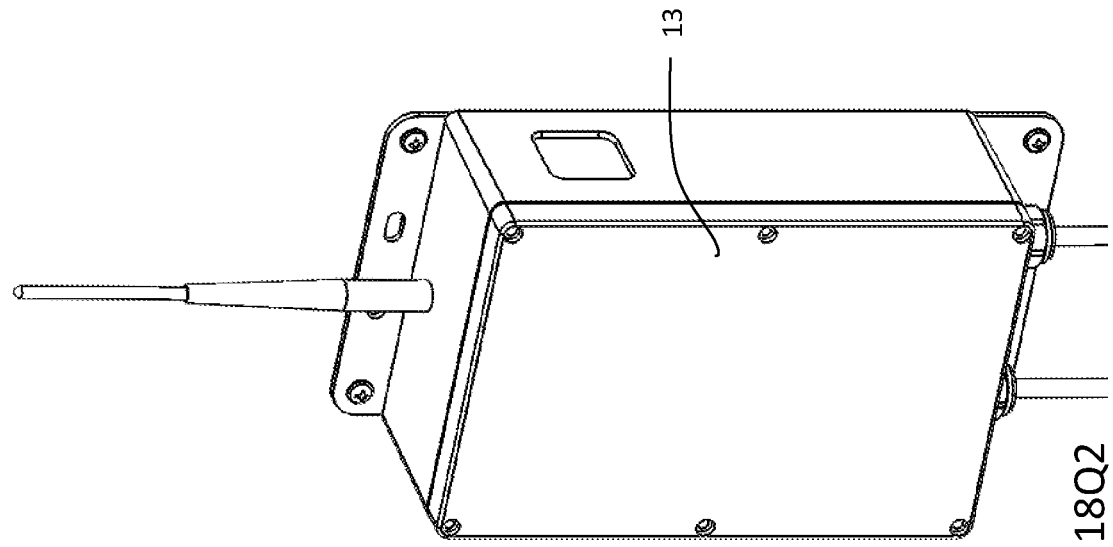
FIG. 18Q2
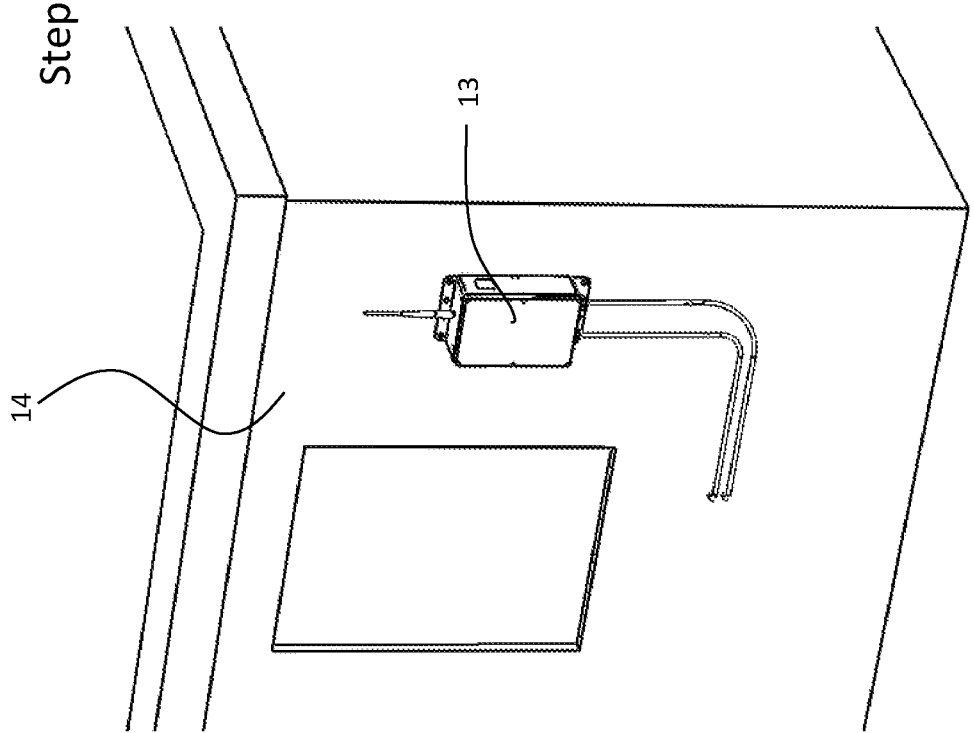
FIG. 18Q1

Processing Data to Determine Weighted Average SWE

Weighted Averaging Method Using Load Quality

1. Sampling and storing each SDCM load cell value (volts)

2. Determining snow pressure for each SDCM.

$$p = \frac{s\left(\sum_1^n LC_n\right)}{a}$$

$p$ = pressure on SDCM weighing plate $s$ = load cell sensitivity (force/volts)

$LC_n$ = load cell value (volts)

$n$ = load cell number $a$ = area of weighing plate

3. Determining SWE for each SDCM.

$$SWE = \frac{p}{\rho}$$

$SWE$ = snow water equivalents $\rho$ = density water

FIG. 20A

FLEXIBLE NETWORKED ARRAY FOR MEASURING SNOW WATER EQUIVALENT (SWE) AND SYSTEM NETWORK FOR PROVIDING ENVIRONMENTAL MONITORING SERVICES USING THE SAME

BACKGROUND OF INVENTION

Field of Invention

The present invention relates to improvements in methods of and apparatus for measuring and collecting snow water equivalent (SWE) in various snow packed environments, to assist environmental scientists, managers and consumers alike in making timely and intelligent decisions that protect our precious environmental resources and assist in attaining a viable level of sustainability.

Brief Description of the State of Knowledge in the Art

There are different predictive and analytical uses of snow water equivalent (SWE) data collected from remote and distributed regions of the Earth, such as high in the mountains where snow accumulations build up over the Winter months, and melt during the Spring. Such predictive and analytical uses include, but are not limited to: (i) water resource prediction for drinking water applications, winter recreation applications, and hyrdopower applications; (ii) flood risk assessment; and (iii) climate and environmental studies.

Currently, various types of apparatus are used to measure and collect SWE data for use in driving various data networks including: the US Geological Survey's National Water Information System (USGS) https://waterdata.usgs.gov/nwis/rt—providing current water data for the Nation; and various Web-based applications for viewing river flow data provided on river gage websites, using mobile applications such as RiverFlows from Subalpine Technologies, LLC.

The SNOTEL network provides an automated system of snowpack and related climate sensors operated by the Natural Resources Conversation Service (NRCS) branch of the United States Department of Agriculture in the Western USA. There are over 730 SNOTEL (or snow telemetry) sites in 11 states, including Alaska. The sites are generally located in remote high-mountain watersheds where access is often difficult or restricted. Access for maintenance by the NRCS includes various modes from hiking and skiing to helicopters. All SNOTEL sites measure snow water content, accumulated precipitation, and air temperature. Some sites also measure snow depth, soil moisture and temperature, wind speed, solar radiation, humidity, atmospheric pressure. These data are used to forecast yearly water supplies, predict floods, and for general climate research.

Basic SNOTEL sites have a pressure sensing snow pillow, storage precipitation gauge, and air temperature sensor. Each SNOTEL site can accommodate 64 channels of data and accept analog, parallel or serial digital sensors. On-site microprocessors provide functions such as computing daily maximum, minimum, and average temperature information. Generally, SNOTEL sites record sensor data every 15 minutes and send out reports during daily polls of all SNOTEL sites. Special polls are conducted more frequently in response to specific needs within the SNOTEL network.

Currently, a variety of manufacturers offer SWE measuring systems based on different principles of operation. Most of these SWE-measuring systems provide an alternative to the conventional pressure-sensing "snow pillow" developed back in the 1960's comprising a large 3×3 meter bladder lying on the ground, containing an environmentally safe antifreeze liquid, and connected to a manometer. Typically, the manometer reading will vary based on how much snow is sitting on the pillow. While this SWE-measuring snow sensor works well for many locations, it is more difficult to use.

As an alternative to "snow pillows", Sommer Messtechnik GmbH of Austria currently offers its modular Snow Scale SSG system for continuous measuring of the Snow-Water-Equivalent (SWE) of a snow pack capable of measuring up to 200 to 3000 mm of SWE. The SSG system is constructed from four load cell sensors mounted under a central perforated aluminum panel and surrounded by six surrounding perforated aluminum panels, allowing water to percolate through the sensor, reducing the effects of ice bridging to a minimum, and optimizing thermal flow between sensor and ground for high accuracy during the melting process. The seven (80×120 cm) perforated aluminum plates used to construct the system are screwed on a frame which consists of six plate profiles and two L-profiles. The perforated aluminum panels minimize the thermal differences between the sensor and the ground, by allowing the perforated aluminum panels to surround and buffer the center panel where the SWE is measured, from stress concentrations developed along the perimeter of the sensor. As disclosed, this prior art system allows accurate measurements even during periods of rapid snow settlement followed by large snow accumulations. To assemble and install this system, a substantially even underground is necessary, and a maximum inclination of 5 degrees should not be exceeded.

Campbell Scientific offers its CS725 SWE sensor for measuring snow-water equivalent (SWE) by passively detecting the change in naturally occurring electromagnetic energy from the ground after it passes through snow cover. The Campbell Scientific CD725 SWE sensor is mounted above the ground and has no contact with the snow. As the snow pack increases, the sensor detects the attenuation of electromagnetic energy transmitted from the ground, and based on this detected attenuation, the SWE can be calculated. The measurement area of the CS725 SWE sensor is 50 to 100 square meters (540 to 1,075 square feet).

2KR Systems offers its SNOWSCALE SSC300 precision Snow Water Equivalent (SWE) measurement instrument designed for quick assembly and implementation in the field. The SSC300 utilizes temperature compensated micro-machined silicon strain gauges for accurate SWE measurements—with no liquid anti-freeze needed. Direct measurement of the weighing plate at each of the three contact points eliminates ambiguities. A broad outer skirt minimizes the effects of ice bridging commonly experienced late in the measurement season. The use of lightweight aluminum materials minimizes thermal resistance improving heat flow throughout the device for better emulation of natural conditions. The SSC300 can be connected to existing weather stations or supplied as a turnkey solution.

While such alterative SWE measuring systems offer advantages over the conventional "snow pillow" sensor, such prior art systems and devices suffer from a number of shortcomings and drawbacks.

For example, the Sommer SSG sensor requires a relative flat ground surface for assembly and installation, which limits deployment. Also, this system is not designed to scale to meet the many different application requirements present in the marketplace. Installation time is relatively long compared to other systems.

The Campbell Scientific CS725 sensor, on the other hand, requires a large footprint for installation, poses danger and risks to wildlife, is not considered reliable in comparison with other methods of SWE measurement and is relatively expensive.

In view of the above, significant improvements are needed in SWE data collection and distribution systems, while advancing the state of the art in this technical field, without abandoning the many benefits conventional technologies seek to offer.

OBJECTS AND SUMMARY OF THE PRESENT INVENTION

Accordingly, a primary object of the present disclosure is to provide new and improved methods of and apparatus for remotely measuring and gathering SWE-based intelligence and various forms of information relating to snow water equivalent (SWE) measurements, so as to assist environmental managers in making timely and intelligent decisions and protecting our precious environmental resources, and attaining a viable level of sustainability.

Another object of the present invention is to provide a new and improved system network for providing environmental monitoring services using a distributed system of flexible networked arrays for measuring snow water equivalent (SWE) in GPS-indexed regions on Earth.

Another object of the present invention is to provide a new and improved method of measuring snow water equivalent (SWE) using a flexible array of networked snow data collection modules (SDCMs) interconnected using a set of connecting and mounting plates that allow the SDCMs to (i) be installed on ground surfaces having variable surface geometry that may exhibit convexity or concavity, and (ii) enable collection of snow data measurements over a relative wide spatial area, for improved accuracy in SWE measurement.

Another object of the present invention is to provide a new and improved method of measuring SWE using a snow data collection module (SDCM) employing a plurality of electronic load cells mounted beneath a snow load weigh plate and contained within a frame that is sealed off from the natural elements, and networkable with a multiplexing and data supplying module that is connectable to a central data processing module (CDPM), where SWE data processing is carried out and transmitted to a Web-based data center.

Another object of the present invention is to provide such a network of snow data collection modules (SDCMs) that are easily connectable together to form a surface-adaptable (i.e. flexible) array of snow data collection modules (SDCMs) for measuring the SWE of snow packed regions at distributed locations on the Earth, to feed conventional snow load information networks currently deployed around the world.

Another object of the present invention is to provide such a network of snow data collection modules (SDCMs) that are easily connectable together to form 2×2, 3×3, 4×4 or larger matrices of active weighing surfaces in order to maintain a favorable snow depth to total weigh plate length (SD/TWPL) ratio for improved accuracy in deeper snow.

Another object of the present invention is to provide a flexible SWE measuring array comprising a plurality of SDCMs physically configured into an array of SDCMs that can adapt to ground surfaces having 10% or more ground pitch deviation, thereby making installation and maintenance simpler and less expensive in comparison to other systems.

Another object of the present invention is to provide a new and improved snow data collection module (SDCM) containing a plurality of electronic snow load sensors mounted within a water-sealed frame that can be submerged in and operated while under water.

Another object of the present invention is to provide a flexible SWE measuring array comprising an array of active SDCMs in combination with a set of transition plates connected to the array of active SDCMs, and having sloped edge transition surfaces to help maintain a uniform thermal temperature gradient across the SWE array.

Another object of the present invention is to provide a new and improved SWE-measuring networked array that offers improved ground-surface temperature equalization across the entire networked array, by virtue of its perimeter extending zone of sloped transition modules that are connected around a grid of networked snow data collection modules (SDCMs) located at the center of the SWE-measuring networked array.

Another object of the present invention is to provide a new and improved method of measuring the SWE of a snow packed layer beneath a SWE-measuring networked array of snow data collecting modules (SDCMs) configured in accordance with the principles of the present invention.

These and other objects will become apparent hereinafter and in the Claims to Invention appended hereto.

BRIEF DESCRIPTION OF THE DRAWINGS

In order to more fully understand the Objects, the following Detailed Description of the illustrative embodiments should be read in conjunction with the accompanying Drawings, wherein:

FIG. 5C is a plan view of the 25-module type flexible SWE-measuring networked array shown in FIGS. 5A and 5B, wherein each active snow data collection module (SDCM) is indexed with an index, namely, SDCMi, and a coordinate (x,y) indicating the center of the snow data collection module with respect to the entire SWE measuring array;

FIG. 5F is an elevated side view of the 5×5 grid flexible SWE-measuring networked array of the present invention, supported on the Earth ground, and covered with a first layer of snow and air;

FIG. 5G is an elevated side view of the 5×5 grid flexible SWE-measuring networked array of the present invention, supported on the Earth ground, and covered with a second, much deeper layer of snow and air;

FIG. 8A is a top perspective view of a snow data collection module (SDCM) showing its snow load measuring surface supported within a frame structure having four corner connecting and mounting plates that cooperate to couple the corners of the snow data collection modules (SDCMs) together into a flexible networked SDCM array of a particular grid size, required by the application at hand;

FIG. 8B is a bottom perspective view of a snow data collection module showing the underside of the frame structure that has four connecting and mounting plates, each of which cooperates with the corners of up to four neighboring snow data collection modules so as to flexibly couple these neighboring SDCMs together into a flexible SDCM-based SWE-measuring networked array of a particular grid size determined by the number of SDCMs employed in the array construction;

FIG. 8C is a first elevated cut-away cross-sectional view of a snow data collection module shown in FIGS. 8A and 8B, showing its snow load measuring surface supported within a frame structure;

FIG. 8D is a second elevated cut-away cross-sectional view of a snow data collection module shown in FIGS. 8A and 8B, showing its snow load measuring surface supported within a frame structure;

FIG. 9A is an elevated partially cut away view of a corner portion of the snow data collection module of the present invention, showing the snow load measuring surface/plate disposed flush with the top edge surface of the support frame when no snow load pack is present on the snow load measuring plate surface;

FIG. 9B is an elevated partially cut away view of a corner portion of the snow data collection module of the present invention, showing the central portion of the snow load measuring surface is disposed beneath the top edge surface of the support frame when a first layer of snow load is present on the snow load measuring plate (surface), and undergoing a first degree of deflection in response to the snow load;

FIG. 9C is an elevated partially cut away view of a corner portion of the snow data collection module (SCDM) of the present invention, showing that the entire portion of the snow load measuring surface is disposed below top edge surface of the support frame when a second layer of snow load is present on the snow load measuring plate (surface), and undergoing a second degree of deflection in response to the snow load;

FIG. 10 is an perspective view of the snow data collection module of the present invention, showing its snow load measuring plate removed for purposes of illustration, and a corner connecting and mounting plate installed in each corner of the snow data collection module (SDCM) used in constructing the SWE-measuring networked array of the present invention;

FIG. 11 is an enlarged perspective view of the connecting and mounting plate used in the corner of each snow data collection module (SDCM) of the present invention;

FIG. 12A is an elevated cross-sectional view showing how the first step in a method of mechanically coupling neighboring snow data collection modules (SDCM) together by their corners using a connecting and mounting plate of the present invention having four barbed mounting posts projecting from a rectangular plate portion, and each barbed post passing through a circular bore formed in the underside corner of the rectangular support frame of the snow data collection module (SDCM) of the present invention;

FIG. 12B is an elevated cross-sectional view showing how the second step in a method of mechanically coupling neighboring snow data collection modules (SDCMs) together by their corners using a connecting and mounting plate of the present invention having four barbed mounting posts projecting from a rectangular plate portion, and each barbed post passing through a circular bore formed in the underside corner of the rectangular support frame of the snow data collection module (SDCM);

FIG. 12C is an elevated cross-sectional view showing how the third step in a method of mechanically coupling neighboring snow data collection modules (SDCMs) together by their corners using a connecting and mounting plate having four barbed mounting posts projecting from a rectangular plate region, and each barbed post passing through a circular bore formed in the underside corner of the rectangular support frame of the snow data collection module;

FIG. 12D is perspective view showing an array of four snow data collection modules (SDCMs) mechanically-coupled together by their corners using a set of connecting and mounting plates, each connecting and mounting plate having four barbed mounting posts projecting from a rectangular plate region, and each barbed post passing through a circular bore formed in the underside corner of the rectangular support frame of the snow data collection module (SDCM);

FIG. 12E is perspective partially cut away view of the array of snow data collection modules shown in FIG. 12D, wherein a pair of adjacent snow data collection modules (SDCMs) are mechanically-coupled together by a connecting and mounting plate, allowing the adjacent snow data collection modules to be supported on the ground surface in a vertically offset manner to one another, as shown by the straight dotted line drawn in the figure, and corresponding FIG. 13A;

FIG. 12F is perspective partially cut away view of the array of networked snow data collection modules (SDCMs) shown in FIG. 12D, wherein a pair of adjacent snow data collection modules are mechanically-coupled together by a connecting and mounting plate, allowing the adjacent snow data collection modules to be supported on the ground surface in different planes and angled relative to each other, as shown by pair of diverging dotted lines drawn in the figure and corresponding FIG. 13B;

FIG. 13A is an elevated side view of the pair of adjacent snow data collection modules (SCDMs) that are mechanically-coupled together in FIG. 12E, allowing the adjacent snow data collection modules to be supported on the ground surface in substantially the same plane;

FIG. 13B is an elevated side view of the pair of adjacent snow data collection modules that are mechanically-coupled together in FIG. 12F, allowing the adjacent snow data collection modules to be supported on the ground surface in substantially different planes and angled relative to each other;

FIGS. 15A, 15B, 15C and 15D are perspective views of a pair of adjacent snow data collection modules (SDCMs) physically-coupled by a connecting and mounting plate, wherein through the use of a special tool, the snow data collection modules (SDCMs) can be released and decoupled through a four-step process illustrated in these views;

FIGS. 16A, 16B, 16C and 16D are cross-sectional views of the pair of adjacent snow data collection modules (SDCMs) physically-coupled by a connecting and mounting plate, as shown in corresponding FIGS. 15A, 15B, 15C and 15D, respectively, wherein through the use of the special tool, the snow data collection modules can be released and decoupled through a four step process illustrated in this views, wherein the barbed flanges on each mounting post is compressed by the tool as shown in FIGS. 16A and 16B, as the support frame of the snow data collection module is pulled up and out from the connecting and mounting plate as shown in FIGS. 16C and 16D;

FIG. 18A is a schematic representation of Steps 1 and 2 in the method of assembly and installation depicted in FIG. 17, showing an outline 100 where the ground components are to be placed;

FIG. 18B is a schematic representation showing the placement of snap-fit corner connecting and mounting plates in the appropriate corner locations for each snow data collection module (SDCM) shown in FIG. 1;

FIG. 18C is a schematic representation showing placing SDCM cables on the ground surface;

FIGS. 18F, 18G1 and 18G2 are schematic representations showing the installing of the data multiplexing and power distribution module (DMPDM), and connecting the SDCM cable to the DMPDM;

FIGS. 18L, 18M, 18N, 18O and 18P are schematic representations showing installing ground-surface translation plates around the perimeter of the active-region of the SDCM-based SWE-measuring array;

FIG. 18Q1 shows a building near the SWE networked array installation site showing connecting and establishing a communication interface with a cellular or wired IP gateway, and as required, installing an internet gateway at the electrical power and internet source;

FIG. 18Q2 is a perspective view of the cellular or wired IP gateway show in FIG. 18Q1;

FIGS. 20A, 20B and 20C, taken together, provide a flow chart describing the steps associated with processing data to determine weighted average snow water equivalent (SWE), based on weighted averaging method using load quality, comprising the steps of (i) sampling and storing each SDCM load cell value (in volts), (2) determining the snow pressure for each SDCM using the formula set forth in Block 2, (3) determining the SWE for each SDCM using the formula shown in Block 3, (4) determining the average SWE from the individual SDCM SWE values computed in the SWE array using the formula shown in Block 4, (5) determining individual SDCM SWE value distance from the average, by taking the absolute value of the difference between the individual SWE values and average SWE using the formula shown in Block 5, (6) determining the standard deviation (population method) for the SDCM SWE data set—STD-DEV, (7) determining the number of standards each individual SDCM SWE value is from the average SWE by dividing the SDCM SWE value distance by the standard deviation according to the formula shown in Block 7, and (8) establishing the rejection gain (typically between 0.20 and 0.50)=RG, (9) determining the individual SWE value weighting factor using the formula provided in Block 9, (10) determining the sum of factors by summing the individual SWE value weighing factor shown in Block 10, (11) determining the normalized weighting using the formula shown in Block 11, (12) determining the adjusted SWE value using the formula shown in Block 12, and (13) determining the weighted average SWE by summing the adjusted values shown in Block 13;

DETAILED DESCRIPTION OF THE ILLUSTRATIVE EMBODIMENTS OF THE PRESENT INVENTION

Figure 1A:
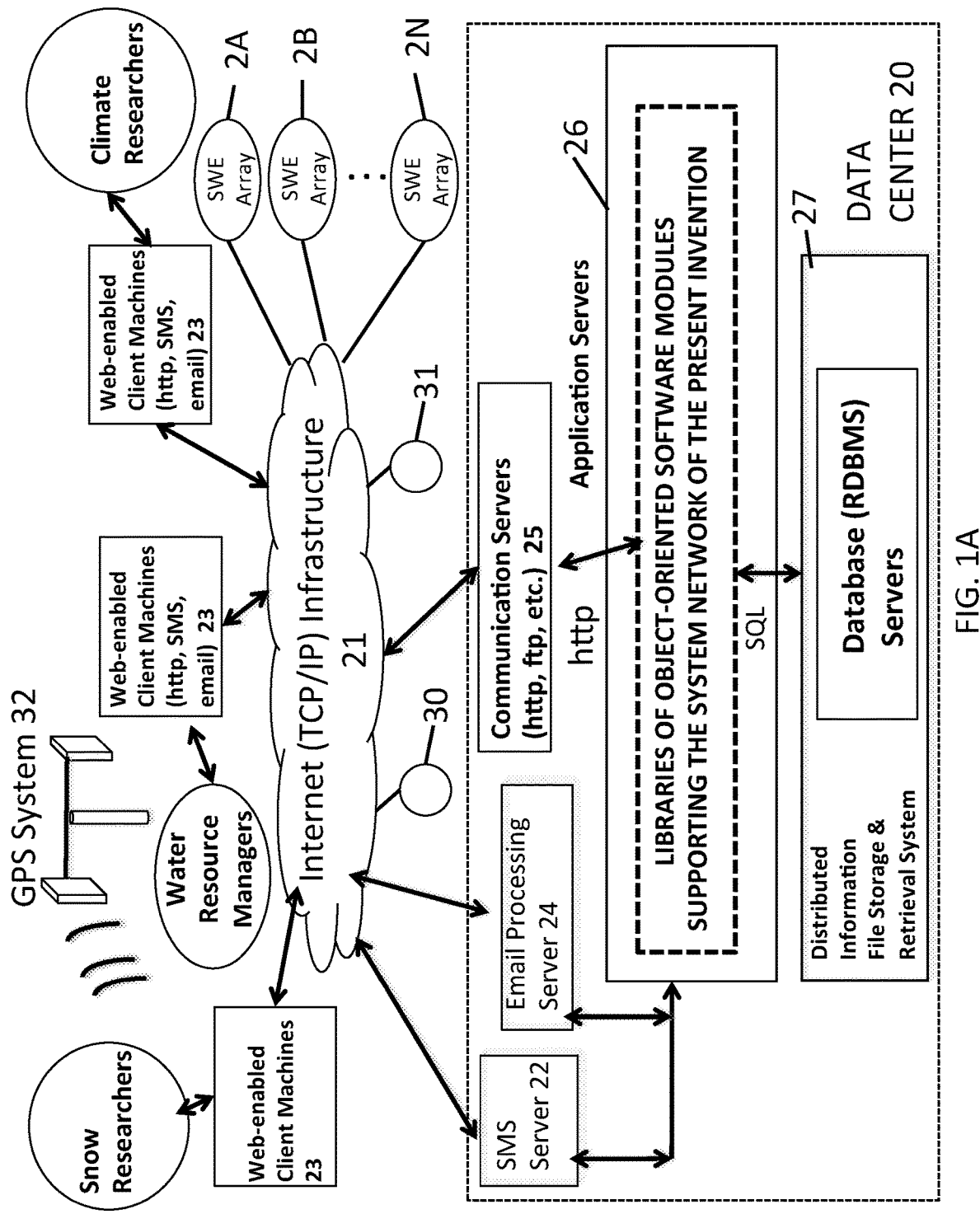
FIG. 1A is a high-level network diagram showing the primary components of system network supporting the SWE-data measurement, collection and delivery network of the present invention including distributed systems of flexible, ground-surface-adaptable networked arrays of SWE-measuring modules (i.e. snow data collection modules or SDCMs) designed for measuring snow water equivalent (SWE) of snow packs in remote areas, and transmitting this collected SWE data to one or more data centers wirelessly interconnected to these flexible networked SWE measuring arrays via TCP/IP, cellular phone and SMS messaging systems deployed on the Internet, so that Web-enabled client machines can access such SWE information from weather forecasting, social media, financial and environmental management websites.

Referring to the figures in the accompanying Drawings, the illustrative embodiments of the system and methods will be described in great detail, wherein like elements will be indicated using like reference numerals.

Meteorological Intelligence is defined as information measured, gathered, compiled, exploited, analyzed and disseminated by meteorologists, climatologists and hydrologists to characterize the current state and/or predict the future state of the atmosphere at a given location and time. Meteorological intelligence is a subset of Environmental Intelligence and is synonymous with the term Weather Intelligence.

A primary object of the present invention is to provide an Internet-based system network that supports automated and semi-automated meteorological and environmental intelligence gathering, assessment and decision-support operations so that environmental managers and personnel can make more informed, intelligent and timely decisions that impact the management of water resources around the world. These goals and objectives will become more apparent hereinafter as the system and methods of the present invention are described in great technical detail herein below.

Overview on the Environmental Intelligence Gathering, Assessment and Decision-Support System of the Present Invention The system of the present invention 1 is designed to help environmental managers in significant ways, namely: (i) improve the use and conservation of water resources in the best interests of society and its inhabitants; (ii) reduce the cost of managing water resources by providing improved SWE-measuring instrumentation that can be installed at more locations over a particular geographical region, and maintained at a significantly less cost than other SWE-measuring technologies, and (iii) reduce the risk of disruption of business and rental and/or operating income created by unforeseen conditions created by snow and water in a particular geographical region.

By design, the system network can be readily integrated with (i) conventional environmental management systems, (ii) emergency response networks, and (iii) other systems and networks, to support the goals and objectives of the present invention.

Figure 1B:
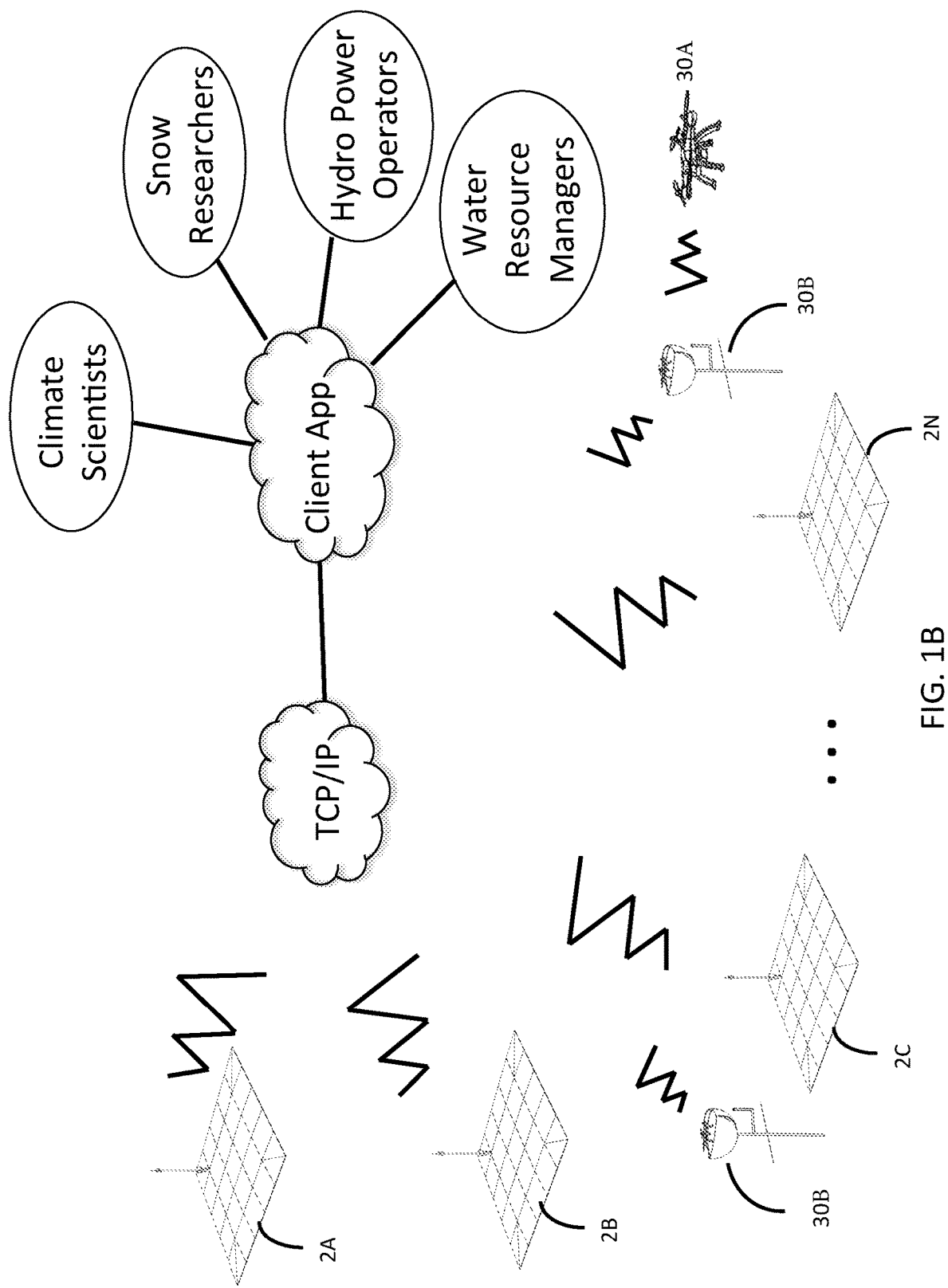
FIG. 1B is a schematic representation showing a plurality of flexible ground-surface-adaptable SWE measuring networked arrays in wireless communication with the TCP/IP infrastructure of the Internet, wherein each SWE measuring networked array is supported by local drone-based snow depth data collection systems for measuring snow-depth and carrying out in-field experiments and testing useful in environmental lab testing operations.
Figure 17:
FIG. 17 is a flow chart describing the steps associated with a method of system assembly and installation, shown comprising (1) identifying the installation location for the ground components, (2) leveling and smoothing the ground surface to extent possible for the installation, (3) placing snap-fit corner connecting and mounting plates in the appropriate corner locations for each snow data collection module (SDCM), (4) placing SDCM cables on the ground surface, (5) connecting SDCM cable to Master SDCM with CDPM mast structure, (6) installing master SDCM on the ground surface, (7) installing data multiplexing and power distribution module (DMPDM), (8) connecting SDCM cable to the DMPDM, (9) connecting each SDCM cable to its respective SDCM and setting the SDCM to the snap-fit corner connection plates into an SDCM array, (10) installing ground-surface translation plates around the perimeter of the SDCM array, (11) connecting and establishing a communication interface with a cellular or wired IP gateway, and (12) if required, installing an internet gateway at the electrical power and internet source.

Specification of the Environmental Intelligence Gathering, Assessment and Decision-Support System of the Present Invention FIGS. 1A and 1B show the environmental intelligence gathering, assessment and decision-support system 1 of the present invention deployed across a distributed system network of flexible, surface-contour-adaptable snow water equivalent (SWE) networked arrays 2 (i.e. 2A, 2B, . . . 2N). Each SWE-measuring networked array 2 is constructed from one or more snow data collection modules (SDCMs) 3 illustrated in FIGS. 7 through 11, and inter-connected as illustrated in FIGS. 13A through 16D. Each SWE-measuring networked array 2 is installed at a location on the Earth as shown in FIGS. 17 through 18R, and then operated as illustrated in FIGS. 19 through 21D.

FIG. 1A shows the system network supporting the SWE-data measurement, collection and delivery network 1 of the present invention including distributed systems of flexible, ground-surface-adapting networked arrays 2 of snow data collection modules (SDCM) 3 designed for measuring snow water equivalent (SWE) of snow packs located in remote GPS-tracked regions on Earth. Each flexible SWE-measuring networked array 2 is connected to the data center 20 via TCP/IP infrastructure 21 of the Internet. In the preferred embodiment, the data center 20 includes: cellular phone and SMS messaging systems and servers 22 deployed on the Internet; email server systems 24, web/http (ftp and other) communication servers 25, application servers 26, and database servers 27 and the like are also operably connected to the TCP/IP infrastructure 21 of the Internet. Also, as illustrated in FIG. 1A, the SWE data measurement, collection and distribution network of the present invention 1 uses GPS services provided a GPS network 32 currently deployed around the Earth. Measured and collected SWE-data is published by the web communication servers 25, SMS servers 22, and email servers 24, and remotely accessible by the Web-enabled client machines 23 (e.g. mobile computers, smartphones, laptop computers, workstation computers, etc.) deployed in the system network in a manner well known in the art.

FIG. 1B shows a plurality of flexible SWE-measuring networked arrays 2 in communication with the wireless TCP/IP infrastructure 21 of the Internet shown in FIG. 1A. Each SWE-measuring networked array 2 is supported by local drone-based systems 30, each comprising an unmanned drone-type aircraft 30A and a stationary base station 30B, for carrying out snow-depth measurements, as well as in-field experiments and testing, useful in environmental lab testing operations. Details regarding drone-based snow depth measuring and profiling systems are described in great technical detail in Applicants' copending U.S. patent application Ser. No. 15/794,263, titled "Building Rooftop Intelligence Gathering, Decision-Support And Snow Load Removal System For Protecting Buildings From Excessive Snow Load Conditions, And Automated Methods For Carrying Out The Same" filed on Oct. 25, 2017, and incorporated hereby reference in its entirety.

Figure 2:
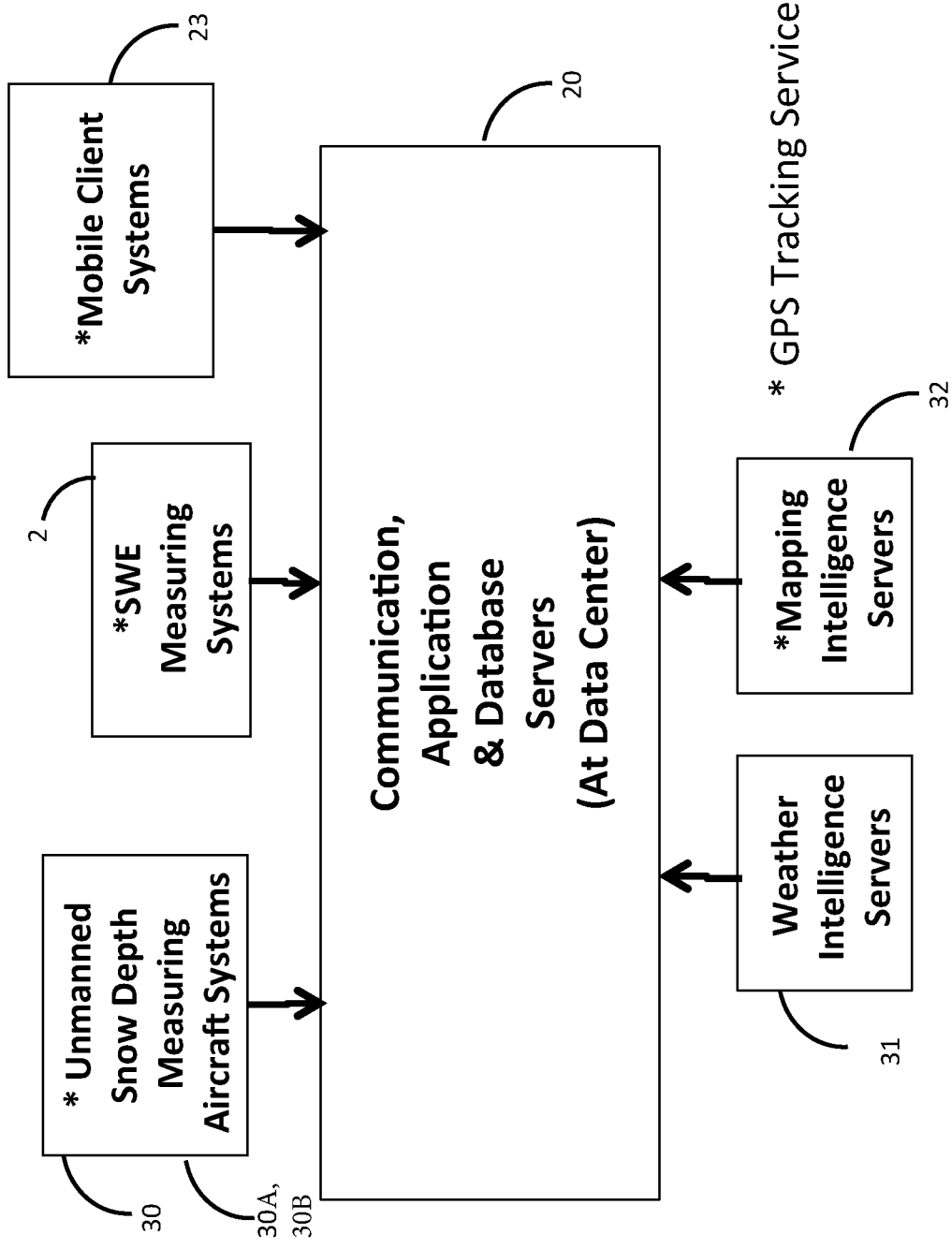
FIG. 2 is a schematic block diagram illustrating the various sources of environmental intelligence being collected by the system network of the present invention (e.g. SWE measurement systems, unmanned drone-based snow depth measuring (SDM) systems, weather intelligence servers, mapping intelligence systems, mobile client systems, etc.) used to measure, collect and otherwise gather environmental intelligence, including SWE measurements, relied on by environmental scientists and managers during rational environmental management and planning.

FIG. 2 illustrates the various kinds of environmental intelligence being collected by various sources on the system network of the present invention, specifically: SWE data measurements by the SWE measurement array systems 2; snow depth profiles from unmanned drone-based snow depth measuring (SDM) systems 30; weather intelligence servers 31; mapping intelligence systems 32; and mobile client systems 23. These systems gather environmental intelligence, including SWE measurements, which are relied on by scientists and managers during rational environmental management and planning operations, and also shared with consumers on weather forecasting sites, social media pages, financial websites, recreational websites, and the like.

Different Predictive Uses for Collected and Distributed SWE Data

Figure 3:
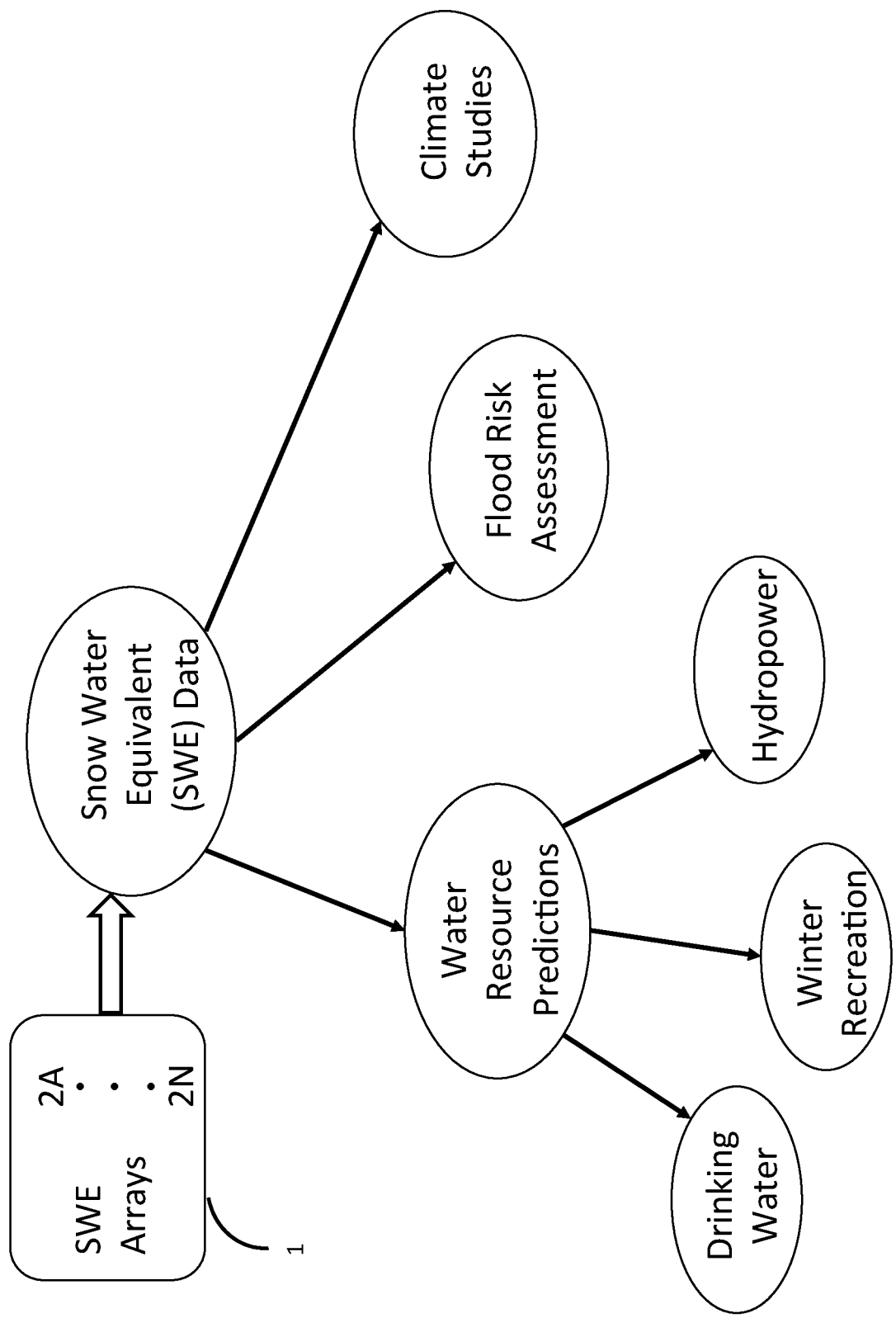
FIG. 3 is a tree-type representation illustrating the many different predictive analytical uses that stem from the collection and distribution of SWE data using the system network of the present invention, including, but not limited to, (i) water resource predictions for drinking water application, winter recreation applications, and hydropower applications, (ii) flood risk assessment, and (iii) climate and environmental studies.

FIG. 3 illustrates the many different predictive analytical uses that stem from the collection and distribution of SWE data. Such uses include, but are not limited to, (i) water resource predictions for drinking water application, winder recreation applications, and hydropower applications, (ii) flood risk assessment, and (iii) climate and environmental studies. By providing more accurate and economical ways of remotely measuring SWE, these predictive applications will be enhanced in significant ways by using more geographically diverse and reliable sources of SWE data to drive end-user applications.

Figure 4B:
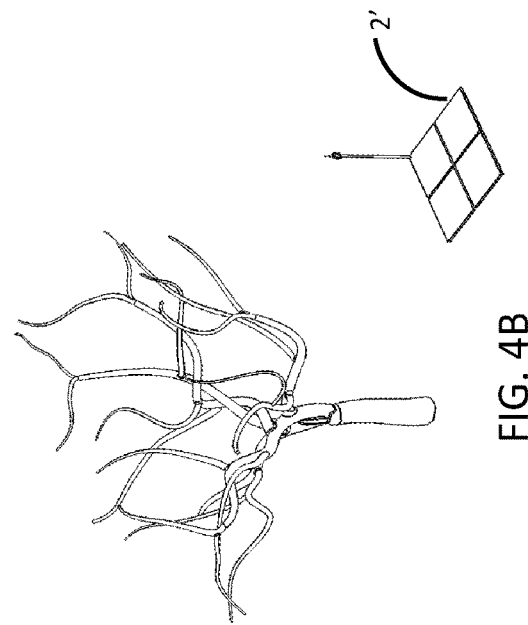
FIG. 4B illustrated a 4-module type flexible SWE measuring networked array deployed in a remote region, with wireless connectivity to the TCP/IP infrastructure and GPS systems deployed about the Earth.
Figure 4D:
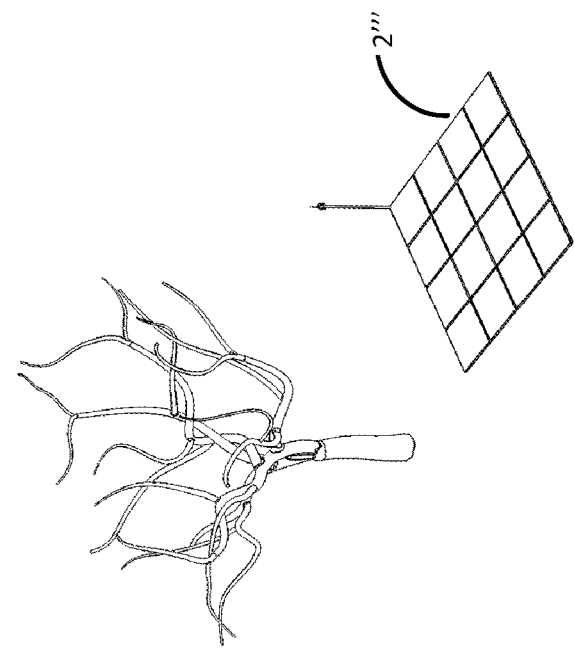
FIG. 4D illustrated a 16-module type flexible SWE measuring networked array deployed in a remote region, with wireless connectivity to the TCP/IP infrastructure and GPS systems deployed about the Earth.
Figure 4A:
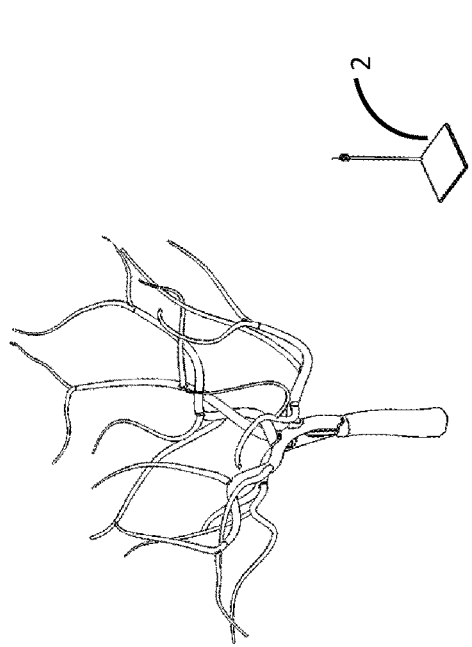
FIG. 4A illustrates a 1-module type flexible SWE measuring networked array deployed in a remote region, with wireless connectivity to the TCP/IP infrastructure and GPS systems deployed about the Earth.

Different Configurations of SWE-Measuring Networked Arrays Constructed in Accordance with the Principles of the Present Invention In FIGS. 4A through 4D, different active-grid sized SWE-measuring networked arrays are constructed using the snow data collection module (SDCM) 3 shown and described herein. FIG. 4A shows a flexible 1-module SWE-measuring networked array 2 according to the present invention deployed in a remote region, with wireless connectivity to the TCP/IP infrastructure 21 and GPS systems 32 deployed about the Earth.

FIG. 4B shows a flexible 4-module SWE-measuring networked array 2' deployed in a remote region, with wireless connectivity to the TCP/IP infrastructure 21 and GPS systems 32 deployed about the Earth.

Figure 4C:
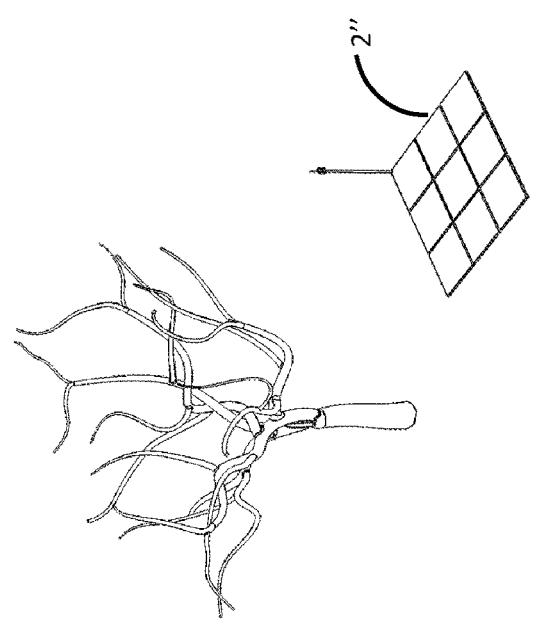
FIG. 4C illustrated a 9-module type flexible networked SWE measuring networked array deployed in a remote region, with wireless connectivity to the TCP/IP infrastructure and GPS systems deployed about the Earth.

FIG. 4C shows a flexible 9-module networked SWE array 2" deployed in a remote region, with wireless connectivity to the TCP/IP infrastructure 21 and GPS systems 32 deployed about the Earth FIG. 4D show a flexible 16-module networked SWE array 2' deployed in a remote region, with wireless connectivity to the TCP/IP infrastructure 21 and GPS systems 32 deployed about the Earth. Each SWE-measuring networked array 2 shown in FIGS. 4A through 4D will be constructed using SDCMs 3 and transition plates 9 shown and described in FIGS. 6 through 13B.

Figure 5A:
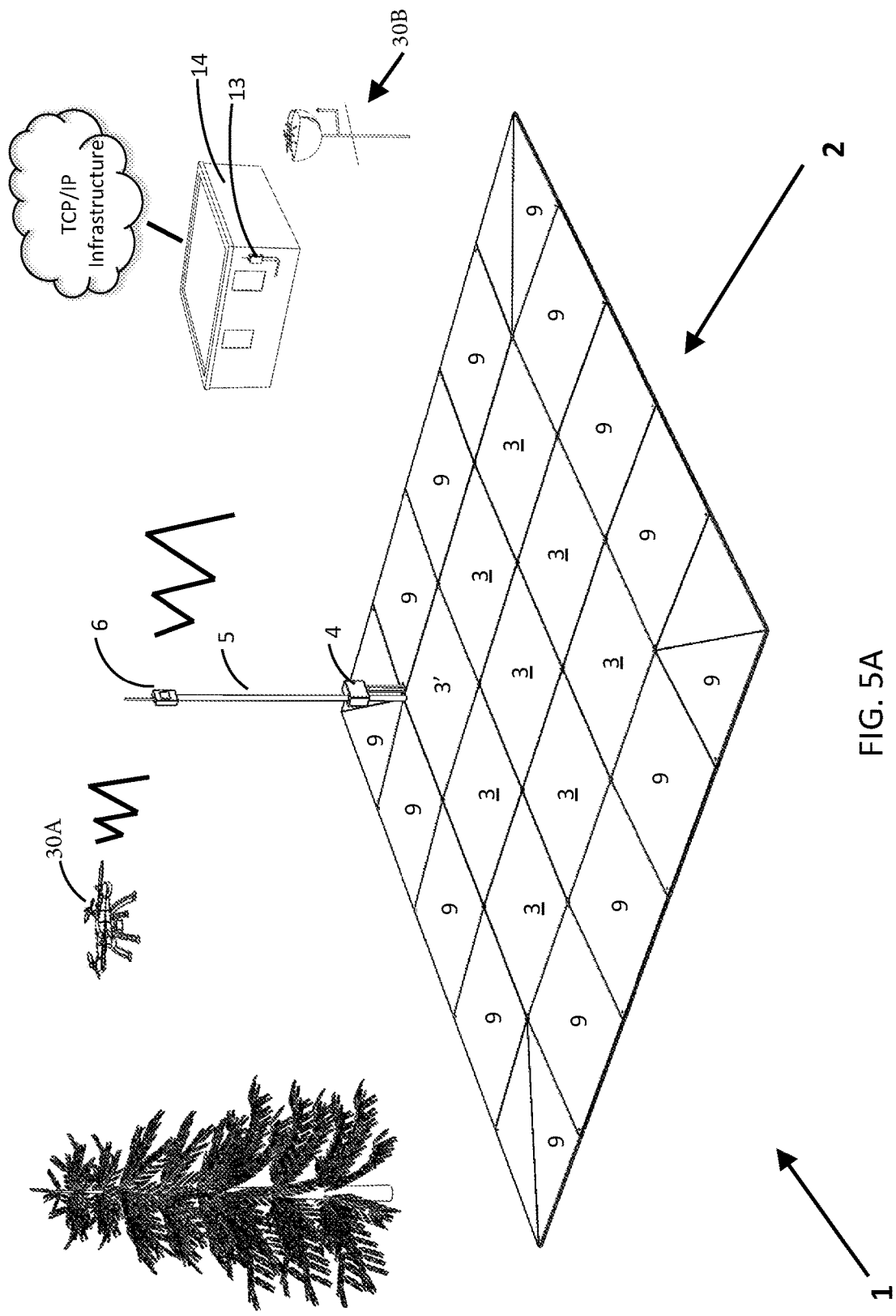
FIG. 5A is a perspective view of a 9-module type flexible SWE-measuring networked array of snow data collection modules (SDCM), having 9 active snow data collection modules (SDCMS) surrounded by a 5×5 adaptive perimeter/transition region, and having wireless connectivity to the TCP/IP infrastructure and GPS systems deployed about the Earth, wherein the SWE-measuring networked array is shown without a layer of snow loading the surface of the SWE-measuring networked array.

In FIG. 5A, there is shown a 9-SDCM type flexible SWE-measuring networked array 2, comprising 9 active (i.e. SWE measuring) snow data collection modules (SCDMs) 3 surrounded by a 16 perimeter ground-array transition modules or plates 9 connected to the perimeter of the 3×3 SDCM array. As shown, the SWE-measuring networked array 2 has wireless connectivity to the TCP/IP infrastructure 21 and GPS systems 32 deployed about the Earth, and is shown without snow loading on its SWE measuring surface.

Figure 5B:
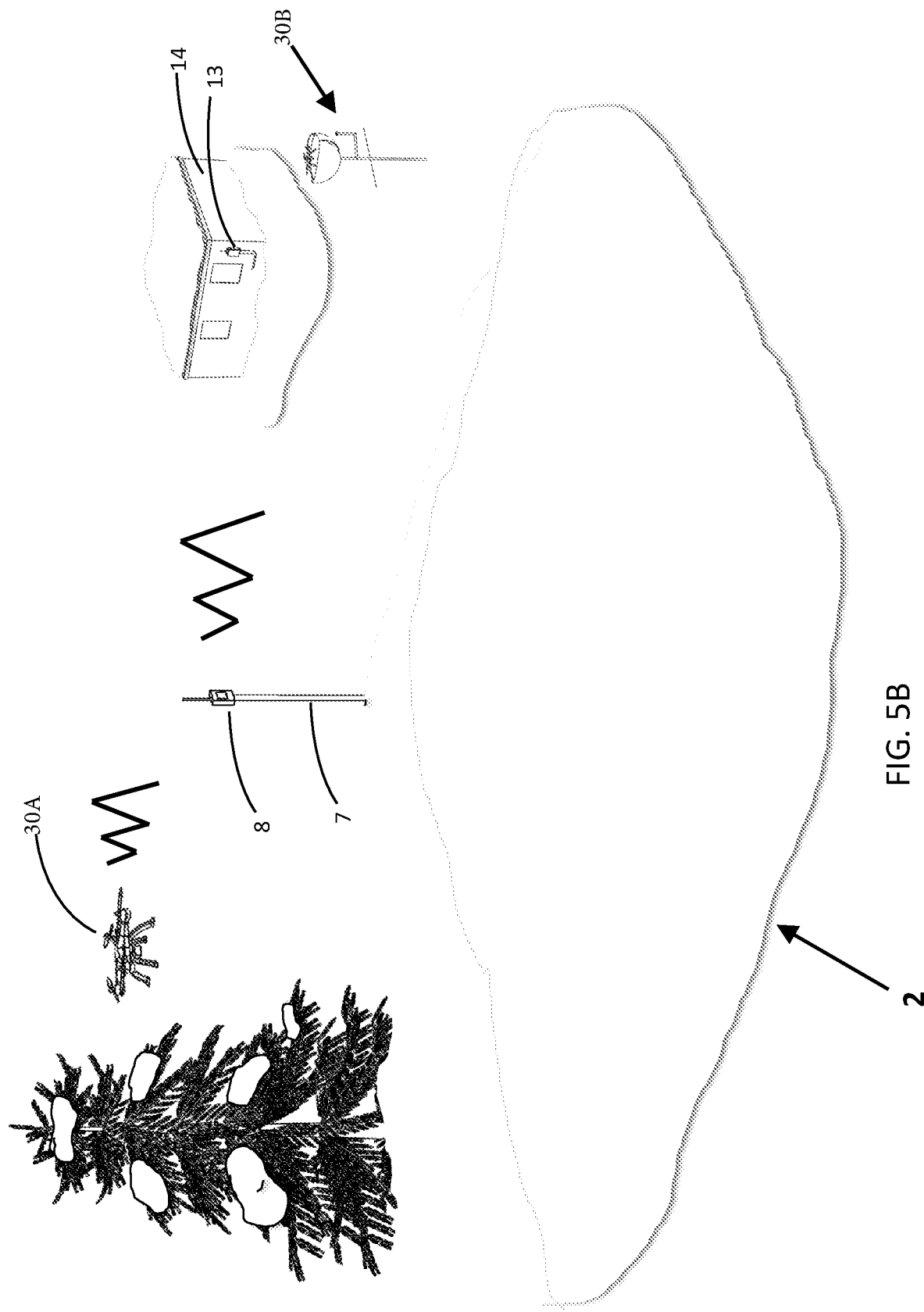
FIG. 5B is a perspective view of a 25-module type flexible SWE-measuring networked array, having 9 active snow data collection modules surrounded by a 5×5 ground-instrument transition region about the perimeter of the networked SDCMs, with wireless connectivity to the TCP/IP infrastructure and GPS systems deployed about the Earth, shown with a snow loading the surface of the SWE measuring array.

FIG. 5B shows the 9-SDCM flexible SWE-measuring networked array of FIG. 5A with snow loading its surface.

FIG. 5C shows the flexible SWE-measuring networked array 2 shown in FIGS. 5A and 5B, wherein each active snow data collection module 3 is indexed with SDCMi and a coordinate indicating the center of the snow data collection module, with respect to the entire SWE measuring array 2.

Figure 5D:
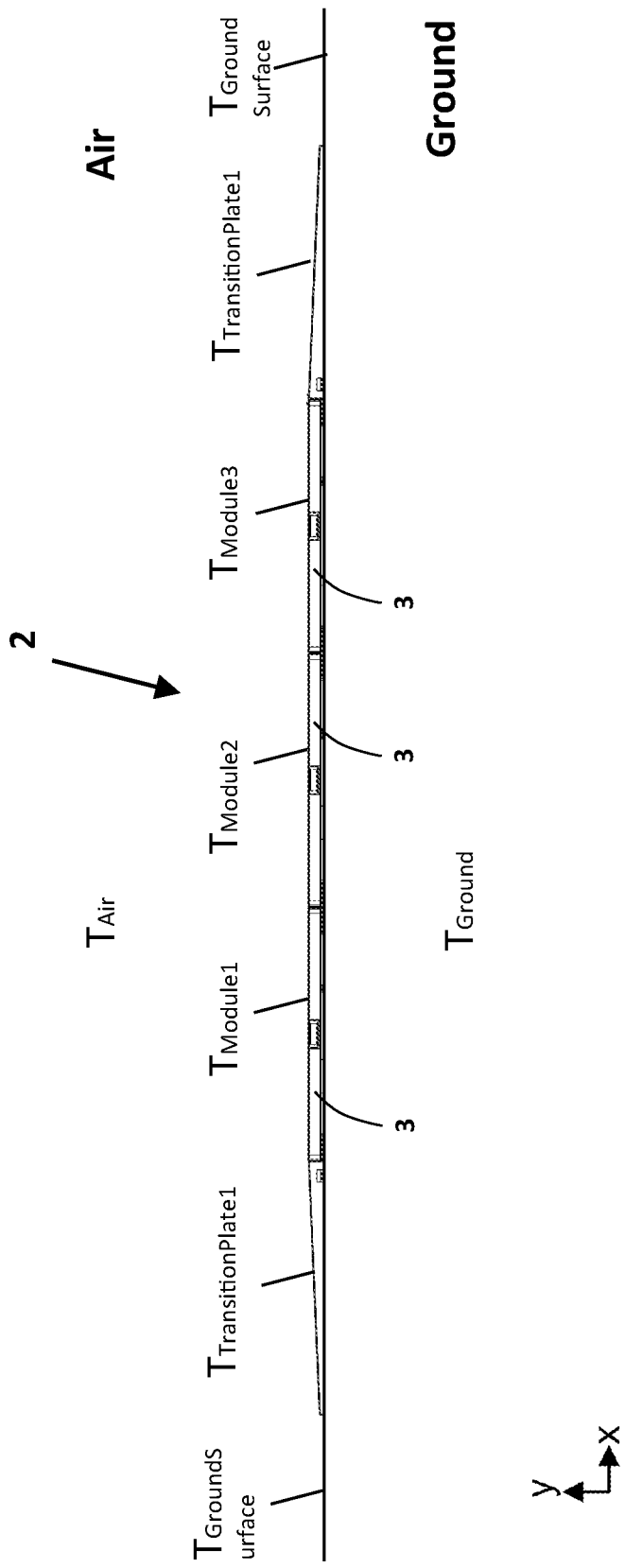
FIG. 5D is an elevated side view of the 25-module type flexible SWE-measuring networked array shown in FIGS. 5A, 5B and 5C, showing the ground surface, transition plates, and snow data collection modules (SDCMs), and how these modules cooperate to equalize temperature gradients from forming between the ground surface and the central region where the active SWE-measuring SDCMs are located within the SWE measuring networked array of the present invention.

FIG. 5D shows the flexible SWE-measuring networked array 2 shown in FIGS. 5A and 5B, installed on a ground surface, with the transition plates surrounding the SWE sensing modules, and cooperating to equalize temperature gradients from forming between the ground surface and the central region where the active SDCMs 3 are located within the SWE measuring array network of the present invention 2.

Figure 5E:
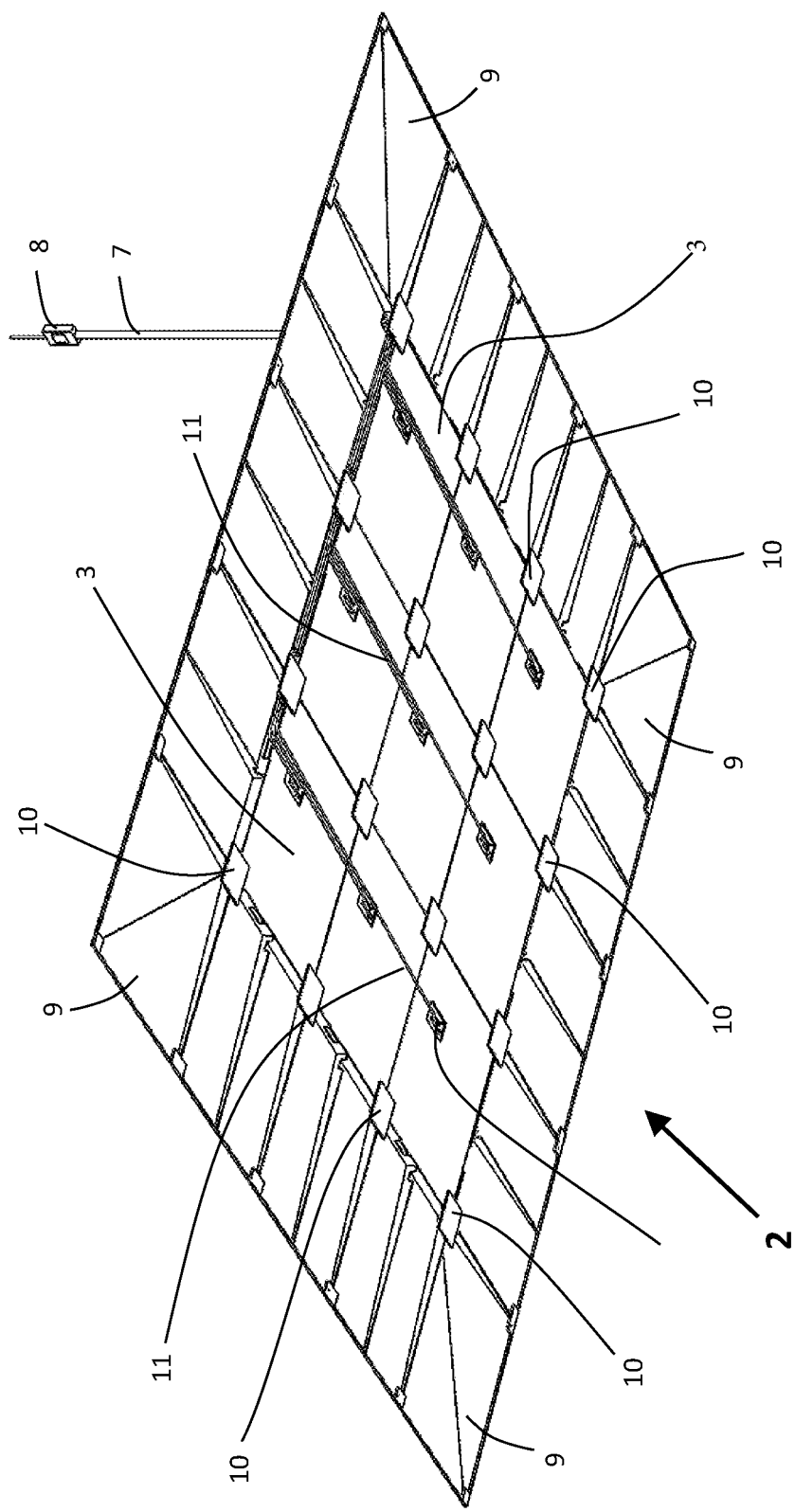
FIG. 5E is a bottom perspective view of the 25-module type flexible SWE-measuring networked array shown in FIGS. 5A, 5B, 5C and 5D showing the water-proofed cable wire interconnections formed between the data multiplexing and power distribution module (DMPSM), the central data processing module (CDPM), and the other snow data collection modules (SDCM) used to construct the flexible SWE-measuring networked array of the illustrative embodiment.

FIG. 5E shows the flexible SWE-measuring networked array 2 shown of FIGS. 5A and 5B, with its wiring interconnections between the multiplexing and central data processing modules 4, 5 and the other snow data collection modules 3 used to construct the SDCM array 2.

FIG. 5F shows the flexible SWE measuring array of the present invention 3, supported on the Earth ground and covered with a first layer of snow and air.

FIG. 5G shows the flexible SWE measuring array of the present invention 3, supported on the Earth ground and covered with a second layer of snow, greater than the first layer, and air.

Figure 6:
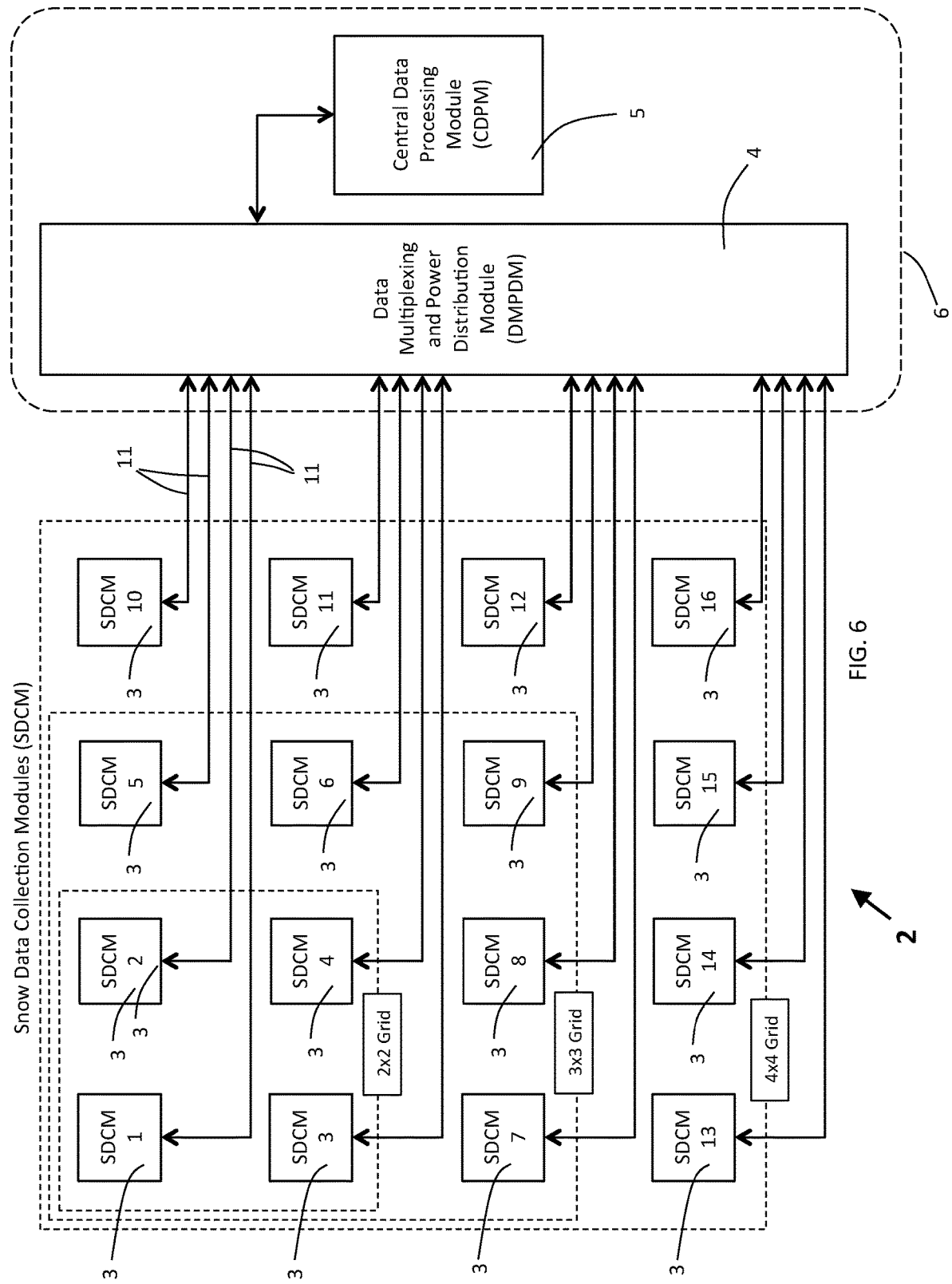
FIG. 6 is a system network diagram showing the array of snow data collection modules (SDCMs) interconnected and communicating with the central data processing module (CDPM) by way of the data multiplexing and power distribution module (DMPDM), and also which snow data collection modules (SDCMs) contribute to the construction of SDCM arrays of various sizes (e.g. a 2×2 grid-size SDCM networked array, a 3×3 grid-size SDCM networked array, and a 4×4 grid-size SDCM networked array)

FIG. 6 shows the array of snow data collection modules (SDCM) 3 interconnected and communicating with the central data processing module (CDPM) 45 by way of the data multiplexing and power distribution module (DMPDM) 4. In FIG. 6, each of the 16 shown SDCMs is identified by en a unique active SDCM identification number (e.g. 1, 2, 3, . . . 16). In FIG. 6, SDCM Nos. 1, 2, 3 and 4 are shown contributing to the construction of a 2×2 grid-size SDCM array. SDCM Nos. 1, 2, 3, . . . 7, 8, 9 are shown contributing to a 3×3 grid-size SDCM array. Also, SDCM Nos, 1, 2, 3, . . . 14, 15, 16 are shown contributing to a 4×4 grid-size SDCM array. Even larger grid-size SDCM arrays can be constructed as required by the application at hand.

Figure 7:
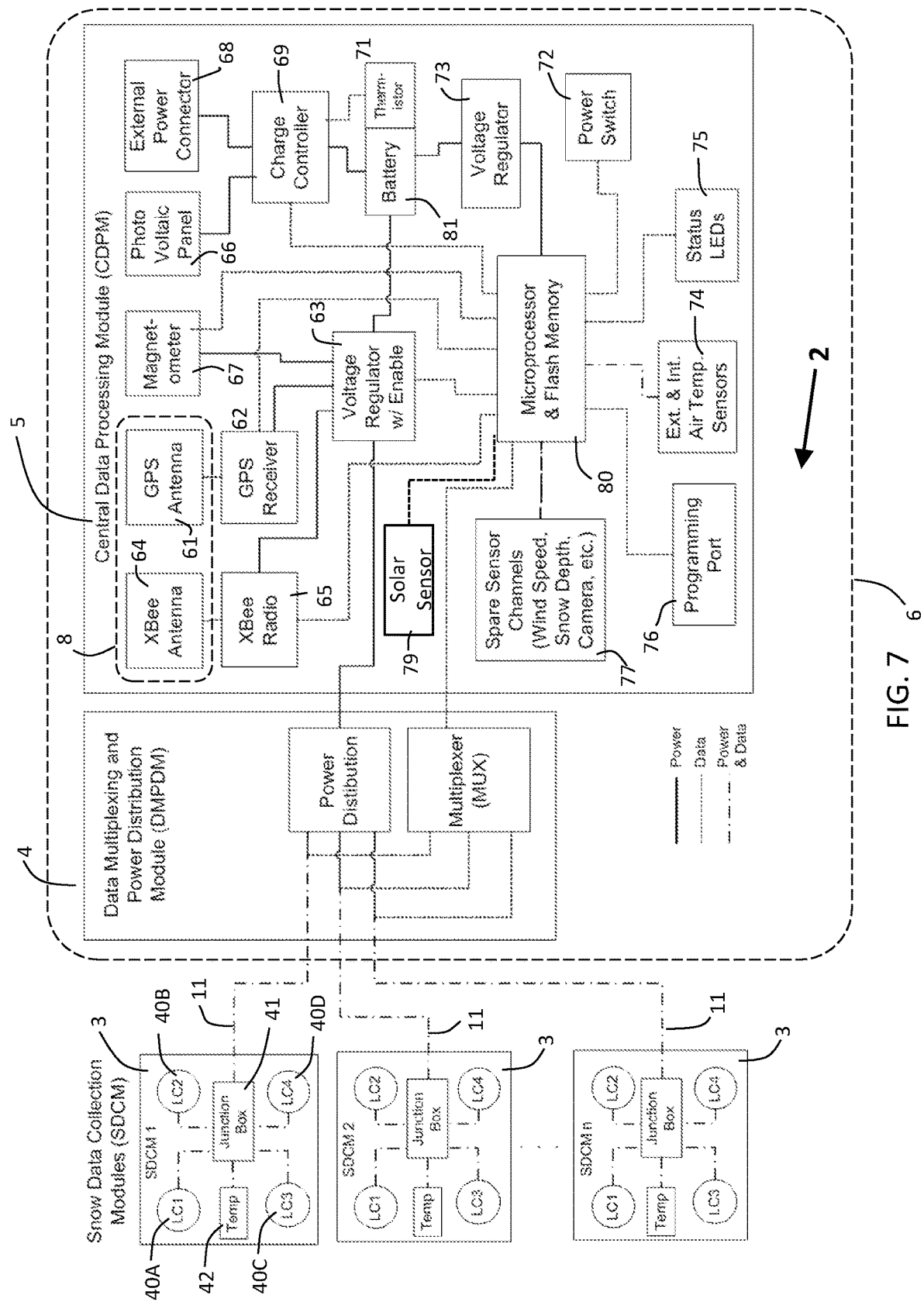
FIG. 7 is a schematic diagram illustrating the subcomponents within each snow data collection module (SDCM), the data multiplexing and power distribution module (DMPDM), and the central data processing module (CDPM) of the present invention, wherein the CDPM is shown including a GPS antenna, a GPS signal receiver, voltage regulator, an Xbee antenna, an Xbee radio transceiver, a voltage regulator, a photo-voltaic (PV) panel, an external power connector, a charge controller, a battery, thermistors, a power switch, a voltage regulator, external and internal temperature sensors, power and status indicator LEDs, programming ports, a wind speed and direction sensors, a digital/video camera, a solar power density sensor for measuring the power density of solar radiation incident on the SWE-measuring networked array (at specified moments in time), and other environment sensors adapted for collecting and assessing environmental intelligence in accordance with the spirit of the present invention.

FIG. 7 shows the subcomponents within each snow data collection module (SDCM) 3, the data multiplexing and power distribution module (DMPDM) 4, and the central data processing module (CDPM) 5 deployed on the system network of the present invention. As shown in FIG. 7, the central data processing module (CDPM) 5 comprises: a GPS antenna 61; a GPS signal receiver 62; voltage regulator 63; an Xbee(R) (embedded cellular) antenna 64; an Xbee(R) (embedded cellular) radio transceiver 65; a photo-voltaic (PV) panel 66; a magnetometer 67; an external power connector 68; a charge controller 69; a battery; thermistors 71; a power switch 72; a voltage regulator 73; external and internal temperature sensors 74; power and status indicator LEDs 75; programming ports 76; a wind speed and direction sensors 77; a digital/video camera 78; a solar power density sensor 79 for measuring the power density of solar radiation incident (at specified moments in time); a programmed microprocessor or microcontroller with supporting memory architecture 80 (e.g. RAM and ROM); a battery and thermistor 81; and other environment sensors adapted for collecting and assessing intelligence in accordance with the spirit of the present invention.

As shown in FIG. 7, the data multiplexing and power distribution module (DMPDM) 4 comprises primary components: power distribution module (PDM) 4A for distributing data and power signals; and data signal multiplexer (DSM) 4B for multiplexing data signals within the DMPDM 4. The power distribution module (PDM) 4A can be realized using solid-state circuitry including silicon controlled rectifiers (SCRs) well known in the power switching arts. The data signal multiplexer (DSM) 4B can be realized using electronic analog (low-voltage) data signal switching circuitry well known in the electronic circuit arts. These circuits can be implemented as separate devices or may be combined into a single device using ASIC, as well as FPGP technology, or any other suitable technology.

Specification of Snow Data Collection Module (SDCM) of the Present Invention for Use in SWE Data Collection and Processing Operations and the Like FIGS. 8A and 8B show the snow data collection module (SDCM) 3 of the present invention. As shown, the snow load measuring surface 46 is supported within a planar frame structure 44 having four corner connecting and mounting plates 10, each of which cooperate to couple together the corners of four neighboring snow data collection modules (SCDM) 3, so as to form a multi-SDCM flexible networked array 2 having a particular grid-size dependent on the number of active SDCMs employed.

Figure 8E:
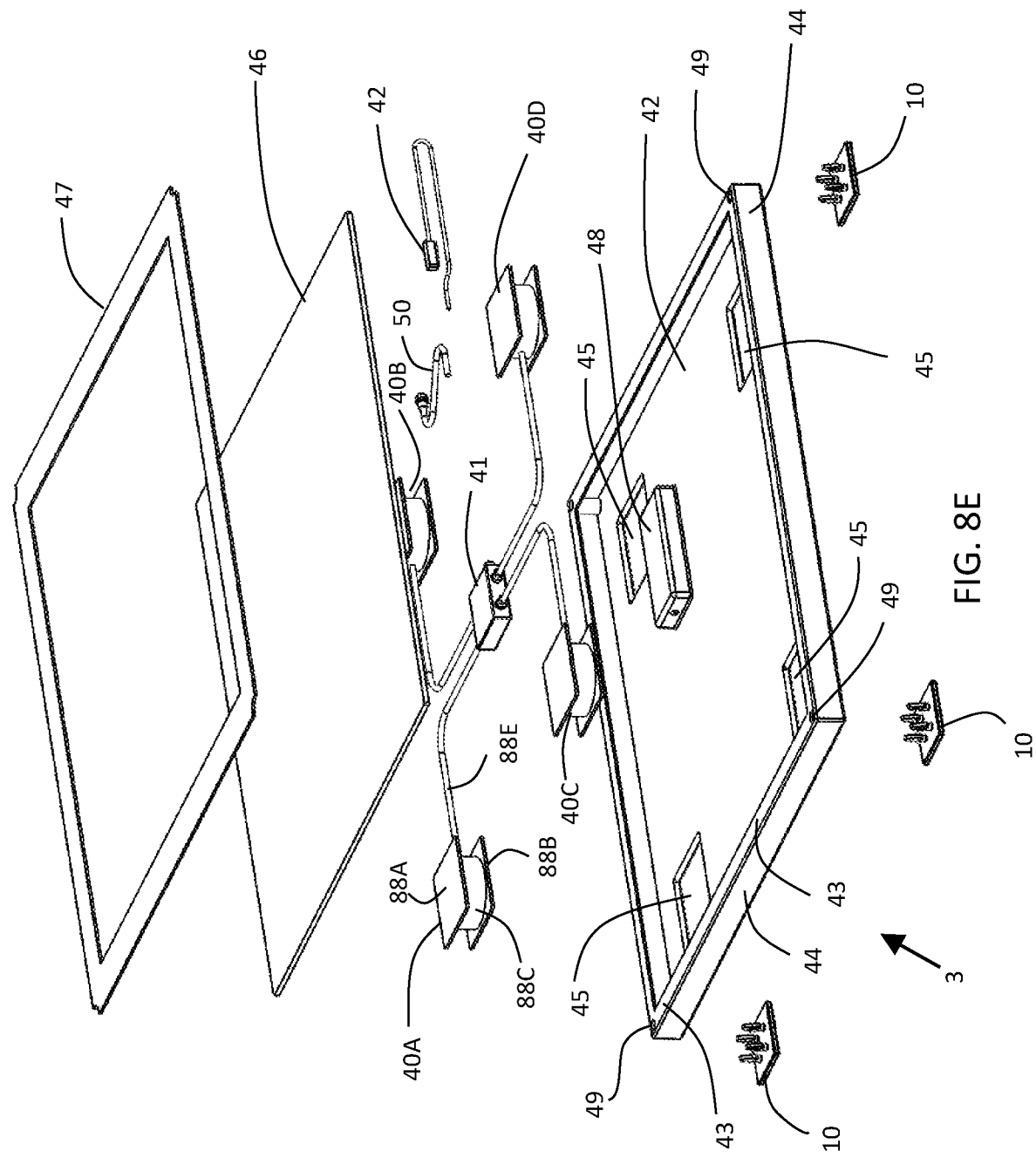
FIG. 8E is an exploded view of a snow data collection module shown in FIGS. 8A and 8B, showing its various components, including snow load measuring plate/surface, a set of four electronic (strain-gauge-type) load cells, corner connecting and connecting and mounting plates, a data collector and processor, a temperature sensor module, and junction box, disposed above the bottom surface of the support frame structure.

As shown in FIGS. 8A through 8E, the planar frame structure 44 has a bottom surface 42 supporting a plurality of electronic load cells 40A through 40D, and top flange surface 43 provided with an aperture 43A, about which a snow weight plate 46 is supported upon the plurality of electronic load cells 40A through 40D, as shown in FIGS. 8C, 8D and 8E.

As illustrated in FIGS. 9A, 9B and 9C, a flexible seal 47 having a frame-like geometry extends between the perimeter edge of the frame flange 43 and the perimeter edge of the snow weight plate 46. As shown, the weight plate 46 is free to deflect in response to the load (forces) presented by the mass of a snow packed layer disposed on the weigh plate surface, and generate electrical signals from a strain-gauge in each load sensor, for subsequent processing in the central data processing module (CDPM) 5. As shown in FIGS. 9A, 9B and 9C, there is a small gap 43B disposed between the perimeter edge of the snow weight plate 46 and the perimeter edge of the frame flange 43, and over this gap region 43B, the flexible, pliant sealing membrane 47 is allowed to bend and distort in response to snow loading forces as illustrated in FIGS. 9A 9B and 9C.

FIGS. 8C and 8D show the load cells 40A and 40B within the snow data collection module (SDCM) 3 of FIGS. 8A and 8B, with its snow weigh plate 46 supported on the electronic load cells 40A through 40D and sealed on its edges using the flexible membrane masking pattern 47.

FIG. 8E shows other components mounted within the snow data collection module (SDCM) of FIGS. 8A and 8B, namely: a junction box 48; and a temperature sensing module 42, all supported on the bottom surface of the support frame 42. In the preferred embodiment, the four electronic load/force sensors 40A through 40D are configured according to a deflection measurement method, although it is understood, that other methods of measurement, including translational methods, may be used to practice the present invention. As shown, the load/force sensors 40A through 40D are mounted between the weight plate 46 and the base housing 42, with the weigh plate 46 engaging outer edge flange 43 on the base housing 44, and sealed by a flexible membrane 47 formed using a layer of adhesive.

As shown in FIG. 8E, the construction of each strain-gauge force sensor 40A (40B, 40C and 40D) in the illustrative embodiment, comprises: a strain-gauge sensor 88D mounted within a rubber bellows-like (or foam) structure 88C between a pair of rigid plates 88A and 88B. The rubber bellows-like structure 88C can be made from elastomeric rubber material, and the plates 88A and 88B can be made of any suitable stiff material (e.g. plastic or metal material) that will remain substantially rigid during device operation so forces applied to the top plate 88A will be suitably transmitted to the strain-gauge sensor 88D. Any suitable adhesive can be used to glue the plate 88A and 88B to the bellows-like structure 88C, with the electrically conductive wires 88E from the sensor 88D extending outwardly, as shown. Preferably, the sensor 88D is fastened to the bottom plate 88B by a set of screws and lock nuts, and the conductive wires 88E can be fastened to the bottom plate 88B as well using a strap fastener known the art. Conductive wires 88E are connected to leads in the junction box 48 as shown, to carry electrical voltage-data signals for signal processing in the CDPM 5, as described in the process of FIGS. 20A through 20C.

During SDCM operation, the gravitational loading forces imposed on the weigh plate 46 by an incident snow load are transferred through the weigh plate 46, to the four load/force sensors 40A and 40D so as to generate a set of electrical analogue voltage signals from the strain-gauge type force sensors 40A through 40D used in the illustrative embodiment of the present invention. These force sensors 40A through 40D are calibrated to provide an accurate representation of the magnitude of the force applied by the gravitational load on the weigh plate 46. The load-cell voltage signals are transmitted to the junction box 48, along with the temperature data signal generated by temperature sensor 42. These two voltage signals from each SDCM 3 are then transmitted along a composite signal cable 11 connected to the output signal box 48, and from there, these voltage signals are transmitted to the DMPM 4 by way of a flexible cable. From the DMPM 4, these voltage signals are transmitted to the CDPM 5 by way of another flexible cable, for signal and data processing in accordance with the principles of the present invention, described in great detail in the flow charts shown in FIGS. 20A, 20B and 20C.

As shown in FIG. 9A, when no snow load is present on the snow load measuring plate (surface) 46, the edges of the snow load measuring surface 46 will be disposed flush (i.e. in substantially the same plane as) with the top edge surface 43 of the support frame 44, but the middle portions thereof will undergo deflection as shown.

As shown in FIG. 9B, when a first layer of a snow load is present on the snow load measuring plate (surface) 46, and the plate 46 undergoes a first degree of deflection in response to the snow load, the snow load measuring surface 46 will be disposed slightly beneath the top edge flange surface 43 of the support frame 44, and the middle portions thereof undergo reflection, as shown.

As shown in FIG. 9C, when a second layer of snow load is present on the snow load measuring plate (surface) 46, and the plate 46 undergoes a second degree of deflection in response to the snow load, the snow load measuring surface 46 will be disposed flush with (i.e. disposed in substantially the same plane as) the top edge surface of the support frame 44.

Depending on how the snow load measuring plate 46 is configured within the support frame 44, the dynamics of surface deformation may differ from illustrative embodiment, to illustrative embodiment, and from the illustrations shown in the figure drawings.

Method of Flexibly Connecting Snow Data Collection Modules (SDCMs) Together Using the Connecting and Mounting Plates of the Present Invention FIG. 10 shows the snow data collection module (SDCM) 3 with its snow load measuring (i.e. weigh surface) plate 46 removed for purposes of illustration, and having a connecting and mounting plate 10 installed in each corner of the SDCM (module) 3, to flexibly connect neighboring SDCMs together at their points of corner connection.

FIG. 11 shows the connecting and mounting plate 10 of the present invention being used in the corner of each snow data collection module (SDCM) 3, when constructing the flexible SWE-measuring networked array 2 of the present invention.

FIG. 12A shows how the first step in the preferred method of mechanically coupling neighboring (i.e. adjacent or contiguous) snow data collection modules (SDCMs) 3 together by their corners using a connecting and mounting plate 10. As shown, each connecting and mounting plate 10 has four barbed mounting posts 10A, 10B, 10C and 10D projecting from a rectangular base plate portion 10E, and adapted for passing through a circular bore 49 formed in the underside corner of the rectangular support frame 44 of the snow data collection module (SDCM) 3, as clearly shown in FIGS. 12A, 12B and 12C, 13A and 13B.

FIG. 12B shows how the second step in the method of mechanically coupling neighboring snow data collection modules (SDCM) 3 together by their corners using the connecting and mounting plate 10, with each barbed post 10A and 10B passing through a circular bore 49 formed in the underside corner of the rectangular support frame 44 of the snow data collection modules 3. During this step shown in FIG. 12B, the barbed post 10A, with its compressed barbs, passes through the aperture 49, upon which its compressed barbs expand and lock the frame 44 to the connecting and mounting plate 10, as shown in FIG. 12C.

FIG. 12C shows how the third step in the method of mechanically coupling neighboring snow data collection modules together by their corners using the connecting and mounting plate 10, wherein each barbed post 10A and 10B has passed through the circular bore 49 formed in the underside corner of the rectangular support frame 44 of the snow data collection module (SDCM) 3, and both SDCMs and flexibly connected and mounted to the connecting and mounting plate 10, as shown in FIG. 12C.

FIG. 12D shows an array of four snow data collection modules 3 mechanically-coupled together by their corners using a set of connecting and mounting plates 10, described above.

FIG. 12E shows the array of snow data collection modules (SCDM) 3 depicted in FIG. 12D, flexibly connected and mounted together, on ground surfaces that do not need to be planar, using the connecting and mounting plate 10 of the present invention. As shown, the pair of adjacent snow data collection modules 3 are mechanically-coupled together by a connecting and mounting plate 10, allowing the adjacent snow data collection modules 3 to be supported on the ground surface in substantially the same plane, as shown by the straight dotted line drawn in the figure, and corresponding FIG. 13A.

FIG. 12F shows the array of snow data collection modules (SDCMs) 3 shown in FIG. 12D. As shown, the pair of adjacent snow data collection modules 3 are mechanically-coupled together by a connecting and mounting plate 3, allowing the adjacent snow data collection modules (SDCMs) to be supported on the ground surface in different planes, as shown by pair of diverging dotted lines drawn in the figure and corresponding FIG. 13B.

FIG. 13A shows the pair of adjacent snow data collection modules 3 that are mechanically-coupled together in FIG. 12E, allowing the adjacent snow data collection modules (SDCMs) to be supported on the ground surface in substantially the same plane.

FIG. 13B shows a pair of adjacent snow data collection modules 3 that are mechanically-coupled together in FIG. 12F, allowing the adjacent snow data collection modules to be supported on the ground surface in substantially different planes. In general, the method of and apparatus for flexibly connecting the corners of SDCMs 3 of the present invention has the advantage of allowing SWE-measuring SDCM-based arrays to be assembled and installed on non-planar ground surfaces, with surfaces variations, indicated by the angle formed between lines 60A and 60B, and exceeding 15 or more degrees, with only minimum ground surface preparation required for during assembly and installation in diverse geographical environments.

In the preferred embodiment, the frame 44 and weight plate 46 of each SDCM 3 is constructed of lightweight aluminum, although other suitable materials may be used. The flexible sealing membrane 47 that seals the weight plate 46 and the top surface 43 of the framework of the SDCM 3 would ideally be fabricated from a pliant plastic material affixed using a strong weatherproof adhesive material. The enclosures or housings of the DMPDM 5 and the CDPM 4 can be made from any suitable metal material such as aluminum, or suitable plastic material such as polycarbonate, although many other plastic materials can be used with excellent results.

Figure 14A:
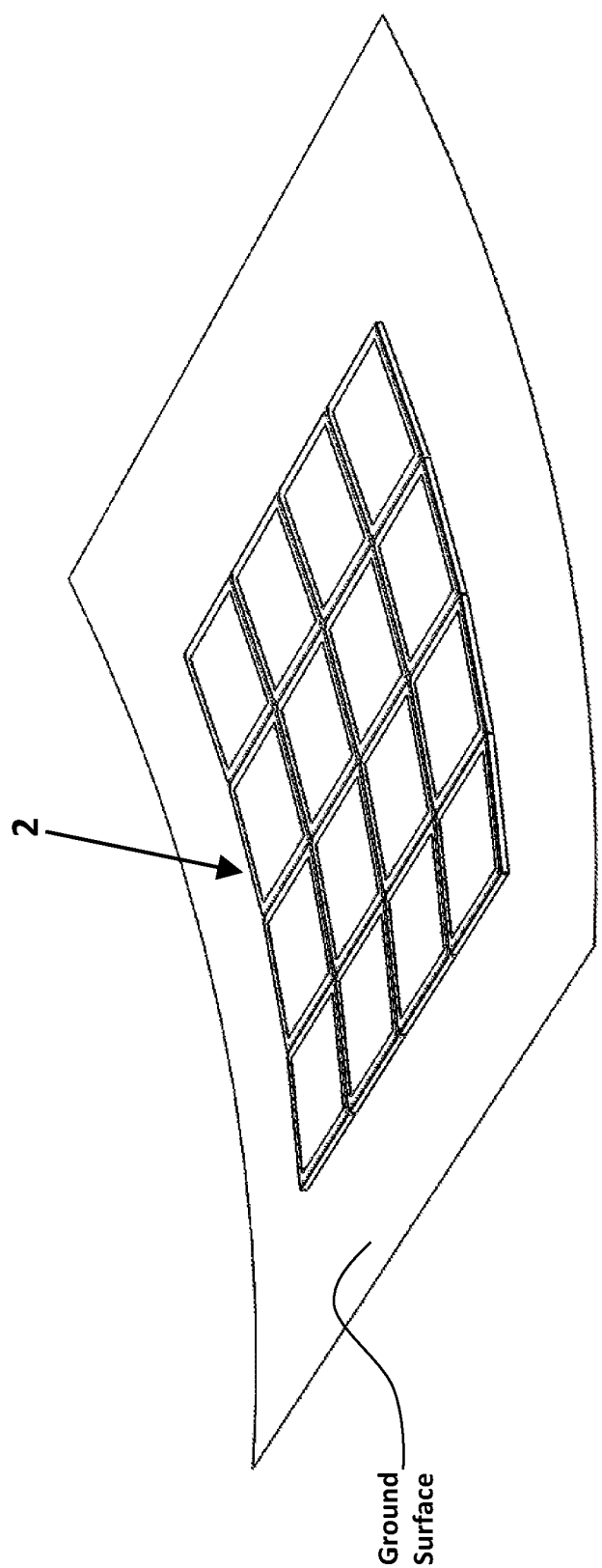
FIG. 14A is a schematic representation showing a 5×5-grid sized flexible SWE-measuring networked array of the present invention installed on a concave ground surface.
Figure 14B:
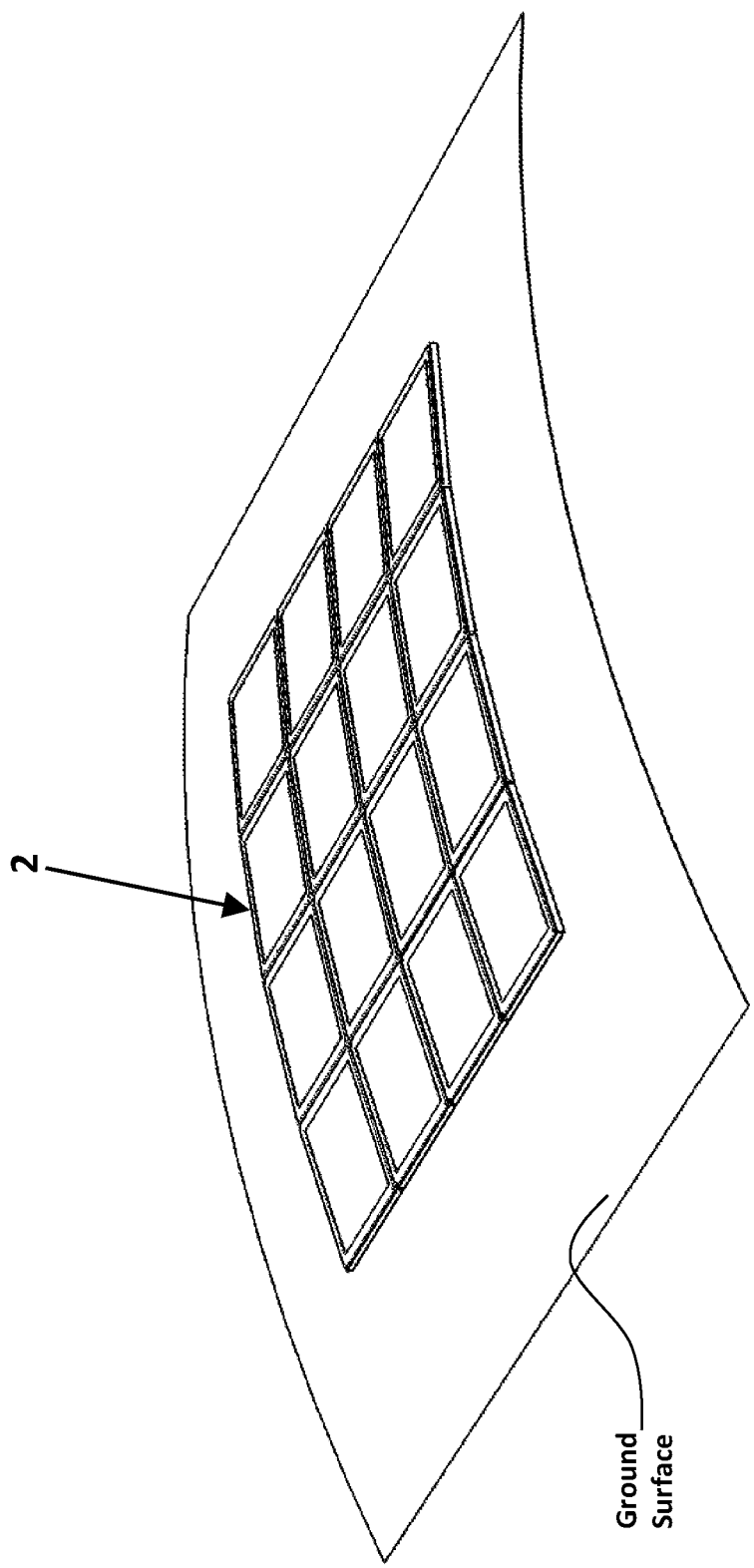
FIG. 14B is a schematic representation showing a 5×5-grid sized flexible SWE-measuring networked array of the present invention installed on a convex ground surface, with concavity along a single axis.
Figure 14C:
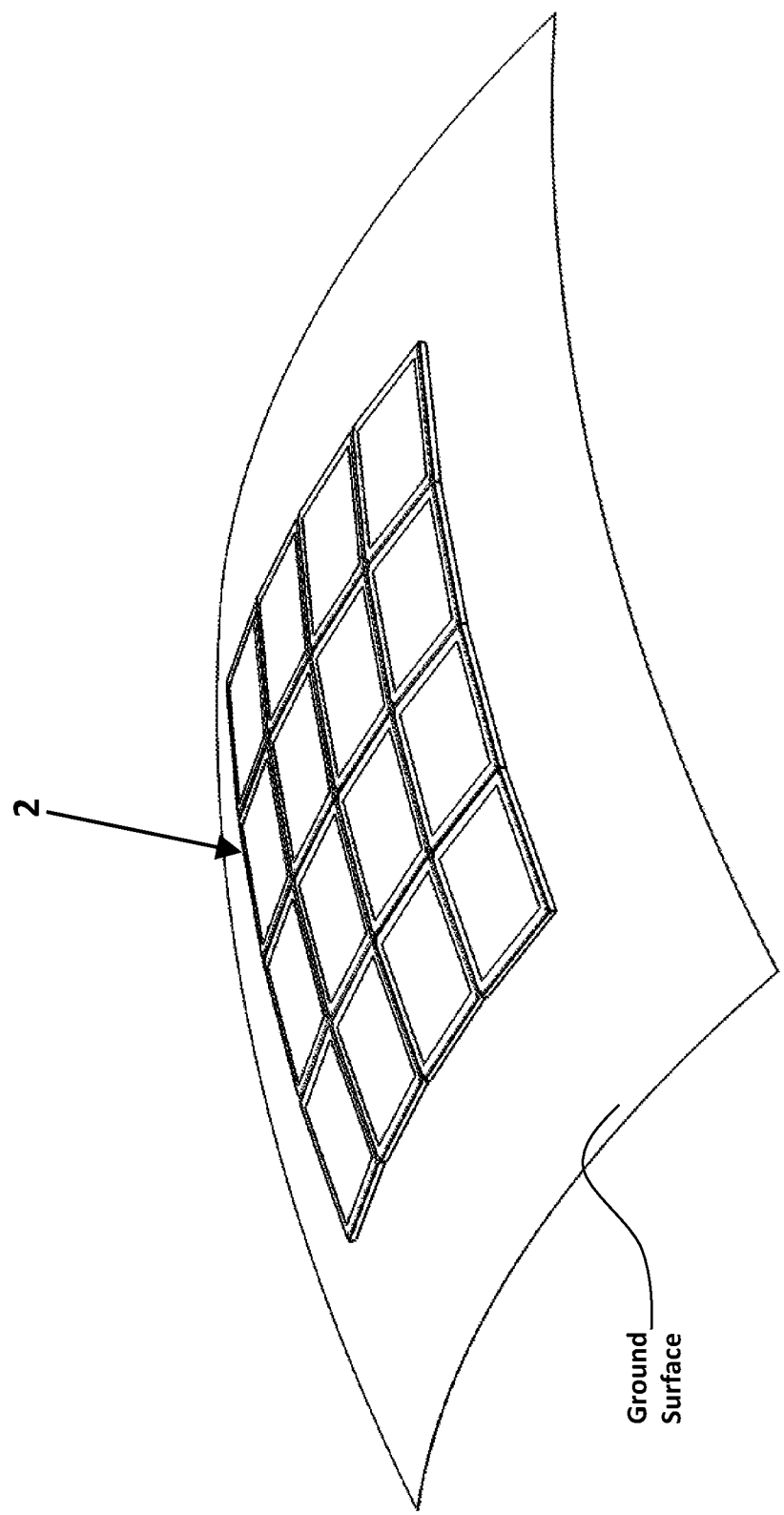
FIG. 14C is a schematic representation showing a 5×5-grid sized flexible SWE-measuring networked array of the present invention installed on a concave ground surface, with concavity along two axes.

Installing the Flexible SWE-Measuring Networked Arrays on Different Ground Surface Contours By virtue of its surface flexible construction illustrated above and shown in FIGS. 12A through 12E, and 13A and 13B, the flexible SWE networked array 2 can be installed simply on ground surface contours of different surface geometry, as illustrated in FIGS. 14A through 14C. The surface deviation can easily exceed 10 degrees, and the flexible SWE-measuring networked array 2 can easily adapted to such surface geometry variations, without any compromise in system instrument performance. FIG. 14A shows a 5×5-grid sized flexible SWE-measuring networked array of the present invention 2 installed on a concave ground surface. FIG. 14B shows a 5×5-grid sized flexible SWE-measuring networked array of the present invention 2 installed on a convex ground surface, having convexity along a single axis. FIG. 14C shows a 5×5-grid sized flexible SWE-measuring networked array of the present invention 2 installed on a convex ground surface, having convexity along two orthogonal axes.

These ground surface examples are merely for illustrative purposes and will vary from installation environment to installation environment. What is important to note here is that by virtue of the flexible and surface-geometry adaptive nature of the SWE-measuring networked array 2 of the present invention, installation is made much easier and quicker, and this will be greatly welcome for those charged with responsibility of installation and setting up the SWE-measuring networked arrays of the present invention in remote mountain regions where SWE monitoring is of critical importance due to the depths of snow packs in such regions.

Method of Disassembling Snow Data Collection Modules (SDCMS) Networked in a Flexible SWE-Measuring Networked Array of the Present Invention The flexible SWE networked array 2 of the present invention can be disassembled easily by using a simply disconnect tool 70 illustrated in FIGS. 15A through 15D.

FIGS. 15A, 15B, 15C and 15D, and corresponding FIGS. 16A, 16B, 16C and 16D, show a pair of adjacent snow data collection modules 3 physically-coupled by a connecting and mounting plate 10, wherein through the use of a special tool 70, the snow data collection modules 3 can be released and decoupled through a four step process illustrated in this views.

Using the special tool 70, the snow data collection modules 3 can be released and decoupled through a four step process illustrated in the views of FIGS. 15A, 15B, 15C and 15D. As shown in step 1, the tool 70 has a cylindrical shaft portion 71 with a hollow interior 72. The outer diameter of the cylindrical shaft 71 is slightly less than the inner diameter of the bore hole 49 formed in each edge of the frame 44. As shown in FIGS. 15B and 16B, the barbed flanges on each mounting post 10A, 10B are compressed by the tool 70 when the hollow interior 72 is slid and pressed over the barbed post 10A, 10B, and allows the frame 44 to be removed from the posts 10A, 10B when lifted off the plate 10E as shown in FIGS. 15C and 16C. Once the frame 44 is disconnected from the plate 10, then the tool 70 can be pulled up and out from the bore hole 49, as shown in FIGS. 15D and 16D. Using this simple tool and procedure, it is possible to quickly disconnect any pair of SDCM's from each other via its connector plate 10 by following the steps shown in FIGS. 15A through 16D.

Specification of the Preferred Method of System Assembly and Installation

FIG. 17 describes the steps associated with a method of SWE-array system assembly and installation. As shown the method comprises the steps of: (1) identifying the installation location (i.e. outline 100) for the ground components; (2) leveling and smoothing the ground surface to extent possible for the installation; (3) placing snap-fit corner connecting and mounting plates 10 in the appropriate corner locations for each snow data collection module (SDCM) 3; (4) placing SDCM cables 11 on the ground surface; (5) connecting SDCM cable 11 to Master SDCM 3' with CDPM mast structure 7; (6) installing master SDCM 3' on the ground surface; (7) installing data multiplexing and power distribution module (DMPDM) 4, 5; (8) connecting SDCM cable 11 to the DMPDM 4, 5, contained in box 6; (9) connecting each SDCM cable 11 to its respective SDCM 3 and setting the SDCM 3 to the snap-fit corner connecting and mounting plates 10 into an networked SDCM-based array 2; (10) installing ground-surface translation plates 9 around the perimeter of the SDCM-based array 2; (11) connecting and establishing a communication interface with a cellular or wired IP gateway 3; and (12), if required, installing an internet gateway 13 at the electrical power and internet source 14.

FIG. 18A illustrates steps 1 and 2 in the method of assembly and installation depicted in FIG. 17, showing an outline 100 where the components are to be placed on the ground. The installers measure off a region where the system is to be assembled and installed and then marks the ground sources using spray paint, or other ground marking techniques known in the art.

FIG. 18B shows the placement of snap-fit corner connecting and mounting plates 10 in the appropriate corner locations for each snow data collection module (SDCM) 3 shown in FIG. 1. As shown, the spacing of these corner connecting and mounting plates 10 are where neighboring SCDMs 3 meet when the system is assembled together.

FIG. 18C shows placing SDCM cables 11 on the ground surface, starting from the location of the Master SDCM 3', in one designated corner of the array region.

Figure 18D:
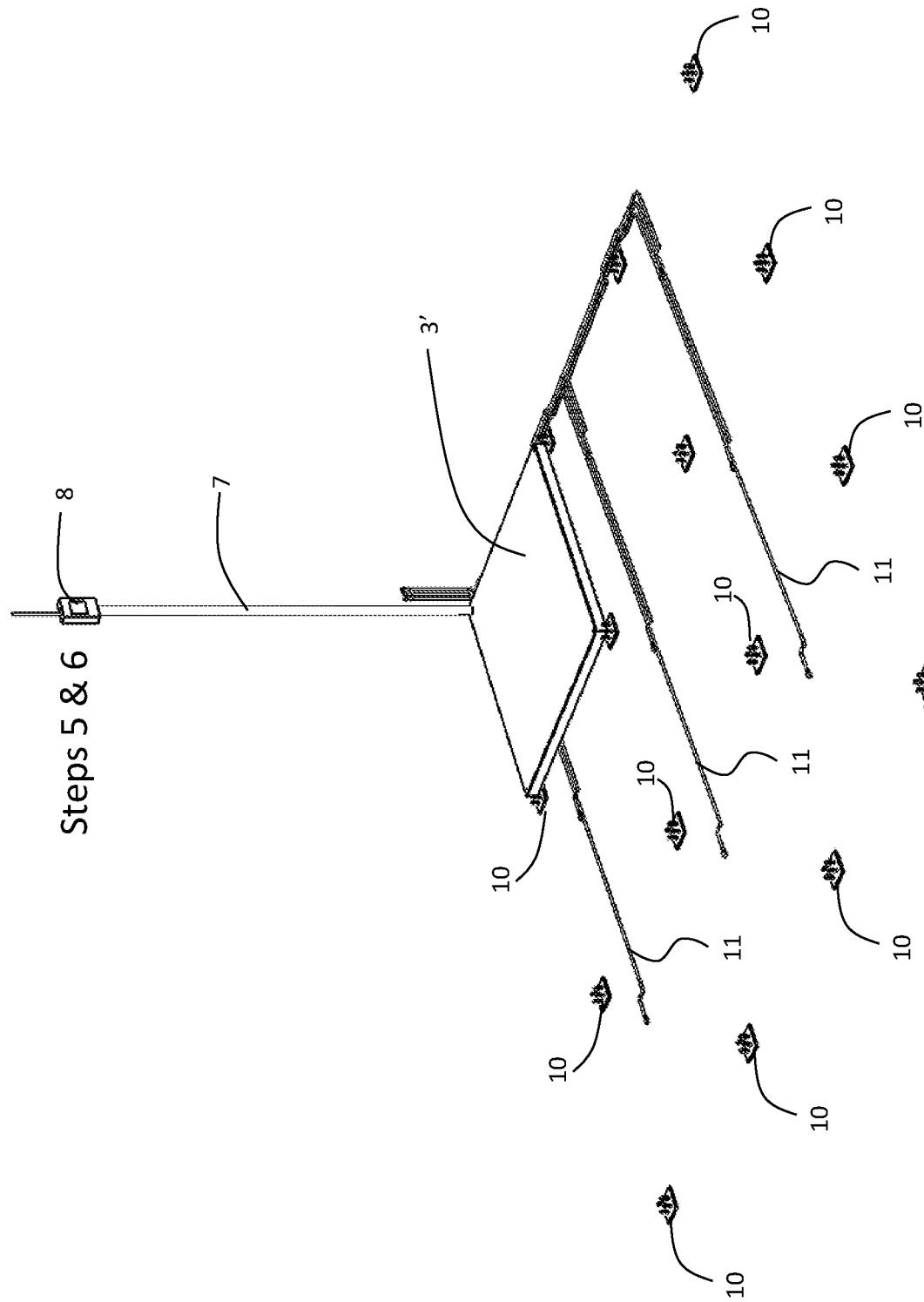
FIGS. 18D and 18E are schematic representations showing the connecting of the SDCM cable to the Master SDCM with CDPM mast structure, and installing the master SDCM on the ground surface.
Figure 18E:
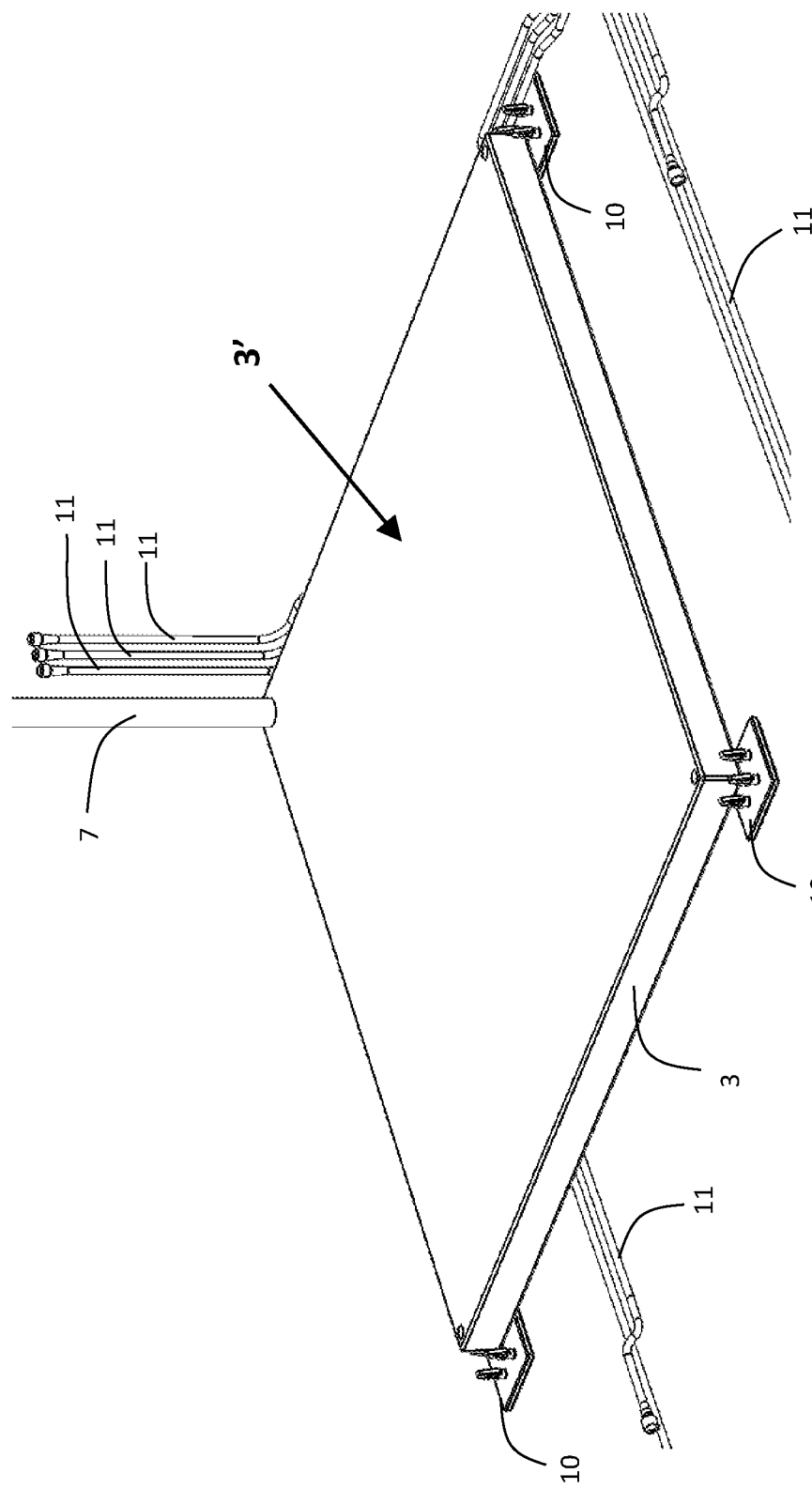
Figure 18H:
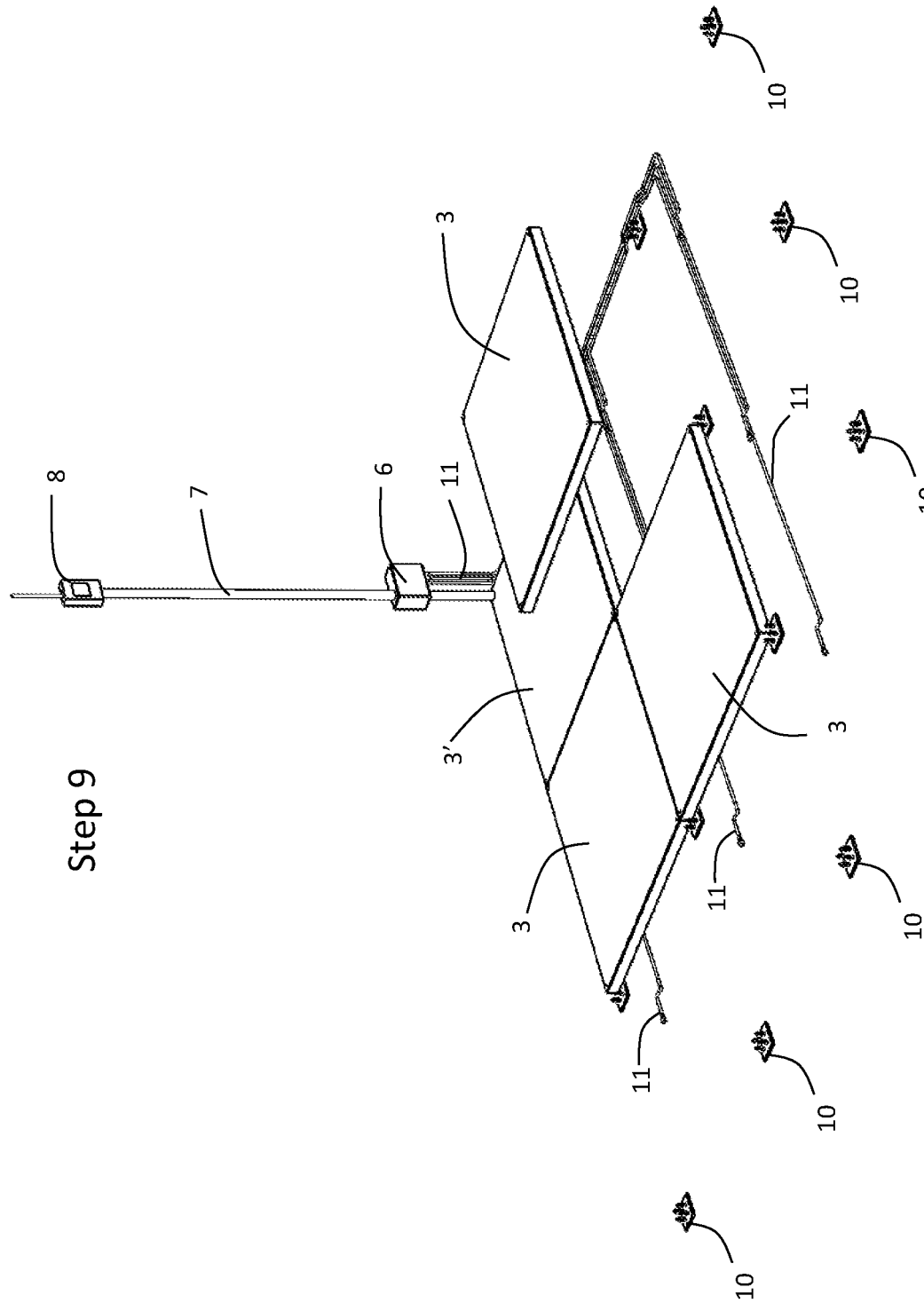
FIGS. 18H, 18I, 18J, and 18K are schematic representations showing the connecting of each SDCM cable to its respective SDCM and setting the SDCM to the snap-fit corner connecting and mounting plates, to form the active-region of the SDCM-based SWE-measuring networked array of the illustrative embodiment.
Figure 18I:
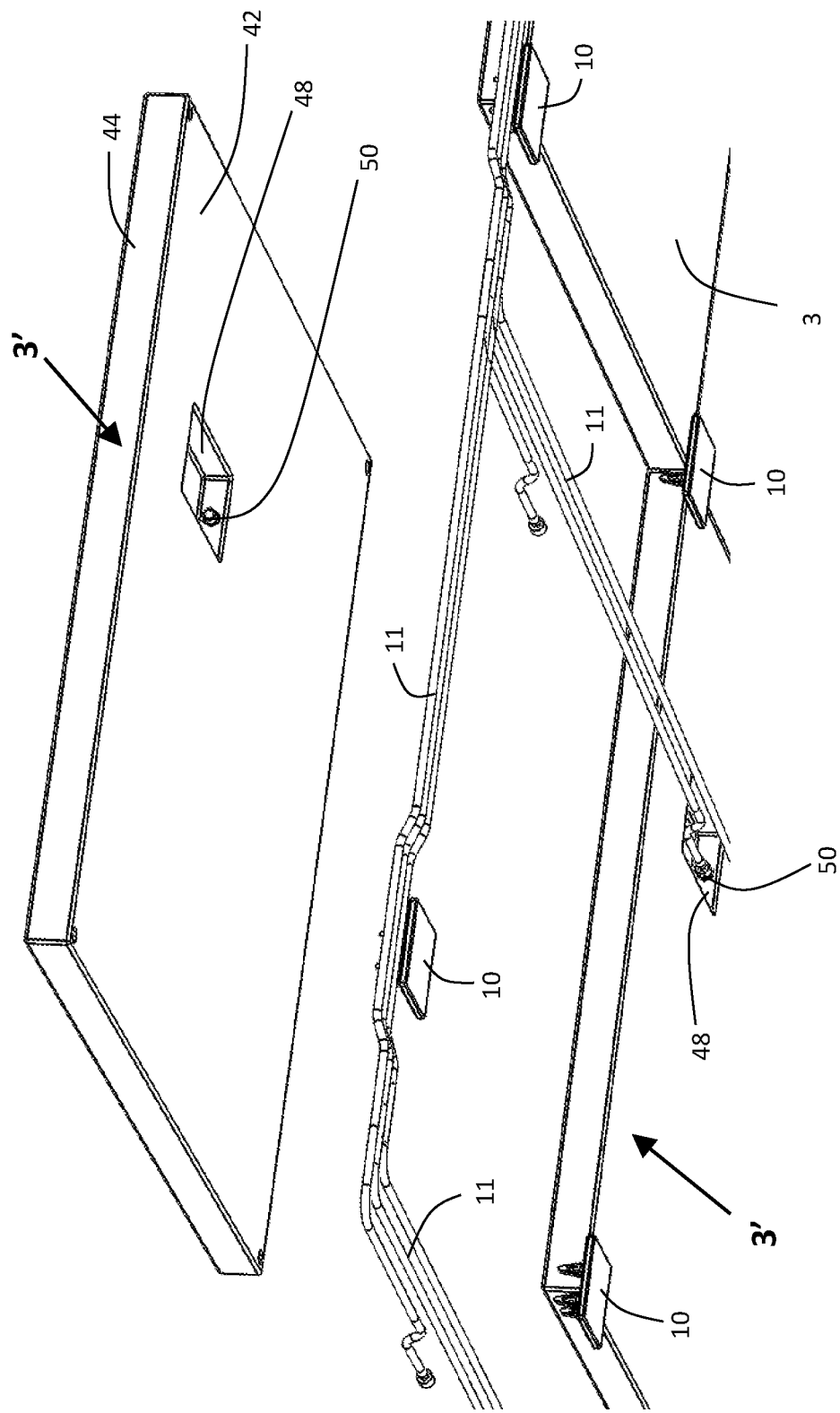
Figure 18J:
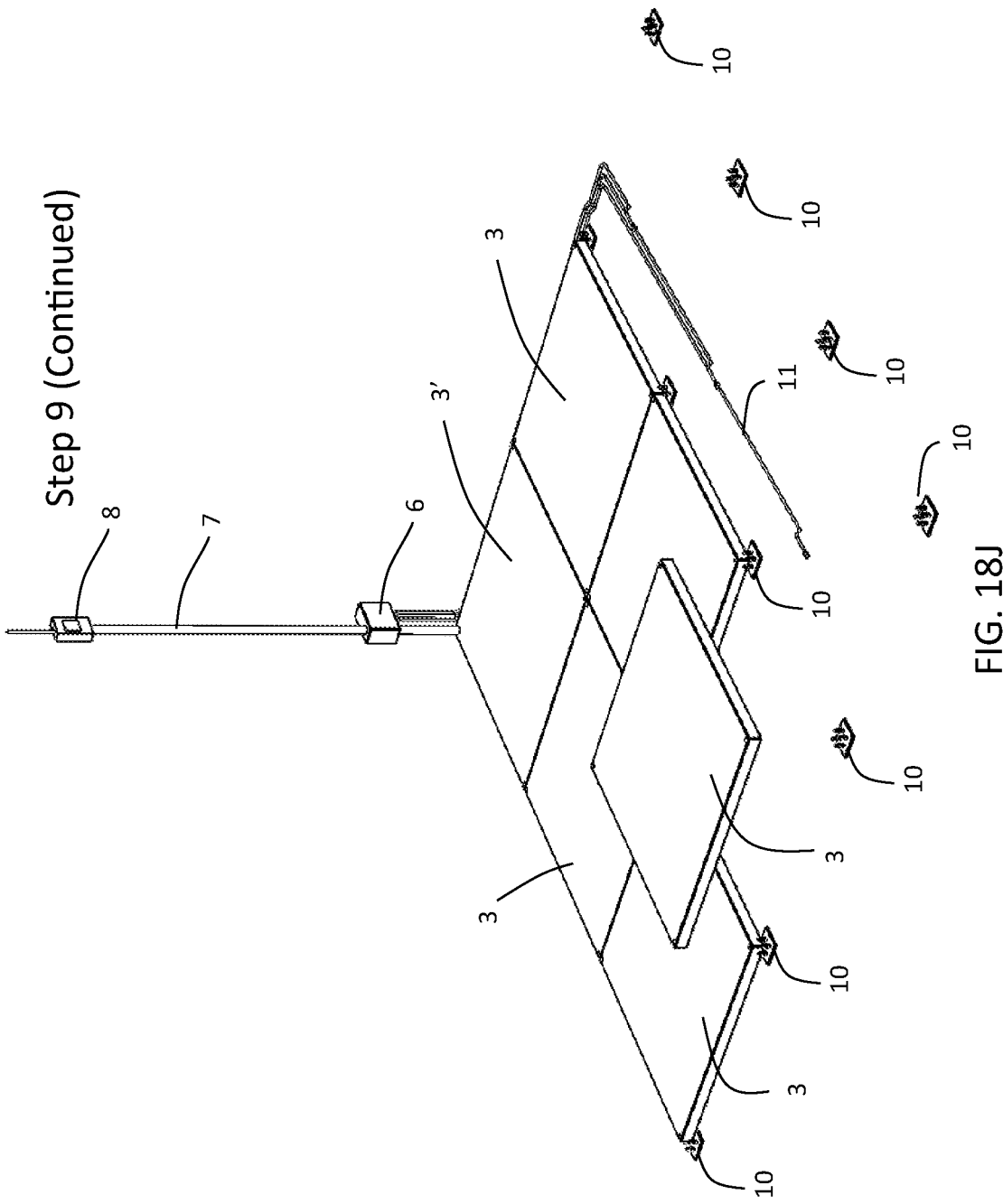
Figure 18K:
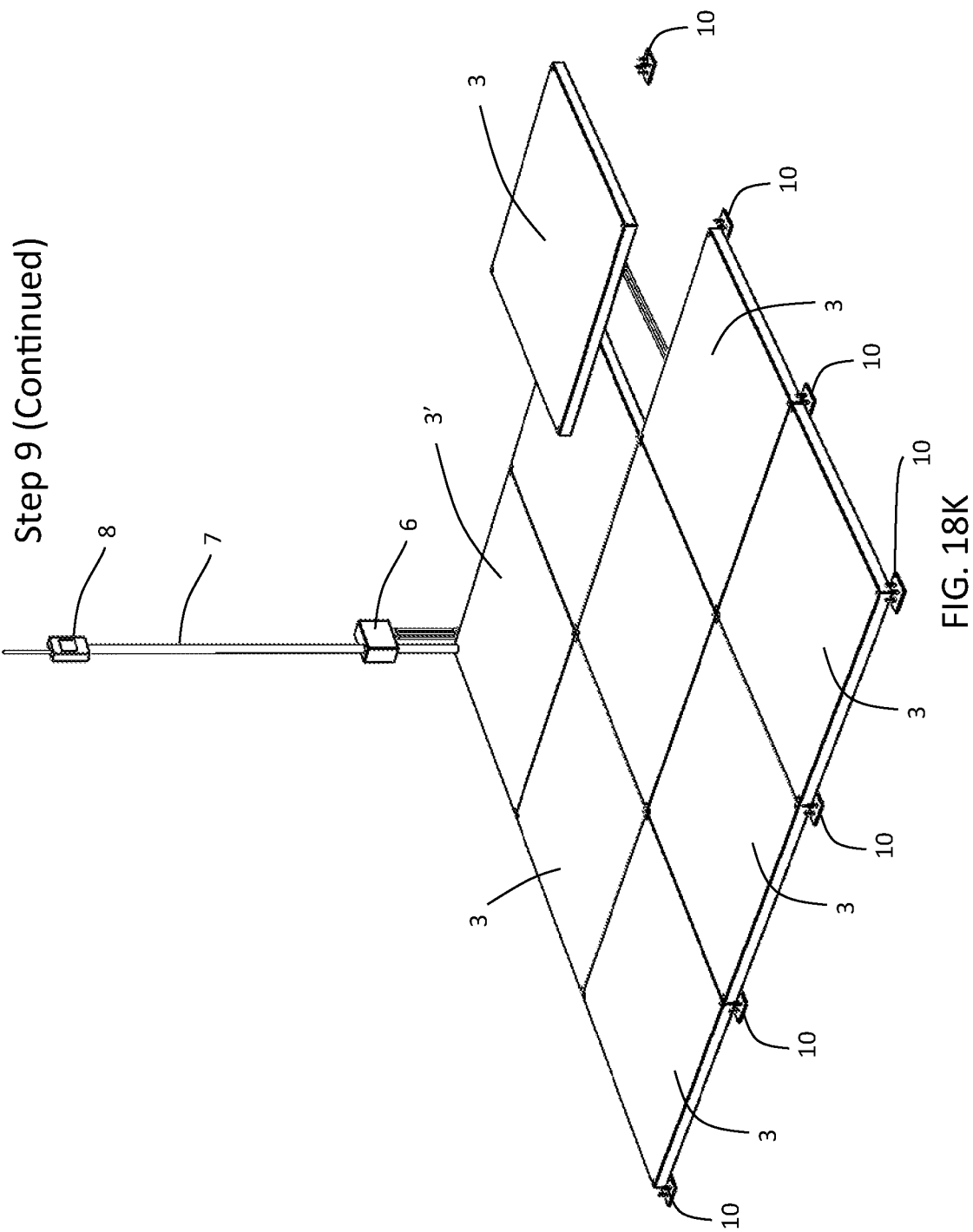
Figure 18L:
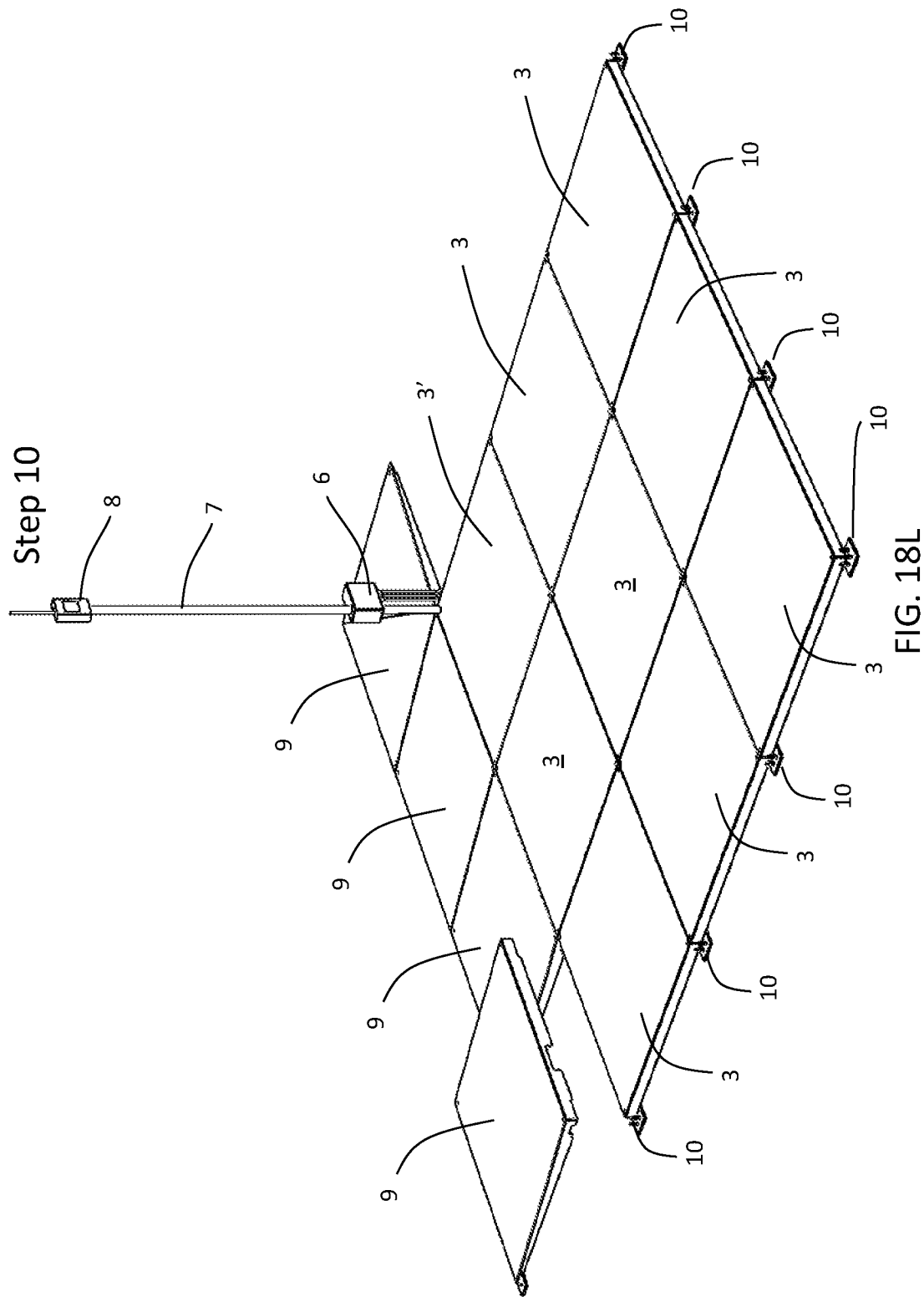
Figure 18M:
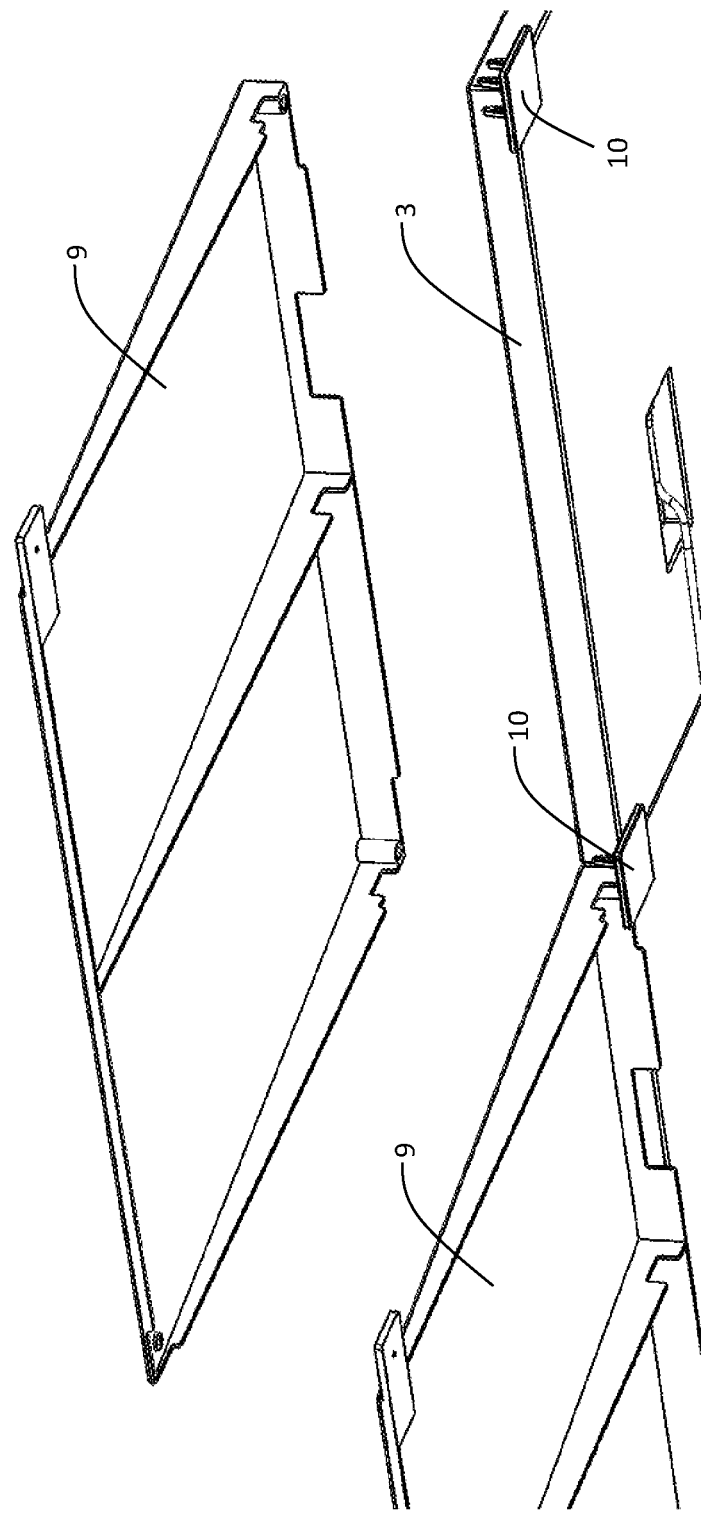
Figure 18N:
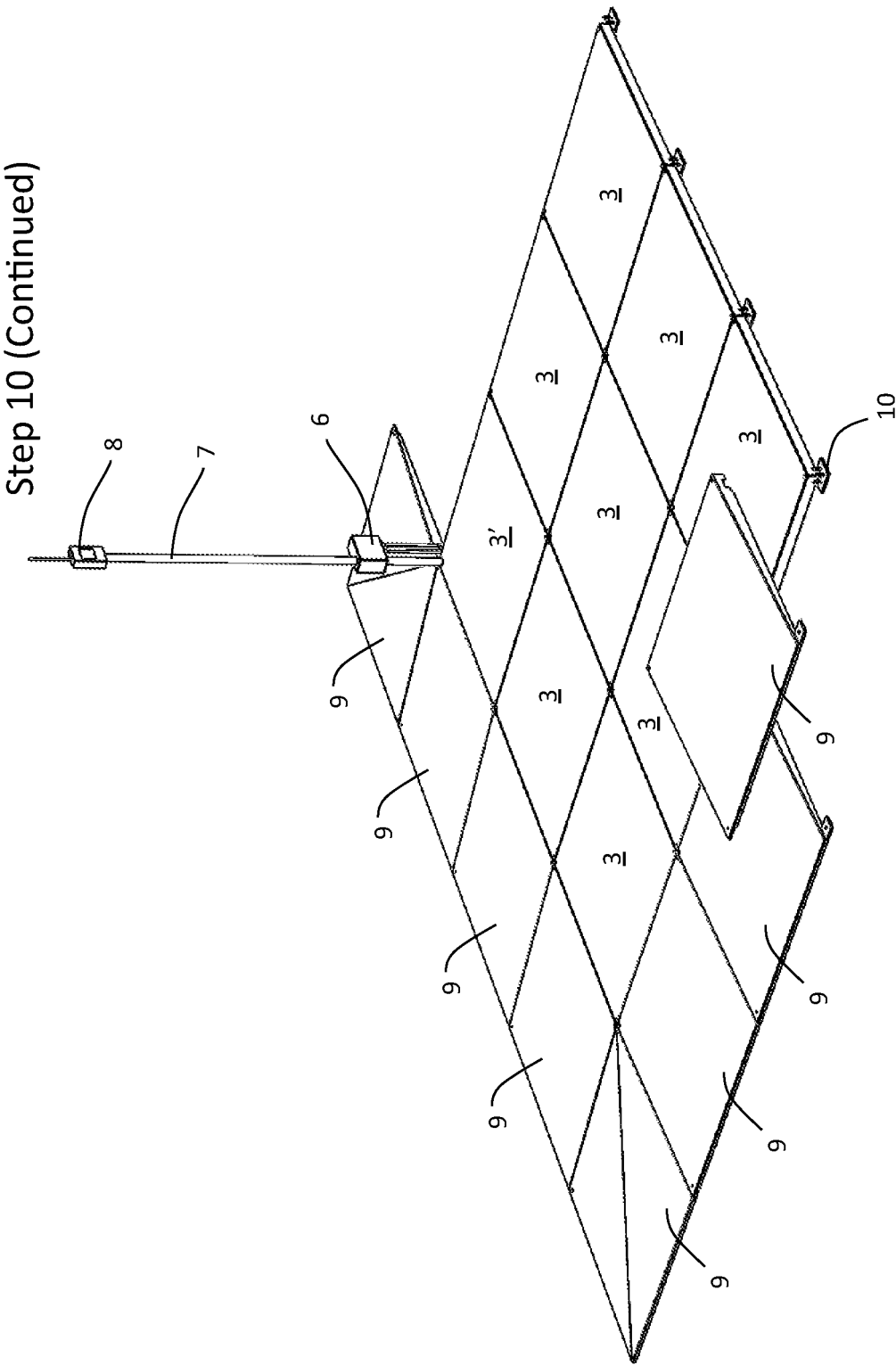
Figure 180:
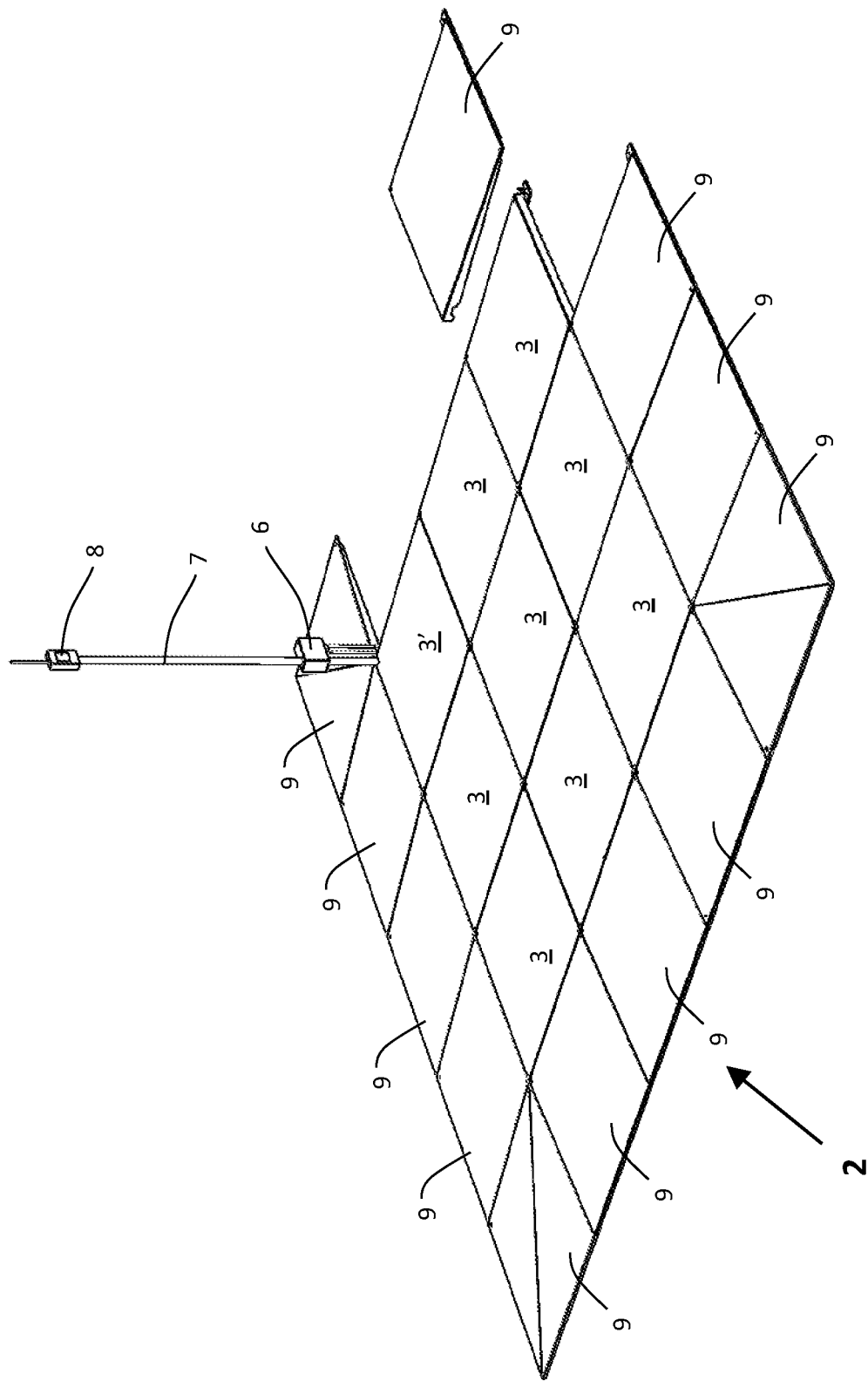
Figure 18P:
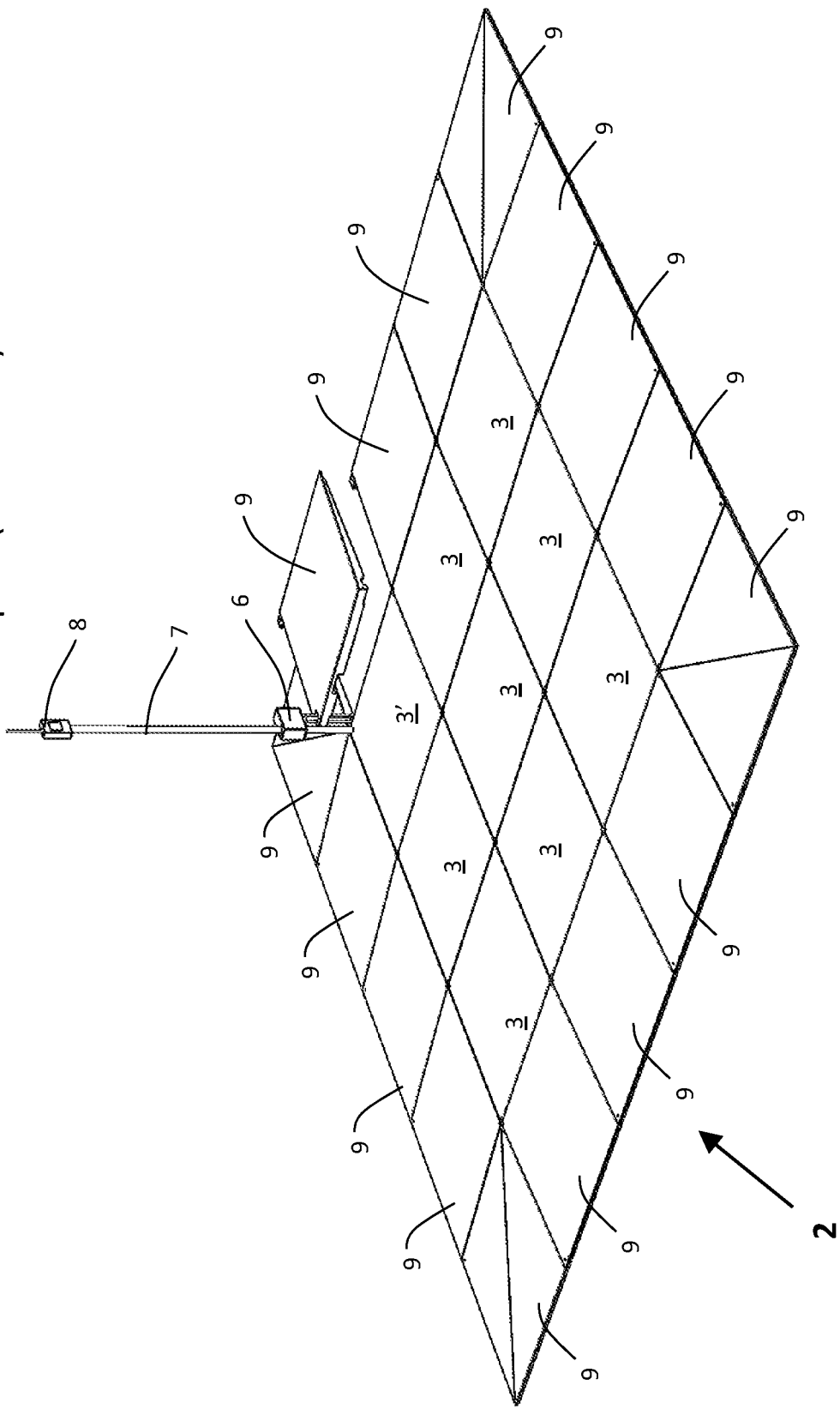
Figure 18R:
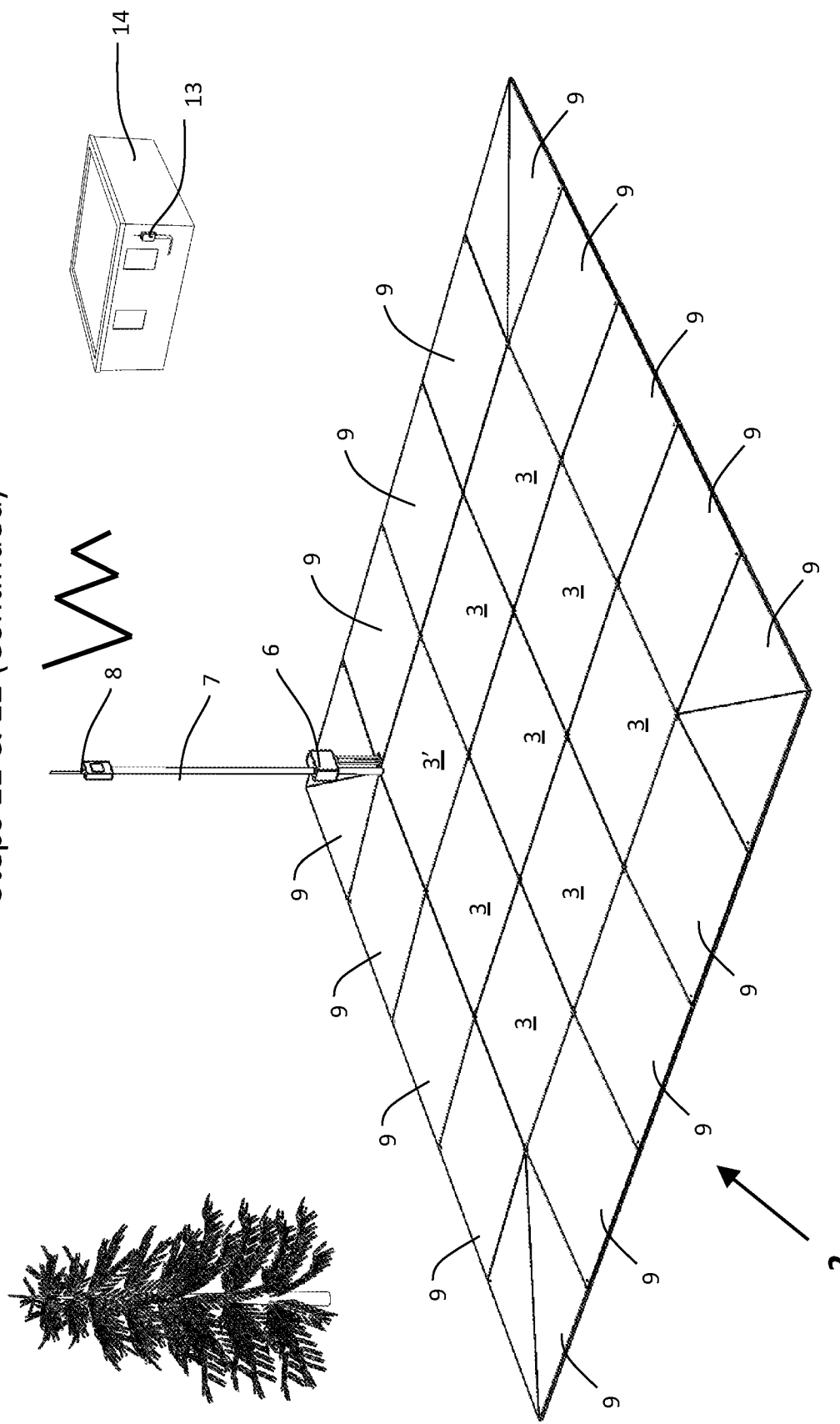
FIG. 18R is schematic representation showing a completely assembled and installed SWE-measuring networked array of the present invention, configured in communication with the cellular or wired IP gateway mounted on a local building as shown in FIGS. 18Q1 and 18Q2.

FIGS. 18D and 18E shows the placement of the Master SDCM 3' on the ground surface, and the installation the SDCM cable 11 so that it connects the Master SDCM 3' with CDPM mast structure 7.

FIGS. 18F, 18G1 and 18G2 show the steps involved when installing the data multiplexing and power distribution module (DMPDM) 4 and its submodules 5, 6, and the connecting the SDCM cable 11 to the DMPDM 4 (5, 6).

FIGS. 18H, 18I, 18J, and 18K show the steps involved when connecting each SDCM cable 11 to its respective SDCM 3 and setting the SDCM 3 to the snap-fit corner connecting and mounting plates 10 into an SDCM-based networked array 2.

FIGS. 18L, 18M, 18N, 18O and 18P show the steps involved when installing ground-surface translation plates 9 around the perimeter of the active SDCM-based networked array 2 formed by the 3×3 grid-size SDCM array in the illustrative embodiment.

FIGS. 18Q1, 18Q2 and 18R show connecting and establishing a communication interface with a cellular or wired IP gateway 13, and as required, installing an internet gateway at the electrical power and internet source 14.

Specification of the Preferred Method of System Operation

Figure 19:
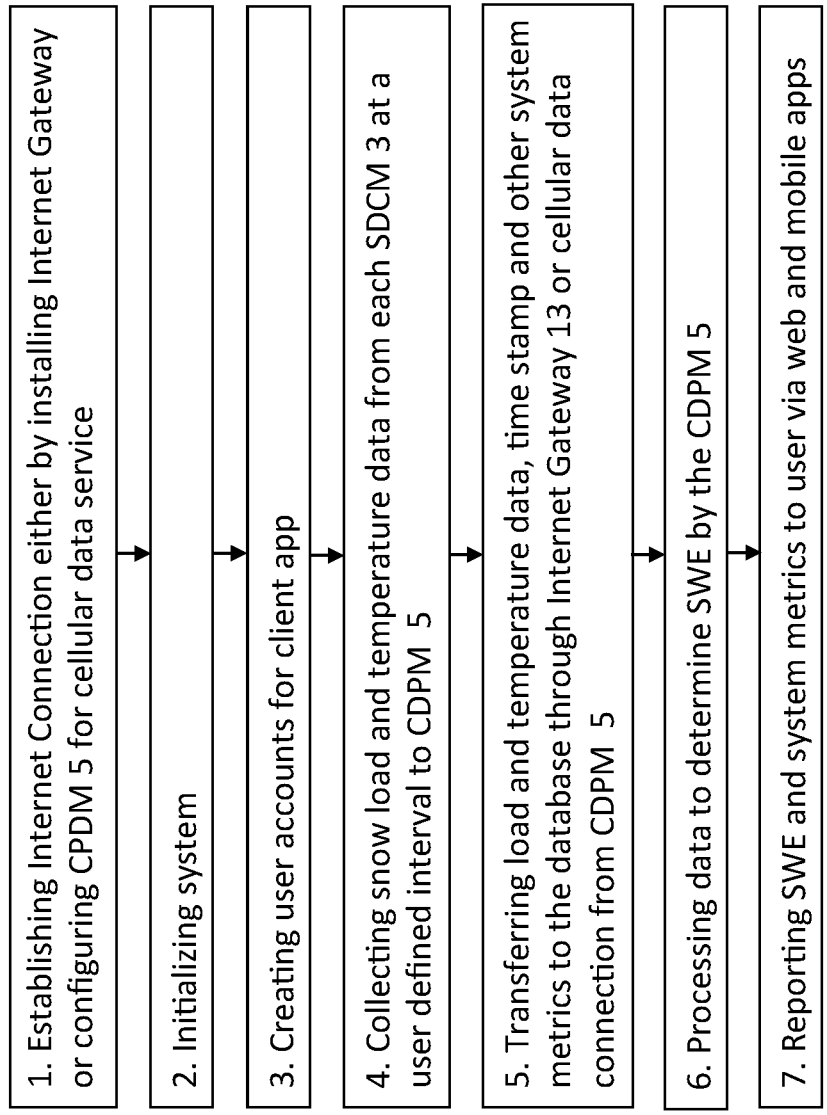
FIG. 19 is flow chart describing the high level steps involved in the method of operating the flexible (ground-surface adaptable) SWE-measuring networked array of the present invention, comprising (1) establishing an internet connection either by installing an internet gateway or configuring the CPDM for cellular data service, (2) initializing the system, (3) creating user accounts for client applications supported on the system network, (4) collecting snow load and temperature data from each SDCM at a user defined interval to CDPM, (5) transferring load and temperature data, time-stamp, and other system metrics to the database, through the Internet Gateway or cellular data connection from CDPM, (6) processing data to determine snow water equivalent (SWE) by the CDPM, and (7) reporting SWE and system metrics to the user via web-based and mobile applications supported on the system network of the present invention.

FIG. 19 describes the primary steps carried out in the method of operating the flexible (ground-surface adaptable) SWE measuring networked array of the present invention. As shown, the method comprising the steps of: (1) establishing an internet connection either by installing an internet gateway or configuring a CPDM 5 for cellular data service; (2) initializing the system which includes supplying electrical power to the system, booting up microcontrollers, initializing memory and data communication protocols, and the like in a manner known in the art; (3) creating user accounts for client applications supported on the system network 1; (4) collecting snow load and temperature data (e.g. sensed voltage signals) from each SDCM 3 at a user defined interval, and transmitting these voltage signals to the CDPM 5; (5) transferring load and temperature data, time-stamp, and other system metrics from the CDPM 5 through the Internet Gateway 13 or cellular data connection, to the database 20; (6) processing data collected by the CDPM 5, to determine snow water equivalent (SWE); and (7) reporting SWE and system metrics to users and administrators, via web-based and mobile applications running on client machines 23 deployed on the system network of the present invention.

Figure 20B:
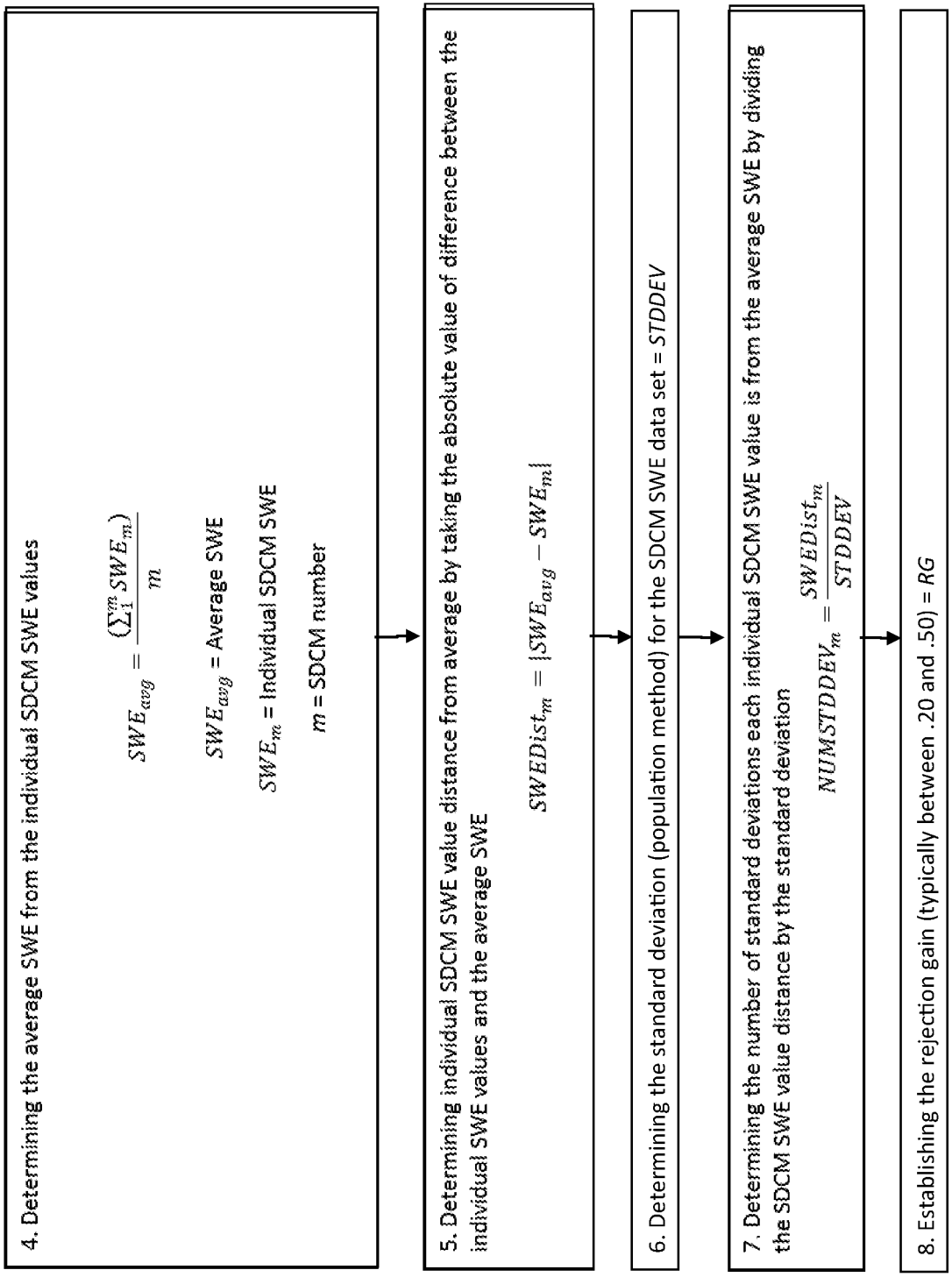
Figure 20C:
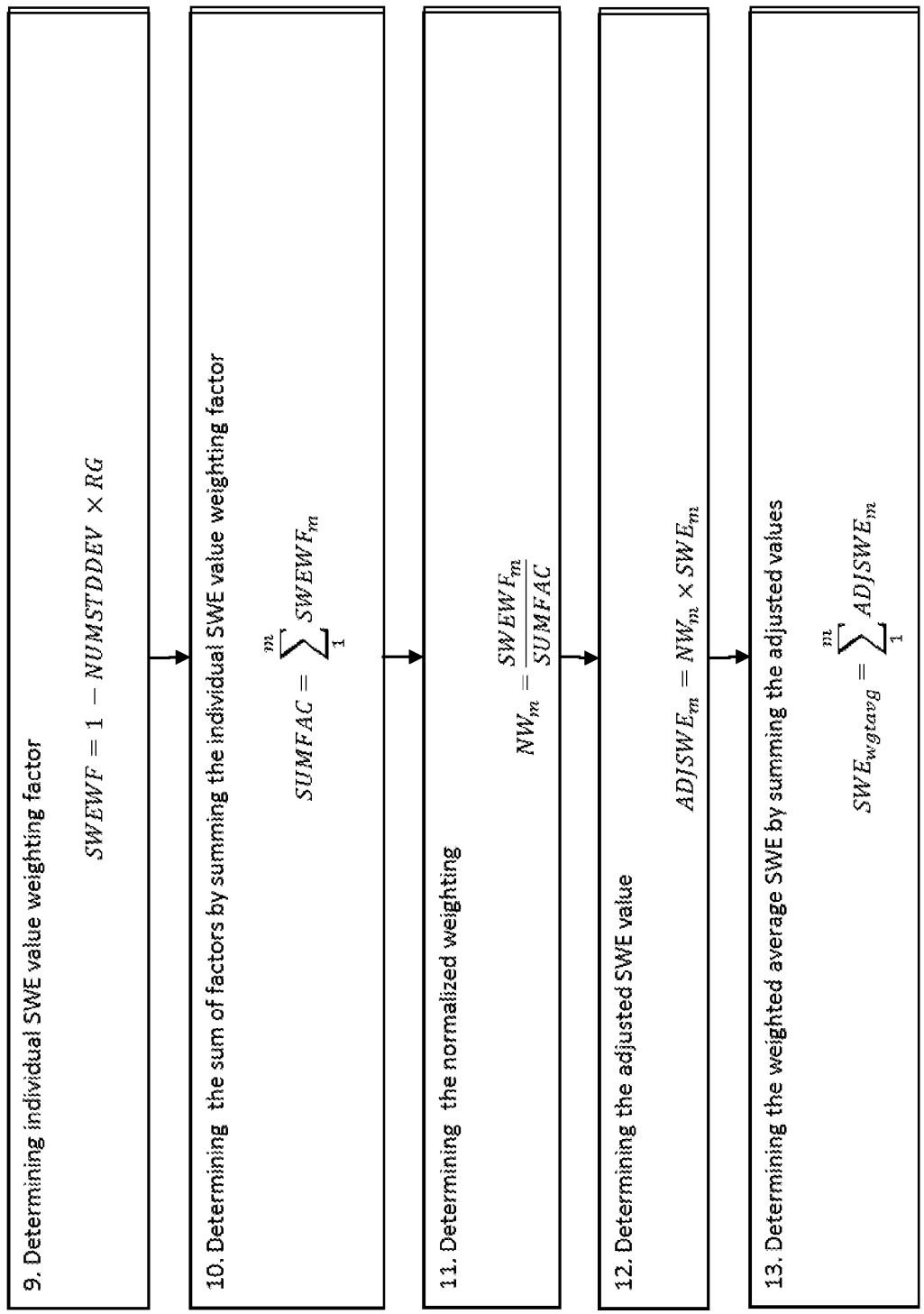

Specification of the Data Processing Method of the Present Invention Used to Determine Weighted Average Snow Water Equivalent (SWE) of a Snow Pack Based on a Weighted-Averaging Method Using Load Quality FIGS. 20A, 20B and 20C describe the steps associated with a data processing method of the present invention used to determine weighted average snow water equivalent (SWE) of a snow pack, based on a weighted-averaging method using load quality.

As shown, this method comprises the steps of:

(i) sampling and storing each SDCM load cell value (in volts) and transmitting these voltage data signal values to the CDPM 5;

(2) determining snow pressure p for each SDCM 3 using the formula set forth in Block 2, namely:

$$p = \frac{s\left(\sum_{1}^{n} L\, C_n\right)}{a}$$

wherein:

p=snow pressure on SDCM weighing plate s=load cell sensitivity (force/volts)

$LC_n$—load cell value (volts)

n=load cell number a=area of weighing plate (3) determining the SWE for each SDCM 3 using the formula shown in Block 3, namely $$SWE = \frac{p}{\rho}$$

wherein:

SWE=snow water equivalents $\rho$=density of water (4) determining the average SWE from the individual SDCM SWE values, computed in the SWE-measuring networked array 2, using the formula shown in Block 4, namely:

$$SWE_{AVG} = \frac{\left(\sum_{1}^{m} SWE_m\right)}{m}$$

wherein:

$SWE_{avg}$=Average SWE $SWE_m$=individua SDCM SWE m=SDCM number (5) determining individual SDCM SWE value distance from the average, by taking the absolute value of the difference between the individual SWE values and average SWE using the formula shown in Block 5, namely:

$$SWEDist_m = |SWE_{avg} - SWE_m|$$

(6) determining the standard deviation (population method) for the SDCM SWE data set -STDDEV;

(7) determining the number of standards each individual SDCM SWE value is from the average SWE, achieved by dividing the SDCM SWE value distance by the standard deviation according to the formula shown in Block 7, namely:

$$NUMSTDDEV_m = \frac{SWEDist_m}{STDDEV};$$

(8) establishing the rejection gain (typically between 0.20 and 0.50)=RG;

(9) determining the individual SWE value weighting factor, using the formula provided in Block 9, namely:

SWEWF=1−NUMSTDDEV×RG

(10) determining the sum of factors by summing the individual SWE value weighing factors shown in Block 10, namely:

SUMFAC=$\Sigma_1^m$SWEWF$_m$

(11) determining the normalized weighting, using the formula shown in Block 11, namely:

$$NW_m = \frac{SWEWF_m}{SUMFAC}$$

(12) determining the adjusted SWE value using the formula shown in Block 12, namely:

ADJSWE$_m$=NW$_m$×SWE$_m$

(13) determining the weighted average SWE by summing the adjusted values shown in Block 13, namely:

SWE$_{wtgavg}$=$\Sigma_1^m$ADJSWE$_m$

In the preferred embodiment, all of the steps in the above programming method are carried out using conventional programming techniques executed on a microprocessor or controller 80 within the CDPM 5, shown in FIG. 7. In alternative embodiments, some of the steps of the method can be executed within each SDCM 3 and computed data components can be transferred to the CDPM 5 for final stages of computation in accordance with the method of FIGS. 20A, 20B and 20C. Such programming methods will fall within the ordinary level of skill in the art.

Specification of SWE Measurements Displayed on Web and Mobile Applications

In general, the display of SWE data can occur in many different ways, using many alternative data formats. In FIGS. 21A through 21D, exemplary display screens are shown for four samples of SWE data, each being weighted differently during measurement.

Figure 21A:
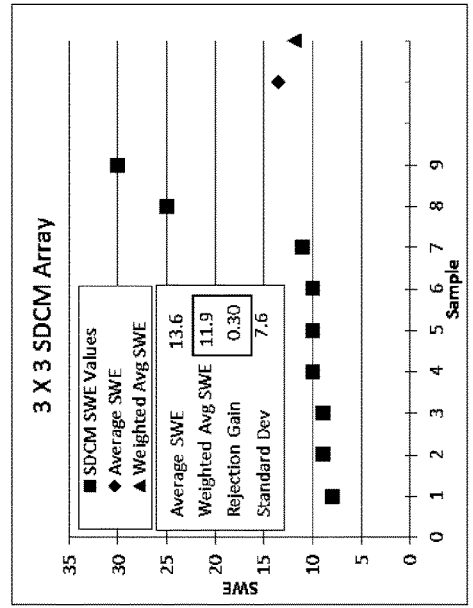
FIG. 21A is a schematic representation showing graphical examples of weighted averages of SWE measurements for a rejection gain of 0.20 used in a 3×3 SDCM-based SWE-measuring networked array supporting the method of operation specified in FIGS. 20A, 20B and 20C.

FIG. 21A show graphical examples of weighted averages of SWE measurements for a rejection gain of 0.20 used in a 3×3 SDCM array supporting the method of operation specified in FIGS. 20A, 20B and 20C.

Figure 21B:
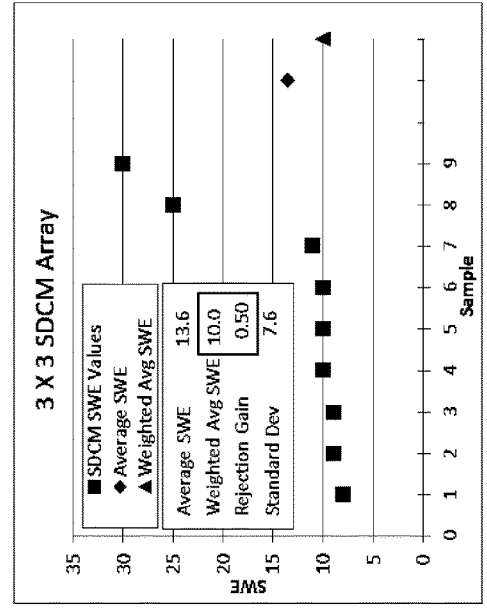
FIG. 21B is a schematic representation showing graphical examples of weighted averages of SWE measurements for a rejection gain of 0.30 used in a 3×3 SDCM-based SWE-measuring networked array supporting the method of operation specified in FIGS. 20A, 20B and 20C.

FIG. 21B shows graphical examples of weighted averages of SWE measurements for a rejection gain of 0.30 used in a 3×3 SDCM array supporting the method of operation specified in FIGS. 20A, 20B and 20C.

Figure 21C:
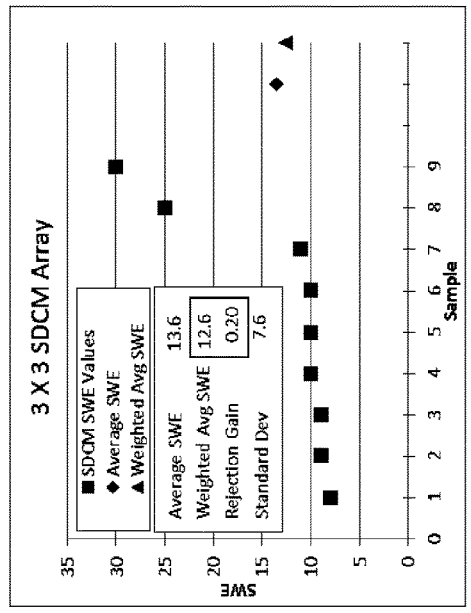
FIG. 21C is a schematic representation showing graphical examples of weighted averages of SWE measurements for a rejection gain of 0.40 used in a 3×3 SDCM-based SWE-measuring networked array supporting the method of operation specified in FIGS. 20A, 20B and 20C.

FIG. 21C shows graphical examples of weighted averages of SWE measurements for a rejection gain of 0.40 used in a 3×3 SDCM array supporting the method of operation specified in FIGS. 20A, 20B and 20C.

Figure 21D:
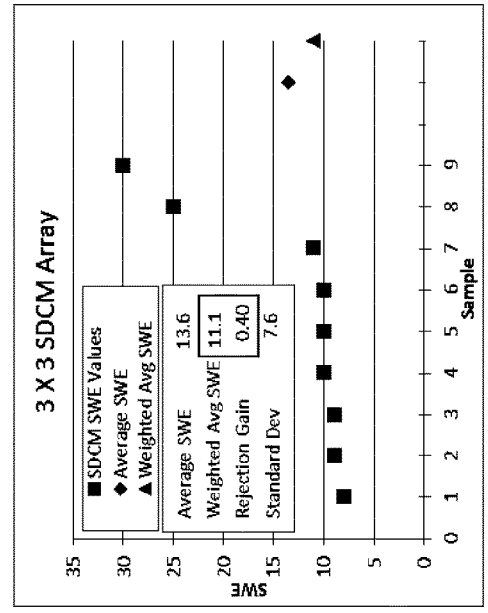
FIG. 21D is a schematic representation showing graphical examples of weighted averages of SWE measurements for a rejection gain of 0.50 used in a 3×3 SDCM-based SWE-measuring networked array supporting the method of operation specified in FIGS. 20A, 20B and 20C.

FIG. 21D shows graphical examples of weighted averages of SWE measurements for a rejection gain of 0.50 used in a 3×3 SDCM array supporting the method of operation specified in FIGS. 20A, 20B and 20C.

These GUIs can be served to client systems from a webserver in a remote data center, operably connected to an application server and database server in a manner known in the information server art. The GUIs can be transmitted to the client computer systems running web browsers or other client applications, for processing, display and user in diverse applications. The client systems can be realized as smart mobile cellphones, tablet computers, desktop computers, laptop computers, and the like.

MODIFICATIONS OF THE ILLUSTRATIVE EMBODIMENTS OF THE PRESENT INVENTION

The present invention has been described in great detail with reference to the above illustrative embodiments. It is understood, however, that numerous modifications will readily occur to those with ordinary skill in the art having had the benefit of reading the present disclosure.

For example, in alternative embodiments of the present invention described hereinabove, the system 1 can be realized as a stand-alone application, or integrated as part of a larger system network possibly offering environmental services to property owners, county, town and city officials and managers. Such alternative system configurations will depend on particular end-user applications and target markets for products and services using the principles and technologies of the present invention.

These and all other such modifications and variations are deemed to be within the scope and spirit of the present invention as defined by the accompanying Claims to Invention.

What is claimed is:

1. A snow water equivalent (SWE) data measurement, collection and delivery network comprising:

a plurality of flexible SWE-measuring networked arrays, wherein each said flexible SWE-measuring networked array is constructed from a plurality of snow data collection modules (SDCM) designed for installation on and adaptable to ground surfaces of variable surface geometry, and configured for measuring snow water equivalent (SWE) in remote snow fall accumulations;

wherein each said flexible SWE-measuring networked array is connected to a data center via the TCP/IP infrastructure of the Internet;

wherein said data center includes a plurality of Web-enabled client machines, and communication servers, application servers, and database servers operably connected to the TCP/IP infrastructure of the Internet; and wherein a set of GPS-based services are supported and provided by said SWE data measurement, collection and delivery network for use in tracking and monitoring each said flexible SWE-measuring networked array deployed in said SWE data measurement, collection and delivery network.

2. The SWE data measurement, collection and delivery network of claim 1, wherein said plurality of flexible SWE-measuring networked arrays are in communication with said TCP/IP infrastructure, and gather environmental intelligence, including SWE data, for use by scientists and managers during environmental management and planning, and also sharing with consumers on one or more of weather forecasting sites, social media pages, financial websites, and recreational websites.

3. The SWE data measurement, collection and delivery network of claim 1, wherein said SWE data is used for (i) water resource predictions for drinking water applications, winter recreation applications, and hydropower applications, (ii) flood risk assessment, and (iii) climate studies.

4. The SWE data measurement, collection and delivery network of claim 1, wherein each said flexible SWE-measuring networked array comprises:
one or more snow data collection modules (SDCMs) for measuring the snow weight of a snow load on a snow weighing surface supported by a snow weight plate, and generating an electrical signal representative of said snow weight;
a data multiplexing and power distribution module for receiving said electrical signal; and
a central data processing module for processing said electrical signal received from said data multiplexing and power distribution module and generating a SWE data value representative of the snow weight of the snow load on said snow weighing surface.

5. The SWE data measurement, collection and delivery network of claim 1, wherein each of said one or more snow data collection modules (SDCMs) measures the temperature of said snow weighing surface and generates an electrical signal representative of said snow temperature, and wherein the electrical signal representatives of said snow temperature and said snow weight are combined into a composite electrical signal and transmitted to said central data processing module.

6. The SWE data measurement, collection and delivery network of claim 1, wherein each said snow data collection module (SDCM) comprises a planar frame structure having a bottom surface supporting a plurality of electronic load cells, and an aperture supporting said snow weight plate supported upon the said plurality of electronic load cells, and a flexible seal extending between perimeter edge of said planarframe structure and the perimeter edge of said snow weight plate, whereby said snow weight plate is free to deflect in response to the load presented by a snow packed layer disposed on the surface of said snow weigh plate.

7. The SWE data measurement, collection and delivery network of claim 1, wherein said planar frame structure of each said snow data collection module (SDCM) includes four corner connecting and mounting plates that cooperate to couple together and mount the corners of neighboring snow data collection modules (SCDMs) and form one said flexible SWE-measuring networked array.

8. The SWE data measurement, collection and delivery network of claim 7, wherein each corner of said planar frame structure has a bore hole for receiving a barbed post extending from one said corner connecting and mounting plate, and once passed through said bore hole, the barbs expand and releasably lock the connected corners of neighboring snow data collection modules (SDCMs) being coupled to form a said flexible SWE-measuring networked array.

9. A snow water equivalent (SWE) measuring networked array for installation on ground surfaces of variable surface geometry, and configured for measuring snow water equivalent (SWE) in remote snow fall accumulations, said SWE-measuring networked array comprising:
a plurality of snow data collection modules (SDCM) connected together over a specified region of space, and each said SDCM measuring the weight and temperature of snow over a snow weighing surface, and generate electrical signals representative of the weight of the snow load on said weigh surface;
one or more snow data collection module for measuring the snow load on said snow weighing surface, and generating an electrical signal representative of said snow load weight;
a data multiplexing and power distribution module for receiving said electrical signal;
a central data processing module for processing said electrical signals received from said data multiplexing and power distribution module and generating a SWE data value representative of the snow weight on said snow weighing surface; and
a GPS receiver for tracking each the GPS location of said SWE-measuring networked array.

10. The SWE measuring networked array of claim 9, wherein said SWE data value is transmitted wirelessly to a data center via the TCP/IP infrastructure of the Internet; and
wherein said data center includes a plurality of Web-enabled client machines, and communication servers, application servers, and database servers operably connected to the TCP/IP infrastructure of the Internet.

11. The SWE measuring networked array of claim 9, wherein said SWE data values are used for (i) water resource predictions for drinking water applications, winter recreation applications, and hydropower applications, (ii) flood risk assessment, and (iii) climate studies.

12. The SWE measuring networked array of claim 9, wherein said SDCMs are connected together in a flexible manner so that said resulting SWE-measuring networked array can conform to different surface geometries presented by the surface of the Earth.

13. A snow data collection module (SDCM) for continuously measuring the weight of snow over a snow weight surface, comprising:
a planar frame structure having a bottom surface supporting a plurality of electronic load cells, and a top frame surface provided with an aperture and having a perimeter edge;
a snow weight plate supported within said aperture, upon said plurality of electronic load cells, and said snow weight plate having a perimeter edge and providing said snow weight surface;
wherein each said electronic load sensor contains a strain-gauge for generating electrical voltage signal in response to strain imposed on said strain-gauge by the weight of snow on said snow weight plate;
a flexible seal extending between the perimeter edge of said top frame surface and the perimeter edge of said snow weight plate;
wherein said snow weight plate is free to deflect in response to the load forces presented by the mass of a snow packed layer disposed on said snow weight plate, and generate electrical signals from said strain-gauge contained in each said electronic load sensor, for subsequent processing in a data processing module (DPM);
wherein a small gap is disposed between the perimeter edge of said snow weight plate and the perimeter edge of said top frame surface; and
a flexible sealing membrane applied over said small gap allowed to bend and distort in response to snow loading forces.

14. The snow data collection module of claim 13, wherein said planar frame structure includes four corner connecting and mounting plates that cooperate to couple together and mount the corners of neighboring snow data collection modules (SDCMs) into a flexible multi-SDCM networked array.

15. The snow data collection module of claim 14, wherein the corner of said planar frame structure has a bore hole for receiving one of four barbed posts extending from one said corner connecting and mounting plate, and once passed through the bore hole, the barbs expand and releasably lock the connected corners of neighboring snow data collection modules (SDCMs) being coupled to form said flexible multi-SDCM networked array.

* * * * *